US011944946B2

(12) United States Patent
Pagliaro et al.

(10) Patent No.: US 11,944,946 B2
(45) Date of Patent: Apr. 2, 2024

(54) MIXING ASSEMBLIES INCLUDING MAGNETIC IMPELLERS

(71) Applicant: SAINT-GOBAIN PERFORMANCE PLASTICS CORPORATION, Solon, OH (US)

(72) Inventors: Anthony P. Pagliaro, Lansdale, PA (US); Albert A. Werth, Ft. Myers, FL (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 420 days.

(21) Appl. No.: 14/986,218

(22) Filed: Dec. 31, 2015

(65) Prior Publication Data

US 2016/0114300 A1 Apr. 28, 2016

Related U.S. Application Data

(63) Continuation-in-part of application No. 14/318,066, filed on Jun. 27, 2014, now Pat. No. 9,815,035.

(60) Provisional application No. 61/934,260, filed on Jan. 31, 2014, provisional application No. 61/915,366, filed on Dec. 12, 2013, provisional application No. 61/891,477, filed on Oct. 16, 2013, provisional application No. 61/874,727, filed on Sep. 6, 2013, provisional application No. 61/841,189, filed on Jun.

(Continued)

(51) Int. Cl.

*B01F 27/41* (2022.01)
*B01F 33/453* (2022.01)
*B01F 35/513* (2022.01)

(52) U.S. Cl.

CPC .......... *B01F 27/41* (2022.01); *B01F 33/4534* (2022.01); *B01F 35/513* (2022.01)

(58) Field of Classification Search

CPC .............. B01F 13/0818; B01F 13/0863; B01F 7/00858; B01F 15/0085; B01F 33/452; B01F 33/4534; B01F 35/513; B01F 27/41

USPC .......................................................... 366/273

See application file for complete search history.

(56) References Cited

U.S. PATENT DOCUMENTS 2,702,571 A * 2/1955 Murray ............... B01F 13/0863 241/282.1

3,265,369 A 8/1966 Harrison (Continued)

FOREIGN PATENT DOCUMENTS

CN 101603628 A 12/2009
CN 101657250 A 2/2010

(Continued)

OTHER PUBLICATIONS

International Search Report issued in PCT/US2014/044667 dated Oct. 16, 2014, 1 page.

(Continued)

*Primary Examiner* — Marc C Howell

(74) *Attorney, Agent, or Firm* — Abel Schillinger, LLP; Chi Suk Kim

(57) ABSTRACT

The present disclosure relates to improved magnetic mixing assemblies and mixing system. The magnetic mixing assemblies can provide improved mixing action, ease of use, and low friction. The mixing assemblies can be adapted for use with a wide variety of containers including narrower neck containers and flexible containers.

20 Claims, 42 Drawing Sheets

Related U.S. Application Data

28, 2013, provisional application No. 61/841,182, filed on Jun. 28, 2013.

(56) References Cited

U.S. PATENT DOCUMENTS

| | | | | |
|---|---|---|---|---|
| 3,575,536 | A * | 4/1971 | Jacobs | B67D 1/10 310/104 |
| 3,847,504 | A | 11/1974 | Martin | |
| 4,162,855 | A | 7/1979 | Bender | |
| 4,199,265 | A | 4/1980 | Sanderson et al. | |
| 4,231,974 | A * | 11/1980 | Engelbrecht | C02F 3/207 261/87 |
| 4,305,214 | A | 12/1981 | Hurst | |
| 1,465,377 | A | 8/1984 | de Bruyne | |
| 4,468,130 | A * | 8/1984 | Weetman | B01F 27/113 416/243 |
| 4,483,623 | A | 11/1984 | Eaton et al. | |
| 4,483,628 | A | 11/1984 | Terzian | |
| 4,498,785 | A | 2/1985 | de Bruyne | |
| 5,141,327 | A | 8/1992 | Shiobara | |
| 5,378,062 | A * | 1/1995 | Rains | B01F 13/0827 366/273 |
| 5,478,149 | A | 12/1995 | Quigg | |
| 5,599,175 | A * | 2/1997 | Tojo | F04D 13/024 417/420 |
| 5,676,462 | A | 10/1997 | Fraczek et al. | |
| 5,795,127 | A | 8/1998 | DeClerck | |
| 5,934,877 | A | 8/1999 | Harman | |
| 6,015,272 | A | 1/2000 | Antaki et al. | |
| 6,109,780 | A | 8/2000 | Lesniak | |
| 6,138,550 | A | 10/2000 | Fingar, Jr. et al. | |
| 6,416,215 | B1 | 7/2002 | Terentiev | |
| 6,702,552 | B1 | 3/2004 | Harman | |
| 6,758,593 | B1 | 7/2004 | Terentiev | |
| 7,153,021 | B2 | 12/2006 | Goodwin et al. | |
| 7,168,848 | B2 * | 1/2007 | Gigas | B01F 13/0818 366/270 |
| 7,287,580 | B2 | 10/2007 | Harman | |
| 7,396,153 | B2 | 7/2008 | Andersson | |
| 7,629,167 | B2 | 12/2009 | Hodge et al. | |
| 7,762,716 | B2 | 7/2010 | Terentiev et al. | |
| 7,862,302 | B2 | 1/2011 | Harman | |
| 8,128,277 | B2 | 3/2012 | Meier | |
| 8,282,269 | B2 | 10/2012 | Terentiev | |
| 8,292,491 | B2 | 10/2012 | Castillo et al. | |
| 2001/0001278 | A1 | 5/2001 | Drevet | |
| 2002/0027175 | A1 * | 3/2002 | Capp | A47J 43/046 241/199.12 |
| 2003/0198128 | A1 | 10/2003 | Carlson | |
| 2004/0027020 | A1 | 2/2004 | Newcomb | |
| 2005/0002274 | A1 * | 1/2005 | Terentiev | B01F 15/0085 366/273 |
| 2005/0088907 | A1 | 4/2005 | Vanek | |
| 2005/0095700 | A1 | 5/2005 | Budzowski et al. | |
| 2005/0213428 | A1 * | 9/2005 | Freude | B01F 7/162 366/273 |
| 2006/0076068 | A1 | 4/2006 | Young et al. | |
| 2006/0092761 | A1 | 5/2006 | Terentiev | |
| 2007/0025846 | A1 | 2/2007 | Harman | |
| 2007/0076995 | A1 | 4/2007 | Engel et al. | |
| 2009/0219780 | A1 | 9/2009 | Castillo et al. | |
| 2010/0046323 | A1 * | 2/2010 | Tien | B01F 13/0818 366/274 |
| 2010/0157725 | A1 | 6/2010 | Terentiev et al. | |
| 2010/0290308 | A1 | 11/2010 | Terentiev | |
| 2012/0002501 | A1 | 1/2012 | Ulstad et al. | |
| 2012/0016671 | A1 | 1/2012 | Jaggi et al. | |
| 2012/0039721 | A1 * | 2/2012 | Lilja | B01F 27/113 29/889 |
| 2012/0116335 | A1 | 5/2012 | Tanghoej | |
| 2012/0135464 | A1 | 5/2012 | Alisch et al. | |
| 2012/0281494 | A1 | 11/2012 | Terentiev | |
| 2013/0084622 | A1 | 4/2013 | Ram et al. | |
| 2014/0023535 | A1 | 1/2014 | Hoshi et al. | |
| 2014/0032397 | A1 | 1/2014 | Young et al. | |
| 2014/0044667 | A1 | 2/2014 | Greff | |
| 2014/0047272 | A1 | 2/2014 | Breternitz et al. | |
| 2015/0003189 | A1 | 1/2015 | Werth et al. | |
| 2015/0298077 | A1 | 10/2015 | Morrissey et al. | |
| 2015/0330383 | A1 | 11/2015 | Letailleur et al. | |
| 2016/0287771 | A1 | 10/2016 | Khanal et al. | |

FOREIGN PATENT DOCUMENTS

| | | | |
|---|---|---|---|
| CN | 202410569 | U | 9/2012 |
| CN | 103083742 | A | 5/2013 |
| CN | 106555789 | A | 4/2017 |
| DE | 102009044205 | A1 | 5/2010 |
| EP | 880650 | B1 | 11/2002 |
| EP | 1644107 | A1 | 4/2006 |
| EP | 1748201 | A2 | 1/2007 |
| EP | 3013465 | A1 | 5/2016 |
| FR | 2388599 | | 12/1978 |
| JP | S5675145 | U | 6/1981 |
| JP | S6034727 | A | 2/1985 |
| JP | S6076104 | A | 4/1985 |
| JP | H09-271650 | A | 10/1997 |
| JP | H10321452 | A | 12/1998 |
| JP | 2001180752 | A | 7/2001 |
| JP | 2001347151 | A | 12/2001 |
| JP | 2004511902 | A | 4/2004 |
| JP | 2005000907 | A | 1/2005 |
| JP | 2005523140 | A | 8/2005 |
| JP | 3164679 | U | 12/2010 |
| KR | 101596433 | B1 | 2/2016 |
| RU | 2006282 | C1 | 1/1994 |
| RU | 2158785 | C2 | 11/2000 |
| SU | 741927 | A1 | 7/1980 |
| TW | 201544703 | A | 12/2015 |
| WO | 102733 | A1 | 1/2001 |
| WO | 2002041484 | A2 | 5/2002 |
| WO | 2006002091 | A2 | 1/2006 |
| WO | 2006098817 | A1 | 9/2006 |
| WO | 2008040567 | A1 | 4/2008 |
| WO | 2008040568 | A1 | 4/2008 |
| WO | 2008040569 | A1 | 4/2008 |
| WO | 2008103857 | A1 | 8/2008 |
| WO | 2010063845 | A1 | 6/2010 |
| WO | 2011082255 | A1 | 7/2011 |
| WO | 2012015571 | A1 | 2/2012 |
| WO | 2012097079 | A3 | 7/2012 |
| WO | 2012116335 | A1 | 8/2012 |
| WO | 2013005517 | A1 | 1/2013 |
| WO | 2013040161 | A1 | 3/2013 |
| WO | 2014210511 | A1 | 12/2014 |

OTHER PUBLICATIONS

Supplementary Partial European Search Report for EP14817298, completed Feb. 9, 2017, 2 pages.

ISR & WO in International Application No. PCT/US2018/067853, dated Jun. 12, 2019, 11 p.

* cited by examiner

MIXING ASSEMBLIES INCLUDING MAGNETIC IMPELLERS

CROSS-REFERENCE TO RELATED APPLICATIONS

This application is a continuation-in part and claims priority to U.S. patent application Ser. No. 14/318,066 entitled "MIXING ASSEMBLIES INCLUDING MAGNETIC IMPELLERS," by Albert A. Werth, et al., filed Jun. 27, 2014, which application claims priority under 35 U.S.C. § 119(e) to U.S. Provisional Application No. 61/841,182 entitled "FLUID MIXING ASSEMBLY," by Albert A. Werth et al., filed Jun. 28, 2013; claims priority under 35 U.S.C. § 119(e) to U.S. Provisional Application No. 61/841,189 entitled "DECOUPLED FLUID AGITATOR," by Albert A. Werth et al., filed Jun. 28, 2013; claims priority under 35 U.S.C. § 119(e) to U.S. Provisional Application No. 61/874,727 entitled "FREE-STANDING MAGNETIC MIXING ASSEMBLY," by Albert A. Werth, filed Sep. 6, 2013; claims priority under 35 U.S.C. § 119(e) to U.S. Provisional Application No. 61/891,477 entitled "BLADED MIXING ASSEMBLY," by Albert A. Werth, filed Oct. 16, 2013; claims priority under 35 U.S.C. § 119(e) to U.S. Provisional Application No. 61/915,366 entitled "MIXING ASSEMBLIES HAVING A DECOUPLED FLUID AGITATOR," by Albert A. Werth et al., filed Dec. 12, 2013; claims priority under 35 U.S.C. § 119(e) to U.S. Provisional Application No. 61/934,260 entitled "MAGNETIC MIXING ASSEMBLY WITH A PARTIALLY BOUNDED FLUID BLADED AGITATING ELEMENT," by Albert A. Werth, filed Jan. 31, 2014; and claims priority under 35 U.S.C. § 120 to U.S. application Ser. No. 14/318,066 of which all are assigned to the current assignee hereof and incorporated herein by reference in their entirety.

FIELD OF THE DISCLOSURE

The present disclosure relates to magnetic impellers, and more particularly to magnetic impellers adapted to mix a fluid.

RELATED ART

Traditionally, fluid magnetic impellers have utilized a magnetic stir bar containing a hermetically sealed bar magnet. Such magnetic impellers often do not provide a desired mixing efficiency, particularly in large scale operations. Moreover, traditional magnetic stir bars have a tendency to "walk" or disengage with the magnetic driving magnet, which can disturb mixing and decrease efficiency. Other magnetic impellers have been developed to increase the efficiency of mixing, such as superconductor driven stirring assemblies, but such assemblies typically require either the use of a specialized container or a physical engagement or retention with the vessel.

Accordingly, a need exists to develop a magnetic impeller which overcomes the drawbacks recited above, namely a magnetic impeller with an improved mixing efficiency over a traditional magnetic stir bar that can be used in a wide array of container designs and does not require physical attachment or connection to a vessel.

BRIEF DESCRIPTION OF THE DRAWINGS

Embodiments are illustrated by way of example and are not limited in the accompanying figures.

Figure 1:
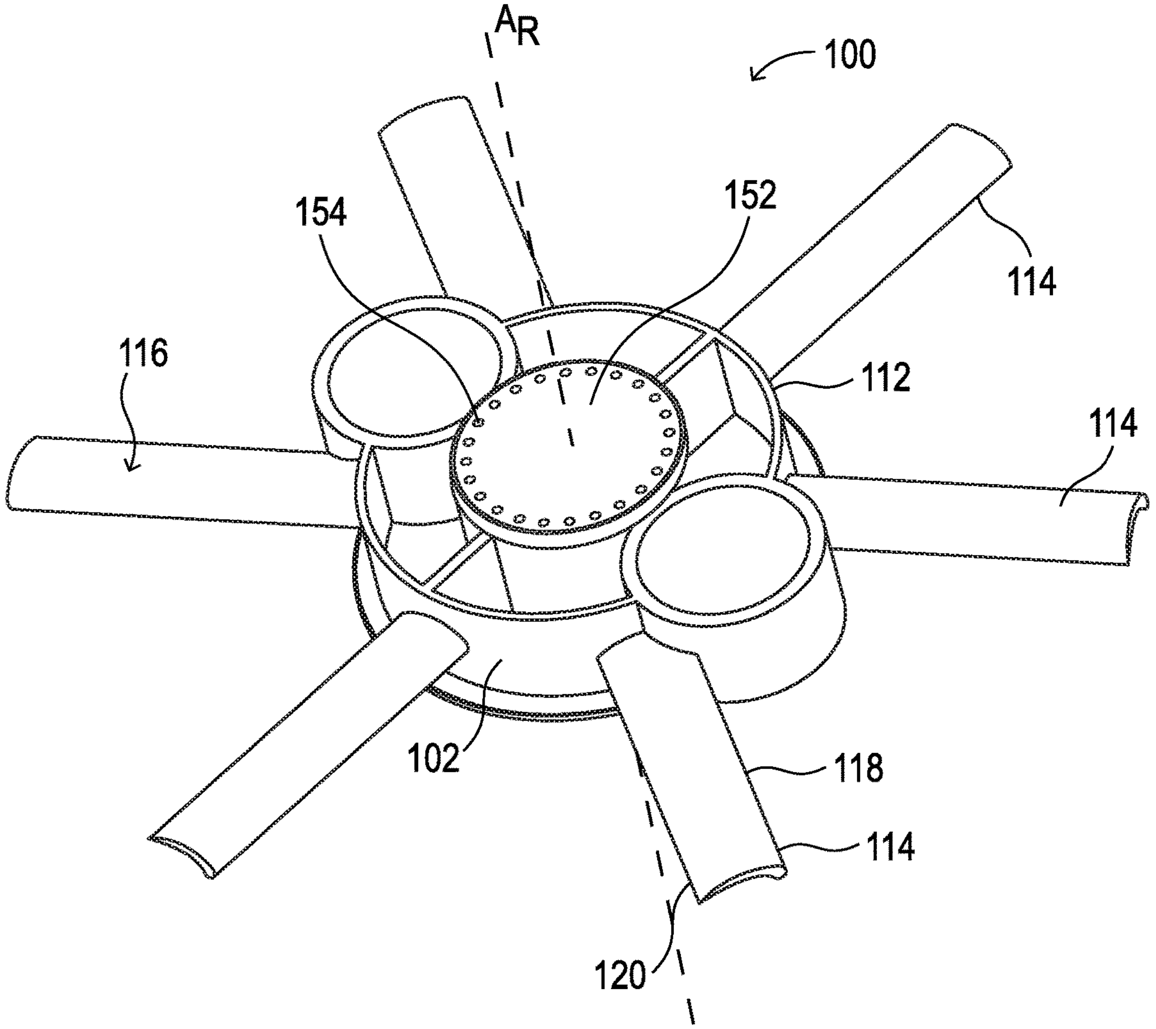
FIG. 1 includes a perspective view of a magnetic impeller in accordance with an embodiment.
Figure 2:
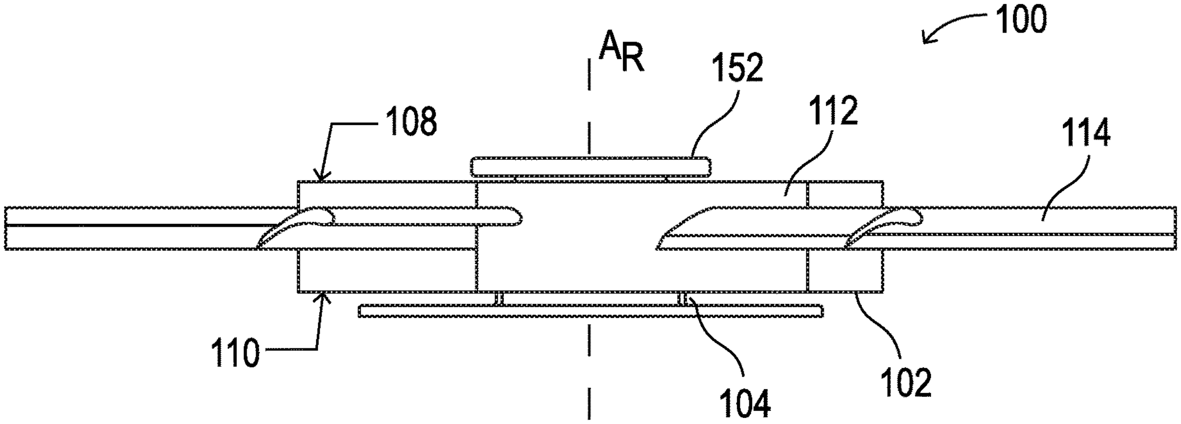
FIG. 2 includes a side plan view of a magnetic impeller in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluid mixing art.

Unless otherwise specified, the use of any numbers or ranges when describing a component is approximate and merely illustrative and should not be limited to include only that specific value. Reference to values stated in ranges is intended to include each and every value within that range.

The following description is directed to embodiments of a magnetic impeller adapted to mix a fluid.

In a particular aspect, a magnetic impeller in accordance with one or more embodiments described herein can be capable of aerodynamic levitation. As used herein, "aerodynamic levitation" refers to the translation of a blade along a pressure gradient towards a relatively lower pressure formed by the blade in the fluid. Magnetic impellers, such that disclosed in U.S. Pat. Nos. 7,762,716 and 6,758,593, are not capable of aerodynamic levitation. For example, although these patents describe "levitation", such "levitation" is caused by fragmented turbulence generated below the magnetic impeller or by a superconducting element. This type of "levitation" is not aerodynamic levitation as defined herein, as aerodynamic levitation can be achieved only by the generation of a relatively lower pressure within the fluid which effectively pulls the impeller towards the lower pressure, thereby causing translation of at least a portion of the impeller. Certain embodiments of the magnetic impeller described herein can aerodynamically levitate and generate efficient mixing action at very low speeds without the buildup of frictional heat.

In a particular embodiment, the magnetic impeller can be a decoupled magnetic impeller capable of aerodynamic levitation. In such a manner, the blade can be decoupled from a rotatable element and adapted to translate in a direction normal to the rotatable element.

In another aspect, a magnetic impeller in accordance with one or more embodiments described herein can be non-superconducting. As used herein, "non-superconducting" refers to a magnetic impeller which does not incorporate or otherwise use a superconducting element to induce levitation or rotation. In fact, a particular advantage in accordance with one or more of the embodiments described herein is that the magnetic impeller can levitate, in particular, aerodynamically levitate, at low speeds without the need or use of superconducting elements, which are extremely costly and require ultra cold temperatures (e.g., −183° C.) to induce a superconducting field.

In a further aspect, a magnetic impeller in accordance with one or more embodiments described herein can include a foldable blade element. In a particular embodiment, the magnetic impeller can have a first configuration and a second configuration, where the magnetic impeller is adapted to have a narrower profile in the first configuration than the second configuration. A particular advantage in accordance with one or more of the embodiments described herein is that the magnetic impeller can be positioned within a vessel having an opening defining a diameter that is less than the diameter of the foldable blade element in the operating configuration.

In yet another aspect, a magnetic impeller in accordance with one or more embodiments described herein can include a blade adapted to change shape, orientation, size, or characteristic upon being rotatably engaged. In a particular embodiment, a major surface of the blade can increase in width during rotation. In another embodiment, the blade can include at least one opening extending through the blade adjacent to a leading or trailing edge thereof. In a further embodiment, the blade can be flexible. A particular advantage in accordance with one or more embodiments described herein, is that a blade adapted to change upon being rotatably engaged can be adapted to provide varying mixing characteristics upon varying rotational speeds.

In yet a further aspect, a magnetic impeller in accordance with one or more embodiments described herein can include a magnetic impeller having a cage at least partly bounding a blade. In accordance with one or more embodiments, a cage can improve the stability of the magnetic impeller and prevent disengagement of the magnetic coupling between the magnetic impeller and a magnetic drive. Further, embodiments of the present disclosure may enable consistent mixing action with a low variability of the blade speed during mixing.

In yet another aspect, a magnetic impeller in accordance with one or more embodiments described herein can include a magnetic impeller disposed, or adapted to be disposed, within a flexible, or partly flexible, vessel. In a particular embodiment, the flexible vessel can include a flexible surface and a rigid surface. In a further embodiment, the rigid surface can be disposed on a bottom wall of the vessel. In a particular embodiment, the rigid surface can be substantially planar. The magnetic impeller can be physically decoupled from the flexible vessel. In such a manner, the magnetic impeller can rotatably operate along a surface of the flexible vessel.

Referring now to the figures, FIGS. 1 to 9B include a magnetic impeller 100 in accordance with one or more embodiment described herein. The magnetic impeller 100 can generally include a rotatable element 102 rotatably coupled to an impeller bearing 104 along a axis of rotation $A_R$. The rotatable element 102 can have a first surface 108 and a second surface 110 disposed opposite the first surface 108. The rotatable element 102 can be rotatably urged in order to impart a mixing action into a fluid surrounding the magnetic impeller 100.

In a particular embodiment, the rotatable element 102 can include a hub 112 and a plurality of blades 114 extending radially from the hub 112. The blades 114 can extend perpendicular to the hub 112 or at a relative angle thereto, e.g., an angle other than 90 degrees with relation to an outer surface of the hub 112. The blades 114 of the rotatable element 102 may extend outward from the hub 112 a length, $L_B$, as measured by a longest length of the blade 114. The length, $L_B$, can vary between the blades 114, however, in a particular embodiment, the length, LB, is the same between all of the blades 114. In a particular embodiment, the blades 114 can be substantially rectilinear when viewed from a top view so as to form a substantially rectilinear major surface 116. In another embodiment, the blades 114 can have an arcuate or otherwise polygonal configuration when viewed from a top view.

In a particular embodiment, the magnetic impeller 100 can include at least 2 blades, such as at least 3 blades, at least 4 blades, at least 5 blades, at least 6 blades, at least 7 blades, at least 8 blades, at least 9 blades, or even at least 10 blades. In a further embodiment, the magnetic impeller 100 can include no greater than 20 blades, such as no greater than 15 blades, no greater than 10 blades, no greater than 9 blades, no greater than 8 blades, no grater than 7 blades, no greater than 6 blades, no greater than 5 blades, or even no greater than 4 blades. In a more preferred embodiment, the magnetic impeller 100 can include 4, 5, or even 6 blades 114. The blades 114 can be staggered around the hub 112 at even increments, e.g., so that the magnetic impeller 100 can be rotationally symmetrically.

In a particular embodiment, at least one of the blades 114 can have a density that is less than a density of the fluid into which the magnetic impeller 100 is to be disposed. In such a manner, the blades 114 can be more buoyant than the fluid. In an alternative embodiment, the blades 114 can have a density that is greater than the density of the fluid being mixed. In yet another embodiment, the blades 114 can have a substantially similar density as the density of the fluid being mixed.

The major surface 116 of each blade 114 can have a width, $W_B$, as defined by the distance between a leading edge 118 of the blade 114 and a trailing edge 120 of the blade 114, when viewed from a top view. In a particular embodiment, a ratio of $L_B/W_B$ can be at least 1, such as at least 2, at least 3, at least 4, at least 5, at least 6, at least 7, at least 8, at least 9, or even at least 10. A blade surface area, $SA_B$, can be defined by the surface area of the major surface 116 of the blade 114 as measured by $L_B$ and $W_B$.

Figure 3:
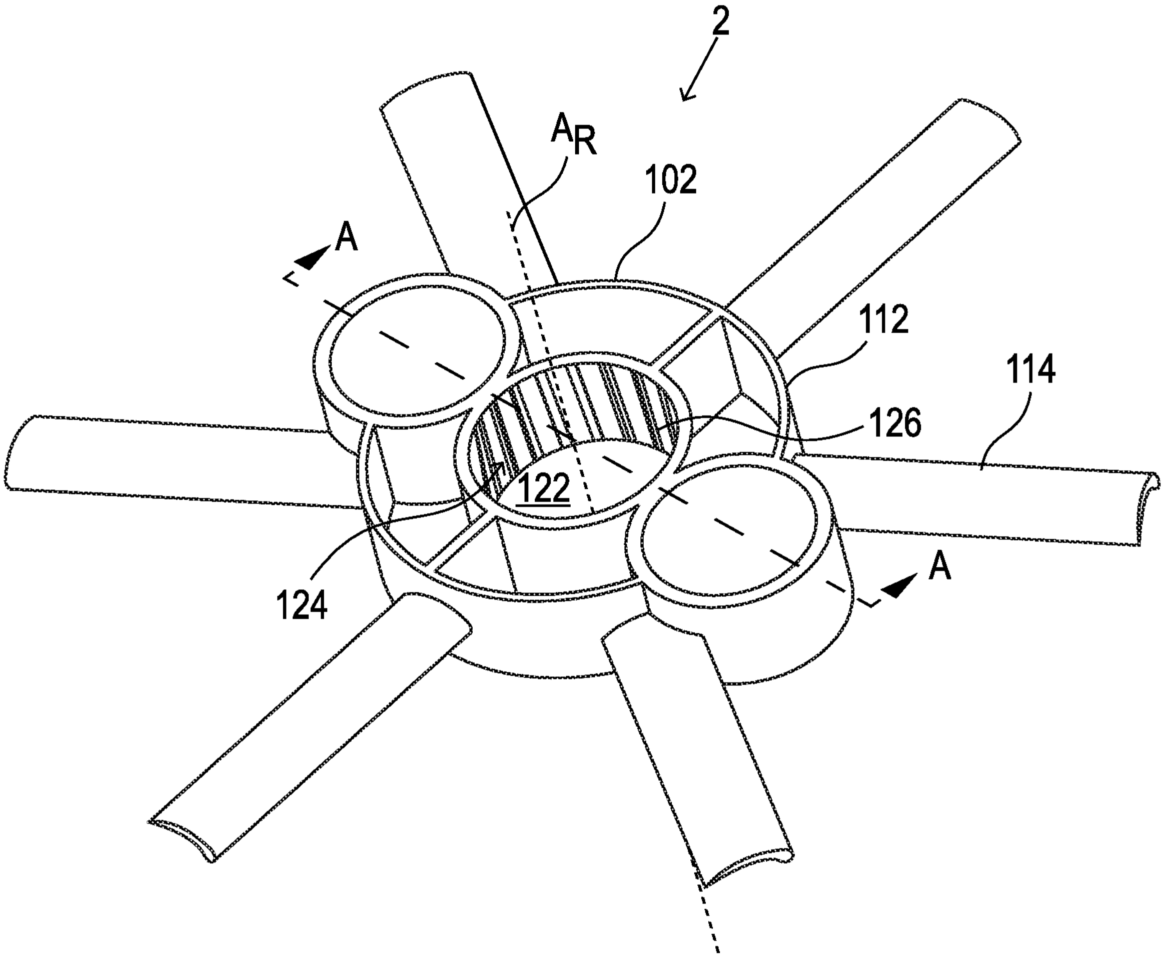
FIG. 3 includes a perspective view of a magnetic impeller in accordance with an embodiment.
Figure 4:
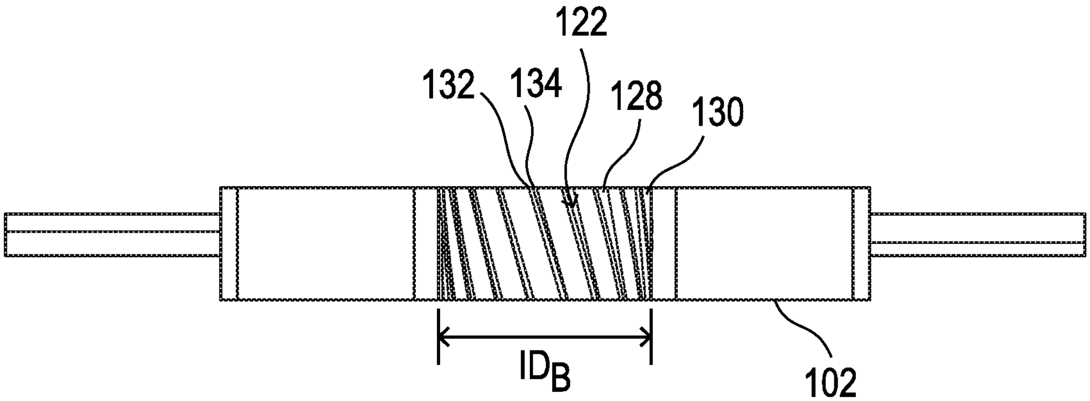
FIG. 4 includes a cross-sectional side view of a magnetic impeller in accordance with an embodiment taken along Line A-A in FIG. 3.

As shown in FIGS. 3 and 4, the rotatable element 102 can have an inner bore 122 defining an interior surface 124 oriented parallel with the axis of rotation $A_R$. The bore 122 can extend through the height of the rotatable element 102. The bore 122 can also define an inner diameter, $ID_B$, of the rotatable element 102.

The interior surface 124 of the rotatable element 102, as defined by the bore 122, can have a pump gear 126 having a plurality of flutes 128, or channels, therein. The flutes 128 can increase and directionally channel a fluid flow through the pump gear 126 while simultaneously assisting in the generation of a hydrodynamic bearing surface between the interior surface 124 and the impeller bearing 104.

In a particular embodiment, the pump gear 126 can have at least 1 flute per inch (FPI), such as at least 2 FPI, at least 3 FPI, at least 4 FPI, at least 5 FPI, at least 10 FPI, or even at least 20 FPI. Moreover, in a further embodiment, the pump gear 126 can have no more than 100 FPI, such as no more than 80 FPI, no more than 60 FPI, or even no more than 40 FPI.

In a particular embodiment, the flutes 128 can be oriented substantially parallel with the axis of rotation $A_R$, or can be angled relative therewith. The angle, $A_F$, as defined by the angle between the flutes 128 and the axis of rotation $A_R$, can be at least 2 degrees, such as at least 3 degrees, at least 4 degrees, at least 5 degrees, at least 10 degrees, at least 15 degrees, or even at least 20 degrees. The selected angle, $A_F$, can impact internal fluid flow through the pump gear 126, as will be apparent to one having ordinary skill in the art. Flutes having a larger $A_F$ can create an increased fluid flow through the pump gear 126, thereby enhancing mixing efficiency by moving the fluid within a vessel more rapidly.

The flutes 128 can define a radial depth, $D_F$, as measured by a distance the flutes 128 extend radially outward from the interior surface 124 of the rotatable element 102. The flutes 128 can extend radially outward from the interior surface 124 and terminate at a flute base 130. The flute base 130 can be formed from a flat surface spanning between two substantially parallel sidewalls 132, 134.

Alternatively, the flute base 130 may be formed from the interference between two angled sidewalls 132, 134 at a point of juncture. As will become apparent to one having ordinary skill in the art, the flute base 130 may also comprise any other similar profile sufficient to generate a pressure gradient within the magnetic impeller 100. For example, the flute base 130 can be arcuate, triangular, ridged, or have any other similar geometric shape. It is to be understood that the pump gear 126 and the flutes 128 are optional. In a non-illustrated embodiment, each of the components of the magnetic impeller 100, e.g., the interior surface 124, can be smooth, or otherwise devoid of corrugations, bumps, projections, or any combination thereof.

Figure 5:
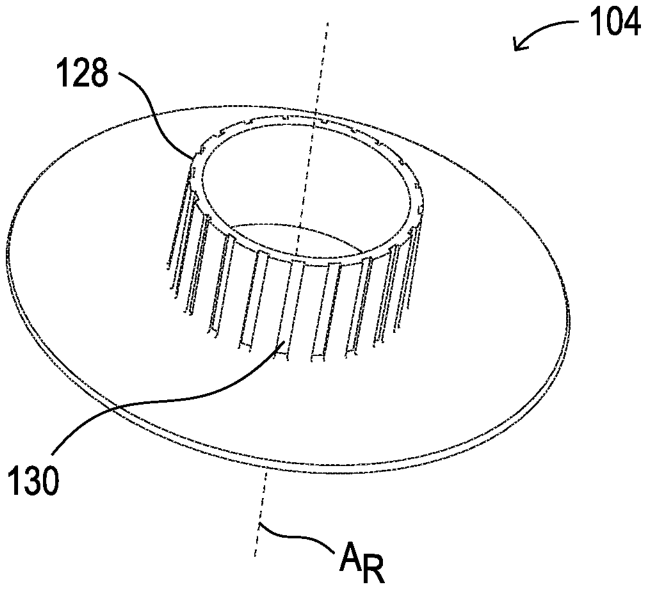
FIG. 5 includes a perspective view of an impeller bearing in accordance with an embodiment.

Referring to FIG. 5, an outer surface of the impeller bearing 104 can contain a plurality of flutes 128. These flutes 128 may have any shape recognizable in the art sufficient to generate a fluid flow upon rotation. In a particular embodiment, the outer surface of the impeller bearing 104 can have at least 1 flute per inch (FPI), at least 2 FPI, at least 3 FPI, at least 4 FPI, at least 5 FPI, at least 10 FPI, or even at least 20 FPI.

The flutes 125 can be oriented parallel with the axis of rotation, $A_R$, or can be angled relative therewith. The flute angle, $A_F$, as defined by the angle between the flutes 50 and the axis of rotation $A_R$, can be at least 2 degrees, at least 3 degrees, at least 4 degrees, at least 5 degrees, at least 10 degrees, at least 15 degrees, or even at least 20 degrees. The selected angle, $A_F$, can affect fluid flow, as will be apparent to one having ordinary skill in the art will readily understand from the discussion above.

Further, the flutes 128 can have a radial depth, $D_F$, as defined by the distance the flutes 128 extend radially inward from the outer surface of the impeller bearing 104. The flutes 128 can extend radially inward from the outer surface of the impeller bearing 104 and can terminate at a flute base 130. The flutes 128 disposed on the impeller bearing 104 can have any similar number of features or characteristics as the flutes 128 disposed on the rotatable element 102.

In one aspect, a ratio of the flutes 128 on the impeller bearing 104 to the flutes 128 on the rotatable element 102 may be at least 1, at least 5, at least 10, at least 50, at least 100, at least 500, or even at least 1000. In another aspect, the ratio of the flutes 128 on the impeller bearing 104 to the flutes 128 on the rotatable element 102 may be no greater than 1.0, no greater than 0.5, no greater than 0.2, no greater than 0.1, no greater than 0.05, no greater than 0.005, or even no greater than 0.0005.

Figures 9A, 9B:
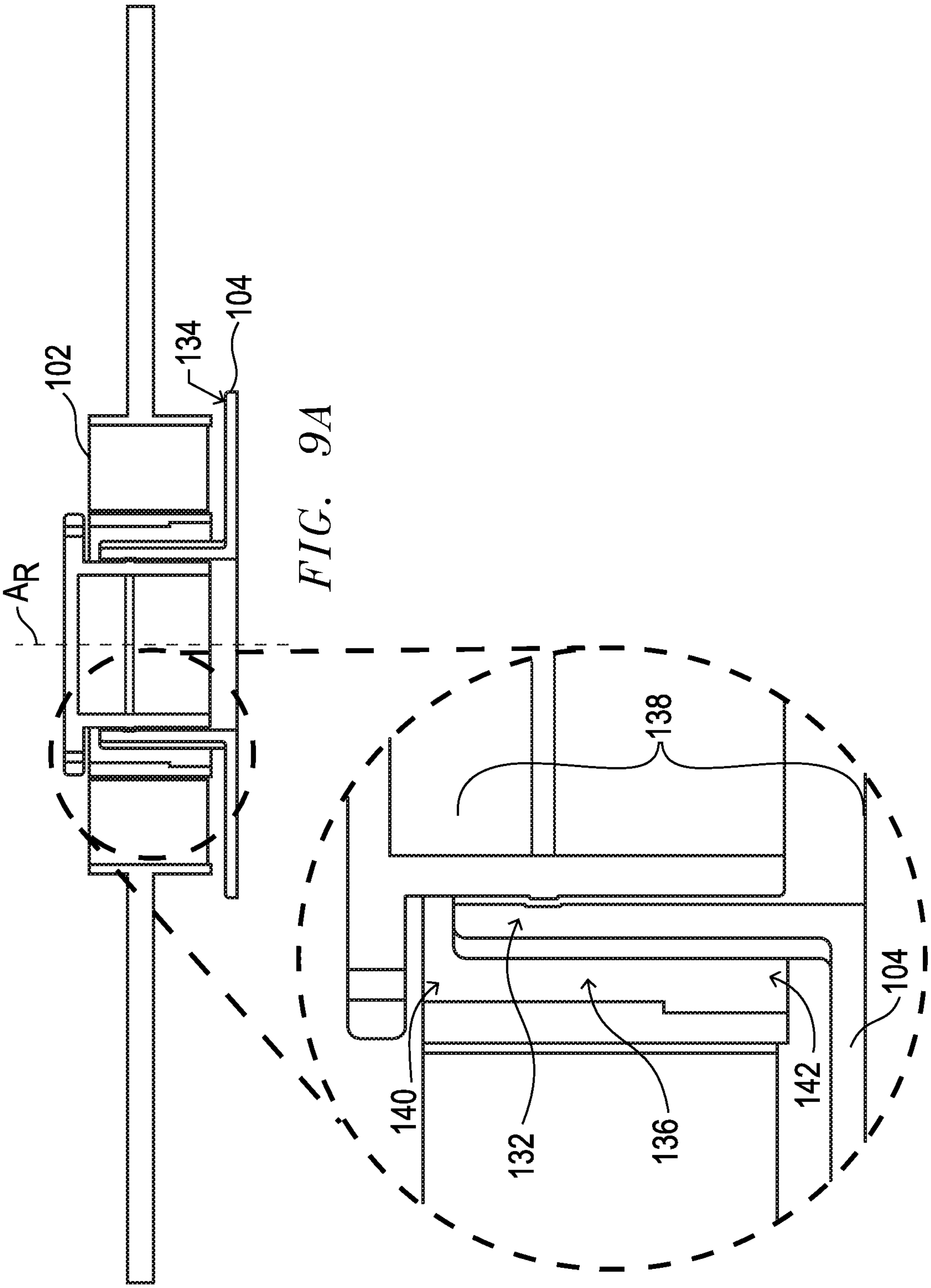
FIG. 9A includes a cross-sectional view of a magnetic impeller in accordance with an embodiment.
FIG. 9B includes an enlarged cross-sectional view of a portion of a magnetic impeller in accordance with an embodiment.

As illustrated in FIGS. 9A and 9B, the rotatable element 102 can be engaged with a column 132 of the impeller bearing 104. The bore 130 of the rotatable element 102 can have an inner diameter, and the column 132 of the impeller bearing 104 can have an outer diameter, where the inner diameter of the rotatable element 102 is greater than the outer diameter of the column 132 such that the column 132 can be freely inserted into the bore 130 along the axis of rotation $A_R$. In such a manner, the impeller bearing 104 can slide toward and through the rotatable element 102 until the first impeller surface 134 makes contact with and sits approximately flush against the rotatable element 102.

In a particular aspect, the column 132 can have an outer diameter, $OD_C$, as measured perpendicular to the axis of rotation, $A_R$. The inner diameter of the rotatable element 102 can be no less than 1.01 $OD_C$, such as no less than 1.02 $OD_C$, no less than 1.03 $OD_C$, no less than 1.04 $OD_C$, no less than 1.05 $OD_C$, no less than 1.10 $OD_C$, no less than 1.15 $OD_C$, no less than 1.20 $OD_C$, or even no less than 1.25 $OD_C$. Further, the inner diameter of the rotatable element 102 can be no greater than 1.5 $OD_C$, such as no greater than 1.45 $OD_C$, no greater than 1.4 $OD_C$, no greater than 1.35 $OD_C$, no greater than 1.3 $OD_C$, no greater than 1.25 $OD_C$, no greater than 1.2 $OD_C$, or even no greater than 1.15 $OD_C$. In such a manner, an annular cavity 136 can be created in the space defined between the column 132 and interior surface 124 of the rotatable element 102.

In a particular embodiment, the annular cavity 136 can define a passageway for the passage of a fluid layer between the impeller bearing 104 and the rotatable element 102. As the rotatable element 2 is rotated around the axis of rotation, $A_R$, the combination of flutes 128 can draw fluid through the annular cavity 136, providing a fluid bearing 138 therebetween. As such, the relative coefficient of kinetic friction, $\mu_k$, as measured between the impeller bearing 104 and the rotatable element 102, can be less than the relative coefficient of static friction, $\mu_s$, as measured between the impeller bearing 104 and the rotatable element 102. In one embodiment, a ratio of $\mu_s/\mu_k$ can be at least 1.2, such as at least 1.5, at least 2.0, at least 3.0, at least 5.0, at least 10.0, at least 20.0, or even at least 50.0. However, in a further embodiment, $\mu_s/\mu_k$ can be no greater than 150.0, such as no greater than 125.0, or even no greater than 100.0.

In another aspect, a fluid can be drawn through the annular cavity 136 upon formation of a relative pressure differential between a first opening 140 of the fluid bearing 138 and a second opening 142 of the fluid bearing 138. As such, a first pressure, $P_1$, can be generated at the first opening 140 of the fluid bearing 138, and a second pressure, $P_2$, can be generated at the second opening 142 of the fluid bearing 138. The resulting pressure gradient between $P_1$ and $P_2$ can cause fluid flow through the annular cavity 136.

In a particular aspect, a ratio of $P_1/P_2$ may be at least 1, at least 2, at least 5, at least 10, at least 15, or even at least 20. As the ratio of $P_1/P_2$ increases, the fluid flow rate within the annular cavity 126 can increase. This in turn can reduce $\mu_k$ and increase the operational efficiency of the magnetic impeller 100.

In a particular aspect, the fluid bearing 138 can be adapted to provide a fluid flow layer, e.g., a hydrodynamic bearing, within the annular cavity 136 at a relative rotational speed between the impeller bearing 104 and the rotatable element 102 of less than 65 revolutions per minute (RPM), such as less than 60 RPM, less than 55 RPM, less than 50 RPM, less than 45 RPM, less than 40 RPM, less than 35 RPM, less than 30 RPM, less than 25 RPM, less than 20 RPM, less than 15 RPM, less than 10 RPM, or even less than 5 RPM. In an embodiment, the fluid bearing 138 can provide a fluid flow layer, e.g., a hydrodynamic bearing, within the annular cavity 136 at a relative rotational speed of no less than 0.1 RPM, such as no less than 0.5 RPM, no less than 1 RPM, or even no less than 2 RPM.

In a particular embodiment, the annular cavity 136 can have a minimum radial thickness, $T_{ACMIN}$, as measured at a first location within the annular cavity 136 in a direction perpendicular to the axis of rotation, $A_R$, and a maximum radial thickness, $T_{ACMAX}$, as measured at a second location within the annular cavity 136 in a direction perpendicular to the axis of rotation, $A_R$. In a particular embodiment, a ratio of $T_{ACMIN}/T_{ACMAX}$ can be at least 1.1, at least 1.2, at least 1.3, at least 1.4, at least 1.5, at least 1.6, at least 1.7, at least 1.8, at least 1.9, or even at least 2.0. A large ratio of $T_{ACMIN}/T_{ACMAX}$ can indicate the use of flutes 128 having a large $D_F$, e.g., the flutes 128 extend a greater distance from the interior surface 124. This can facilitate an increased fluid layer flow between the rotatable element 102 and impeller bearing 104, which in turn can reduce the coefficient of kinetic friction, $\mu_k$.

In a particular embodiment, one or more components of the impeller bearing 104 can include a polymer layer formed along an outer surface thereof. Exemplary polymers can include a polyketone, polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof.

In an example, the polymer can include a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the polymer can include a polyketone, such as polyether ether ketone (PEEK), polyether ketone, polyether ketone ketone, polyether ketone ether ketone, a derivative thereof, or a combination thereof. In an additional example, the polymer may be ultra high molecular weight polyethylene.

An example fluoropolymer can include a fluorinated ethylene propylene (FEP), a PTFE, a polyvinylidene fluoride (PVDF), a perfluoroalkoxy (PFA), a terpolymer of tetrafluoroethylene, hexafluoropropylene, and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Inclusion of the polymer layer on the outer bearing surface may increase longevity of the magnetic impeller 100, and may additionally decrease friction therein. Furthermore, the polymer layer may increase relative inertness of the impeller bearing 104 within a fluid.

In a particular embodiment, the interior surface 124 of the rotatable element 102 can additionally include a polymer layer to facilitate translation of the rotatable element 102 on the column 132 and to enhance inertness. The selected polymer may at least partially include, for example, a polytetrafluoroethylene (PTFE), a polyvinylidene fluoride (PVDF), a polyaryletherketone (PEEK), or any combinations thereof.

Figure 6:
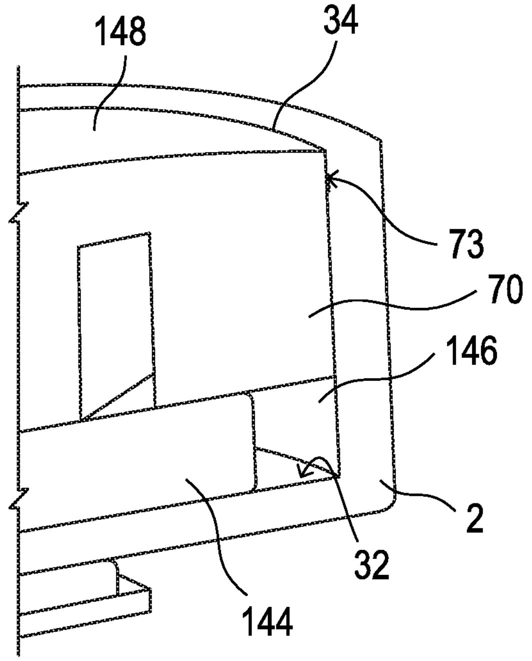
FIG. 6 includes a cross-sectional perspective view of a cavity formed in magnetic impeller in accordance with an embodiment.
Figure 7:
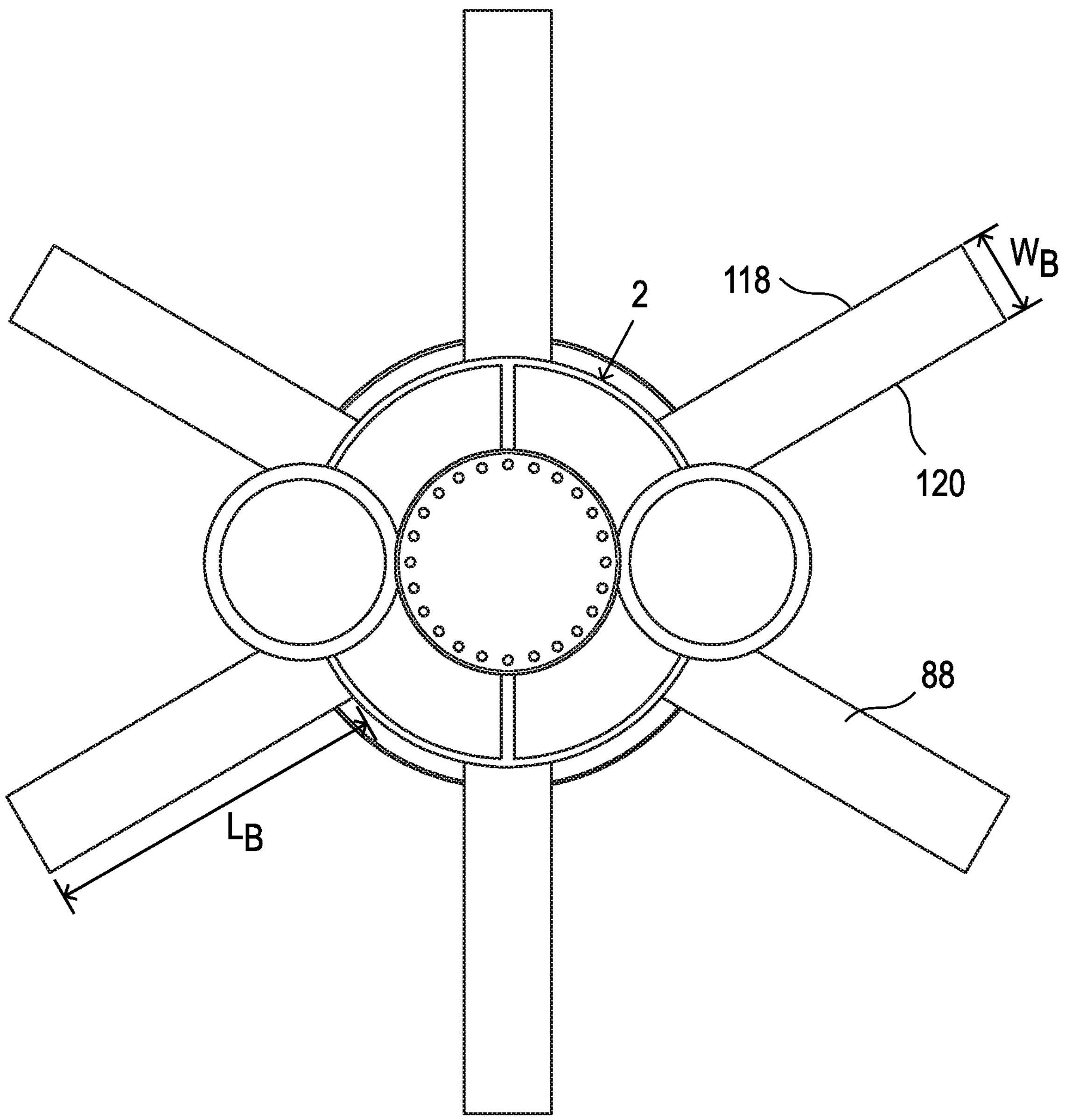
FIG. 7 includes a top plan view of a magnetic impeller in accordance with an embodiment.

As indicated in FIG. 6, the rotatable element 102 can further include a magnetic member 144 at least partially disposed in a cavity 146 of the rotatable element 102. The magnetic member 144 can include any magnetic, partially magnetic, or ferromagnetic material. The magnetic member 144 only needs to be capable of coupling with a magnetic field supplied by a drive magnetic (not shown). Accordingly, in a particular embodiment, the magnetic member 144 may be ferromagnetic and selected from the group consisting of a steel, an iron, a cobalt, a nickel, and a rare earth magnet. In a further embodiment, the magnetic member 144 can be selected from any other magnetic or ferromagnetic material as would be readily recognizable in the art. In particular embodiments, the magnetic member 144 can be a neodymium magnet. In further particular embodiments, the magnetic drive (illustrated for example in FIG. 57) can include a neodymium magnet. In very particular embodiments, both the magnetic member in the rotatable element and the magnetic member in the magnetic drive can include neodymium magnets. A particular advantage of certain embodiments of the present disclosure is the discovery that at least one of and even both of the magnetic element within the rotatable element and the magnetic element within the magnetic drive can have a magnetic coupling that greatly reduces the risk of decoupling during operation. Moreover, in certain embodiments, the blades can be adapted to provide lift to the rotatable element which can overcome the increase friction between the rotatable element and the surface it is rotating on due to the stronger magnetic coupling.

In a particular embodiment, the magnetic member 144 can have a mass, $M_{ME}$, in grams, and the drive magnet can have a power, $P_{DM}$, as characterized by its magnetic flux density, and as measured in teslas. In a particular embodiment, a ratio of $P_{DM}/M_{ME}$ can be at least 1.0 g/tesla, such as at least 1.2 g/tesla, at least 1.4 g/tesla, at least 1.6 g/tesla, at least 1.8 g/tesla, at least 2.0 g/tesla, at least 2.5 g/tesla, at least 3.0 g/tesla, or even at least 5.0 g/tesla. In a particular embodiment, as the mass of the magnetic member 144 increases, the power required from the drive magnet can decrease.

In a further embodiment, the magnetic member 144 can further comprise a plurality of magnetic members disposed around the axis of rotation $A_R$ of the rotatable element 102.

In a particular embodiment, a cap 148 may be placed in an opening of the cavity 146 to form an interference fit and contain the magnetic member 144 within the cavity 146. In another embodiment, the cap 148 may be hermetically sealed to the opening of the cavity 146. In yet another embodiment, the cap 148 may be threadably engaged to the opening of the cavity 146 by a corresponding threaded structure. In another embodiment, the cap 148 can include a gasket which forms an interference fit with the opening of the cavity 146. The gasket may include one sealing ring extending around the cap 148 or any number of sealing rings substantially parallel therewith. The gasket can also be angled relative to the outer surface of the cap 148. In yet another embodiment, the cap 148 can be overmolded over the opening of the cavity 146. In yet a further embodiment, the cap 148 may be sealed to the opening of the cavity 146 by any other readily recognizable method for joining two members.

In a further embodiment, the cap 148 can include a spacer 150. The spacer 150 may extend from the cap 148 to engage with and secure the magnetic member 144. The spacer 150 can be sized to substantially fill the volume within the cavity after the magnetic member 144 has been disposed of therein. In a particular embodiment, the spacer 150 may be integral with the cap 148.

In one embodiment, the spacer 150 or cap 148 can be formed from a high density material that is substantially incompressible. In such a manner, the spacer 150 can be sized to fit in the cavity to generate compression between the cap 148 and the magnetic member 144. In another embodiment, the spacer 150 can be a compressible material that is sized to be larger than the cavity. Upon application of the cap 144 within the cavity 146, the spacer 150 can compress, generating enhanced security and stability of the magnetic member 144.

Compression between the spacer 150 and magnetic member 144 can reduce relative vibration of the magnetic member 144 within the cavity, while simultaneously reducing unwanted wobble and oscillation of the rotatable element 102 during operation. Additionally, reduced vibration of the magnetic member 144 can facilitate enhanced engagement of the magnetic member 144 with an external drive magnet (not shown). This in turn, can increase efficiency of the magnetic impeller 100 by reducing unwanted disconnect between the magnetic member 144 and the drive magnet (not shown).

Referring again to FIGS. 1 and 2, the magnetic impeller 100 can further include a plug 152. The plug 152 can be adapted to retain the rotatable element 102 on the impeller bearing 104. The plug 152 can include a substantially hollow axial member adapted to engage with the column 132 of the impeller bearing 104.

In a particular aspect, the impeller bearing 104 can include a cutout extending into the column 132. The axial member of the plug 152 can be inserted into the cutout until a portion of the column 132 makes contact with a portion of the plug 152.

In a particular aspect, the plug 152 can form an interference fit with the column 132. In this, and other embodiments, the plug 152 can be removable from the column 132. After the rotatable element 102 has been inserted onto the impeller bearing 104, the plug 152 can be inserted into the column 132 so as to prevent the rotatable element 102 from axially decoupling therefrom.

Further, the plug 152 can include a plurality of holes 154 adapted to block large debris within the fluid from entering the fluid bearing 138.

Figure 8:
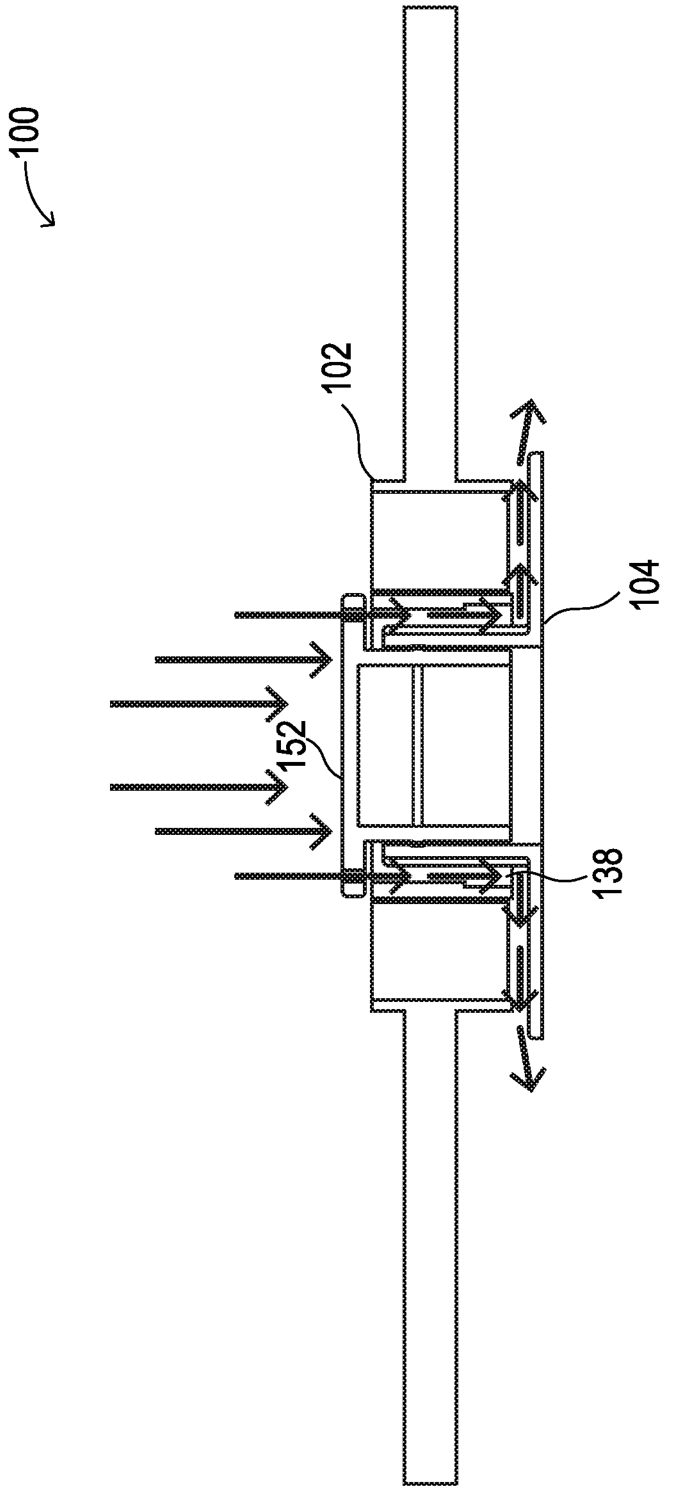
FIG. 8 illustrates a cross-sectional side view of fluid flow within a magnetic impeller in accordance with an embodiment.

As illustrated in FIG. 8, in operation fluid can be drawn through the plug 152 and into the fluid bearing 138. The plug 152 may include one or more holes 154 adapted to permit passage of fluid therethrough. In such a manner, the fluid can pass between the rotatable element 102 and the impeller bearing 104 and can be dispersed in a radially outward direction.

Figure 10:
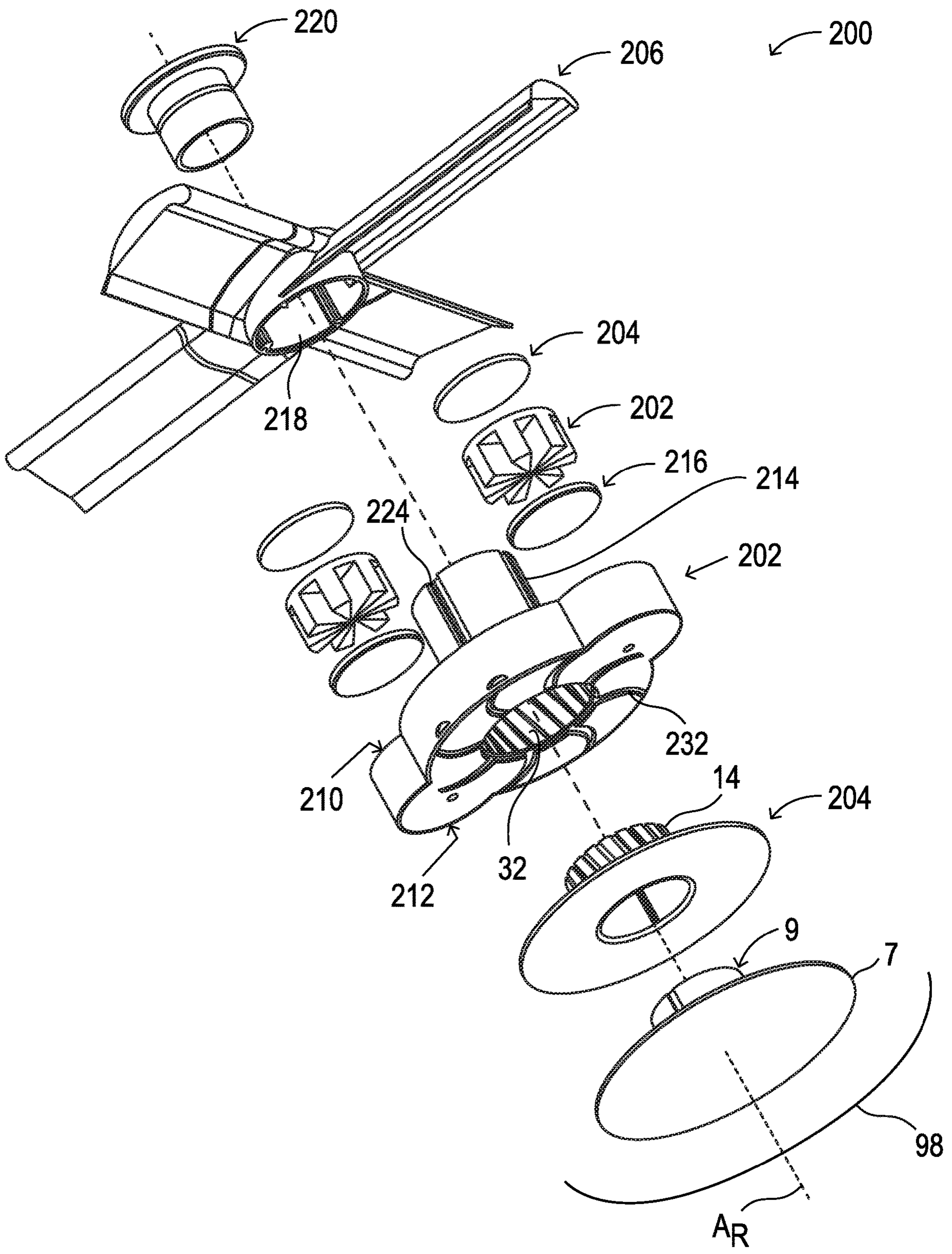
FIG. 10 includes an exploded perspective view of a magnetic impeller in accordance with an embodiment.

FIG. 10 illustrates an embodiment in accordance with an alternative magnetic impeller 200 which includes blades 206 axially decoupled from a rotatable element 202. The magnetic impeller 200 can include a rotatable element 202 rotatably decoupled from an impeller bearing 204 along an axis of rotation, $A_R$, and axially decoupled therefrom. The rotatable element 202 can act as an intermediary between the impeller bearing 204 and the blades 206. The rotatable element 202 can rotate relative to the impeller bearing 204. The rotatable element 202 can define a first surface 210 and a second surface 212. A post 214 can extend from the first surface 210 of the rotatable element 202 and can extend along the center axis of rotation 208, a distance $H_P$. The post 214 can have any geometric arrangement, but preferably comprises a generally cylindrical shape having a diameter, $D_P$.

The rotatable element 202 can include a cavity into which a magnetic member 216 can be received. The magnetic member 216 can include any magnetic, partially magnetic, or ferromagnetic material. The magnetic member 216 only needs to be capable of coupling with a magnetic field supplied by a driving magnetic (not shown). Accordingly, the magnetic member 216 may be ferromagnetic and selected from the group consisting of a steel, an iron, a cobalt, a nickel, and a rare earth magnet. Further, the magnetic member 216 can be selected from any other magnetic or ferromagnetic material as would be readily recognizable in the art.

In a particular embodiment, the magnetic member 216 can have a mass, $M_{ATE}$, in grams, and the driving magnet can have a power, $P_{DM}$, as characterized by its magnetic flux density and measured in teslas. A ratio of $P_{DM}/M_{ME}$ can be at least 1.0 g/tesla, at least 1.2 g/tesla, at least 1.4 g/tesla, at least 1.6 g/tesla, at least 1.8 g/tesla, at least 2.0 g/tesla, at least 2.5 g/tesla, at least 3.0 g/tesla, or even at least 5.0 g/tesla. As the mass of the magnetic member 216 increases, the power required from the driving magnet to remain magnetically coupled to the magnetic member 216 can decrease.

The magnetic member 216 can further comprise a plurality of magnetic members disposed around the center axis of rotation 208 of the rotatable element 102. For example, as illustrated in FIG. 10, the rotatable element 102 can house two magnetic members 216 disposed in rotational symmetry around the post 214.

In accordance with one or more embodiments, the blades 206 can include a hub 218 extending between the blades 206.

In a particular embodiment, the blades 206 can define a mass, $F_B$, with the resultant force oriented substantially parallel with the axis of rotation, $A_R$. The blades 206 can also be adapted to generate a lifting force, $F_L$. In a particular aspect, the blades can be adapted to translate away from the rotatable element 202 when the magnitude of $F_L$ reaches a magnitude that is greater than the magnitude of $F_B$.

In a particular embodiment, the post 214 can extend from the rotatable element 202 along the axis of rotation, $A_R$. The post 214 can have a height, $H_P$, wherein the blades 206 are rotationally coupled to the post 214 along $H_P$. Additionally, the hub 218 of the blades 206 can have a height, $H_H$, as measured in a direction parallel with the axis of rotation, $A_R$. In a particular embodiment, the blades 206 can be adapted to translate along the post 214 a distance, $H_T$, wherein $H_T$ is equal to the difference between $H_P$ and $H_H$.

In a particular embodiment, the magnetic impeller 200 can further include a plug 220. The plug 220 can be adapted to retain the blades 206 on the post 214. The plug 220 can include a substantially hollow axial member adapted to engage with the post 214. The axial member can be inserted into the post 214 until a portion of the post 214 makes contact with a portion of the plug 220.

In a particular aspect, the plug 220 can form an interference fit with the post 214 such that the plug 220 can be removed from the post 214. After the blades 206 have been inserted onto the post 214, the plug 220 can be inserted into the post 214 so as to prevent the blades 206 from axially decoupling from the post 214.

Figure 11:
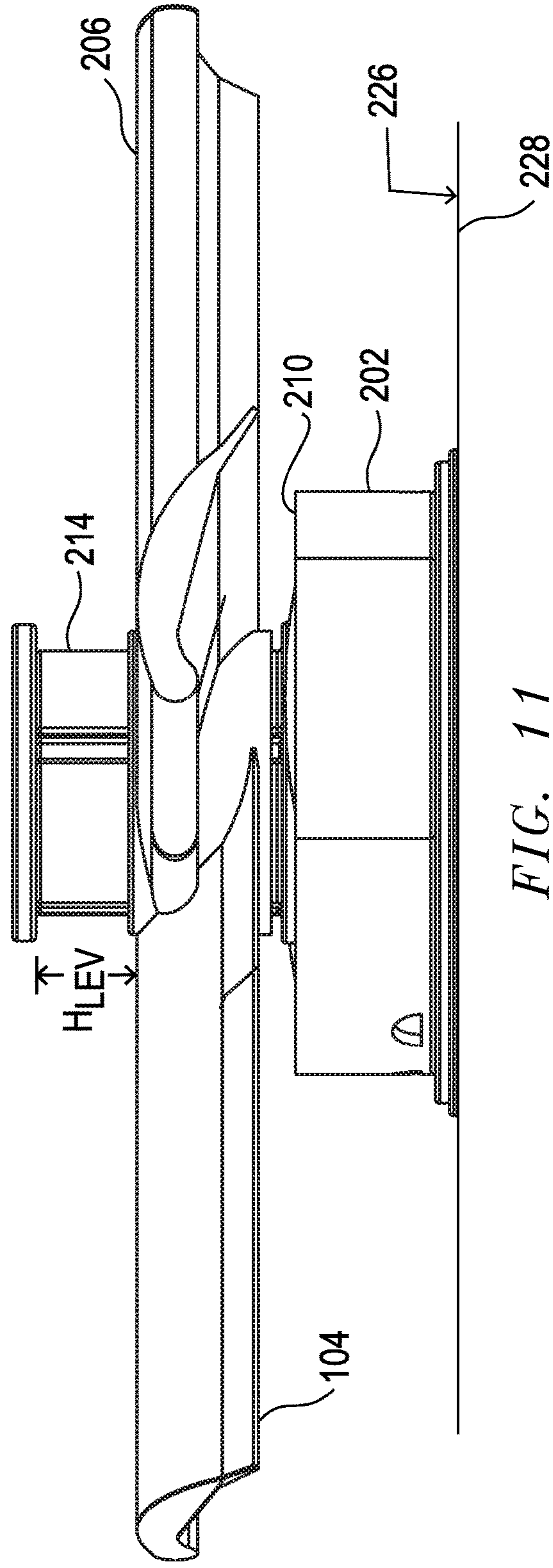
FIG. 11 includes a side plan view of a magnetic impeller prior to levitation of the magnetic impeller in accordance with an embodiment.

As illustrated in FIG. 10, the post 214 and the hub 218 can each contain one of a radial protrusion 222 and a radial recess 224. As illustrated in FIG. 11, the hub 218 can contain a protrusion 222 and the post 214 can contain a radial recess 224. Conversely, in a non-illustrated embodiment, the hub 218 can contain a radial recess 224 and the post 214 can contain a protrusion 222. The protrusion 222 and radial recess 224 can extend along the full length of the hub 218 and the full length of the post 214, allowing relative axial sliding between the hub 218 and post 214 along a distance, $H_{LEV}$. This distance, $H_{LEV}$, in turn can define a maximum attainable height of levitation that can be exhibited during rotational mixing operation.

In another non-illustrated embodiment, the post 214 can have a non-symmetrical cross-section. The hub 218 can have a substantially identical cross-section to the post 214. In such embodiment, the hub 218 can remain rotationally coupled to the post 214 during rotation, however the hub 218 can remain axially decoupled from the post 214 in a direction parallel with the center axis of rotation 208. This can allow the blades 206 to translate along the post 214 while simultaneously coupling the blades 26 rotationally to the post 214.

Figure 12:
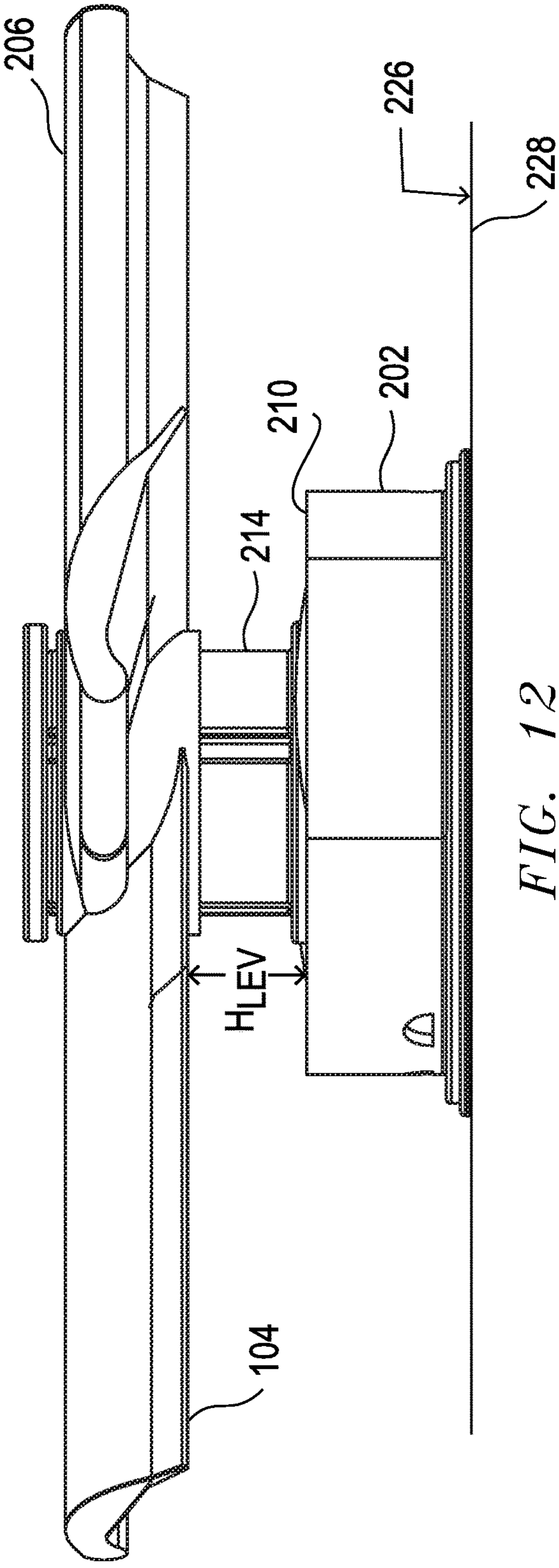
FIG. 12 includes a side plan view of a magnetic impeller during levitation of the magnetic impeller in accordance with an embodiment.

Referring to FIGS. 11 and 12, the blades 206 can translate along the post 214 a distance, $H_{LEV}$, while remaining rotationally coupled to the post 214. As the blades 206 are urged along the center axis of rotation 208, the blades 206 can be adapted to translate parallel therewith, or levitate away from the first surface 210 of the rotatable element 202. Levitation of the blades 206 can enable enhanced mixing of the fluid by optimizing the location of the blades 206 away from an inner surface 226 of a vessel 228.

In a particular aspect, the blades 206 can be adapted to levitate during operation at a speed of less than 900 revolutions per minute (RPM), such as at a speed of less than 800 RPM, less than 700 RPM, less than 600 RPM, less than 500 RPM, less than 400 RPM, less than 300 RPM, less than 200 RPM, less than 100 RPM, less than 75 RPM, or even less than 65 RPM. The blades 206 can further be adapted to levitate during operation at a speed of at least 10 RPM, such as at least 20 RPM, at least 30 RPM, at least 40 RPM, or even at least 50 RPM.

Figure 66:
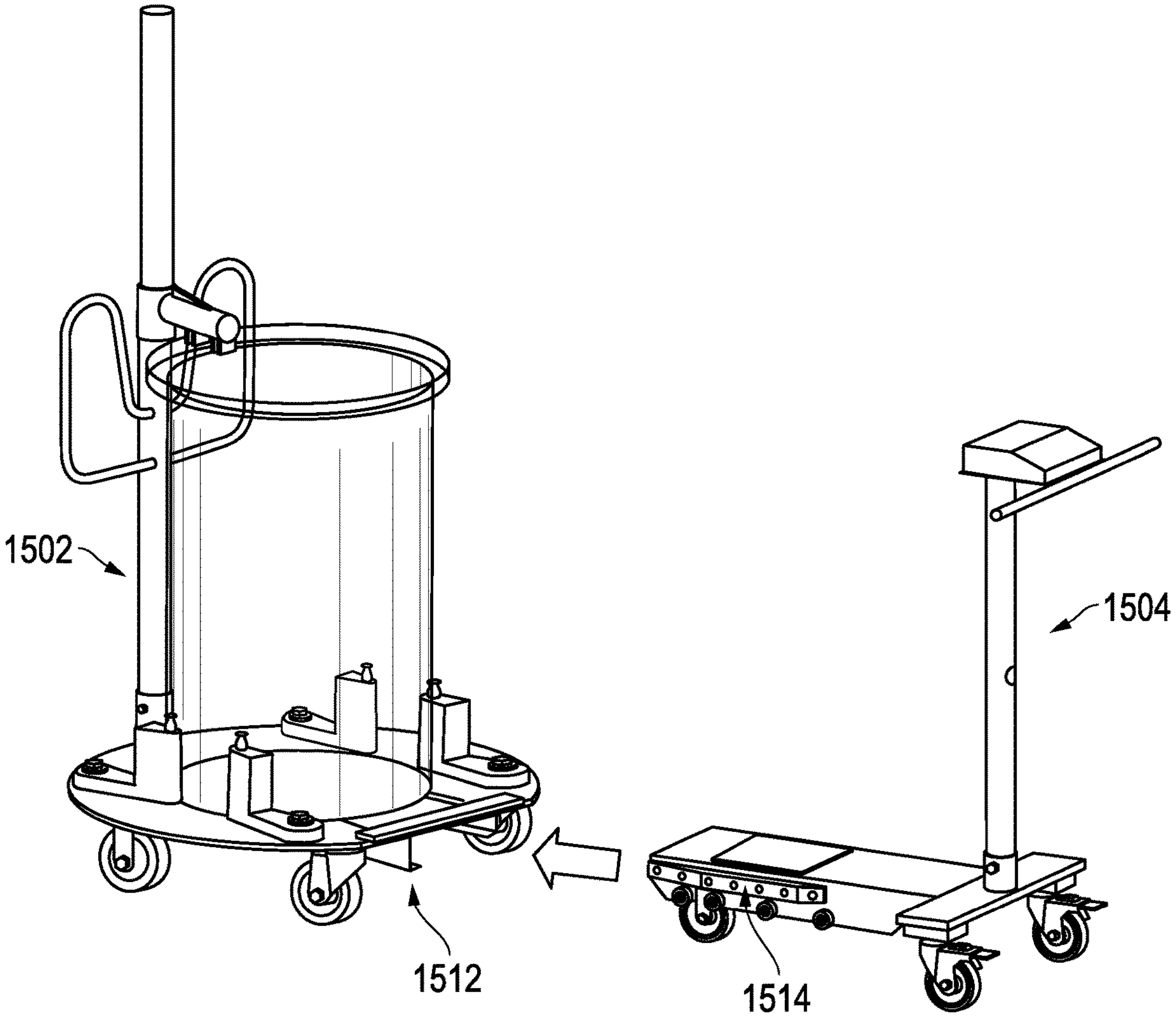
FIG. 66 includes a perspective view of a cart system in accordance with an embodiment, as seen prior to engagement of a first cart with a second cart.
Figure 67:
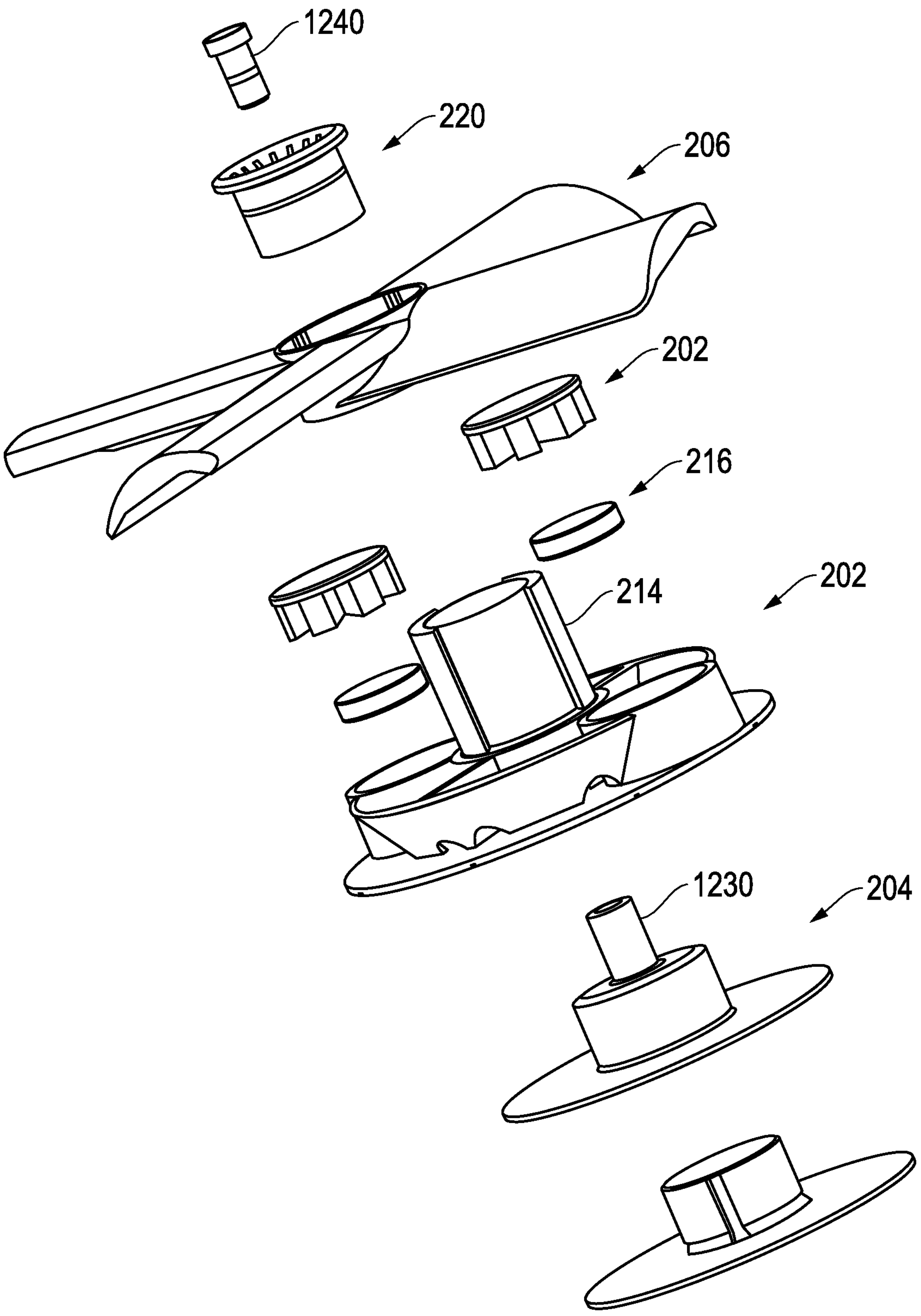
FIG. 67 includes an exploded perspective view of another magnetic impeller in accordance with an embodiment.

As illustrated in FIG. 66, the rotatable element 202 can have an internal cavity that extends through the post 214. Further, the impeller bearing 204 can include a central protrusion 1230. The central protrusion 1230 can extend further into the internal cavity of the rotatable element 202, such that the central protrusion 1230 extends into the internal cavity of the post 214. Further, a retainer 1240 can be disposed opposite the central protrusion 1230 and couple to the central protrusion 1230. This configuration can allow for greater fluid flow through the center of the assembly, for example as discussed below.

Figure 13:
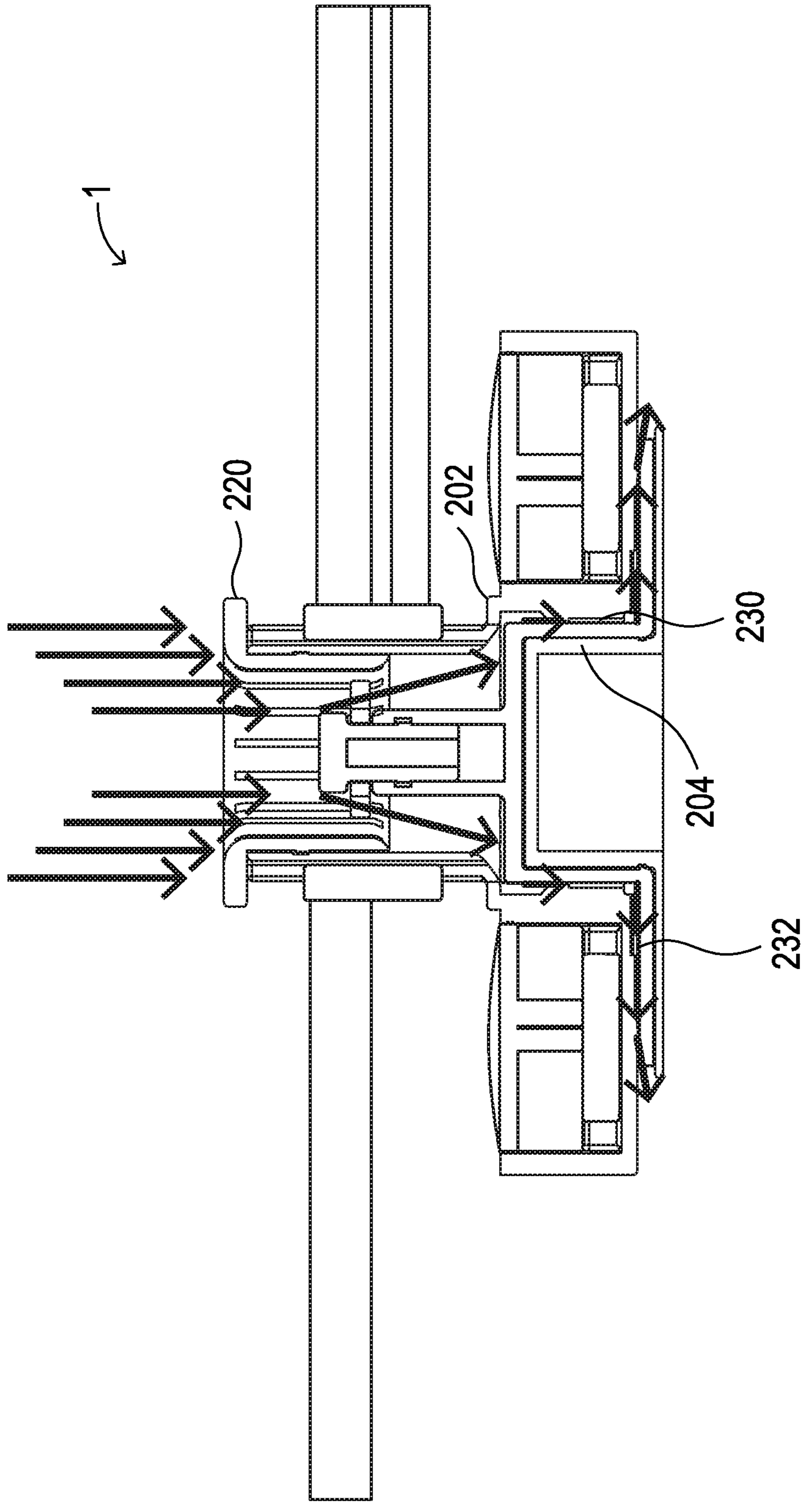
FIG. 13 includes a cross-sectional side view of fluid flow within a magnetic impeller in accordance with an embodiment.

During levitation of the blades 206, a fluid flow can be permitted through the fluid bearing formed between the hub 218 and the post 214. As illustrated in FIG. 13, and in accordance with one or more embodiments described herein, the fluid can be drawn through the plug 220 and into the fluid bearing 230. The fluid can pass between the rotatable element 202 and the impeller bearing 204 and can be dispersed outward from the fluid bearing by means of radial grooves 232.

The magnetic impeller 200 can be adapted to provide an enhanced mixing efficiency by axially decoupling the blades 206 from the rotatable element 202. In other words, the blades 206 can be capable of axially translating away from the rotatable element 202 while simultaneously maintaining rotational engagement therewith. In a particular aspect, decoupling of the blades 206 from the rotatable element 202 can allow for the blades 206 to translate towards the center of the vessel into which the magnetic impeller 200 is positioned, thereby reducing friction between the blades 206 and an inner wall of the vessel, while simultaneously allowing for enhanced magnetic coupling between the magnetic member 216 and the driving magnet. In this regard, decoupling of the blades 206 can enhance mixing efficiency.

Figure 14:
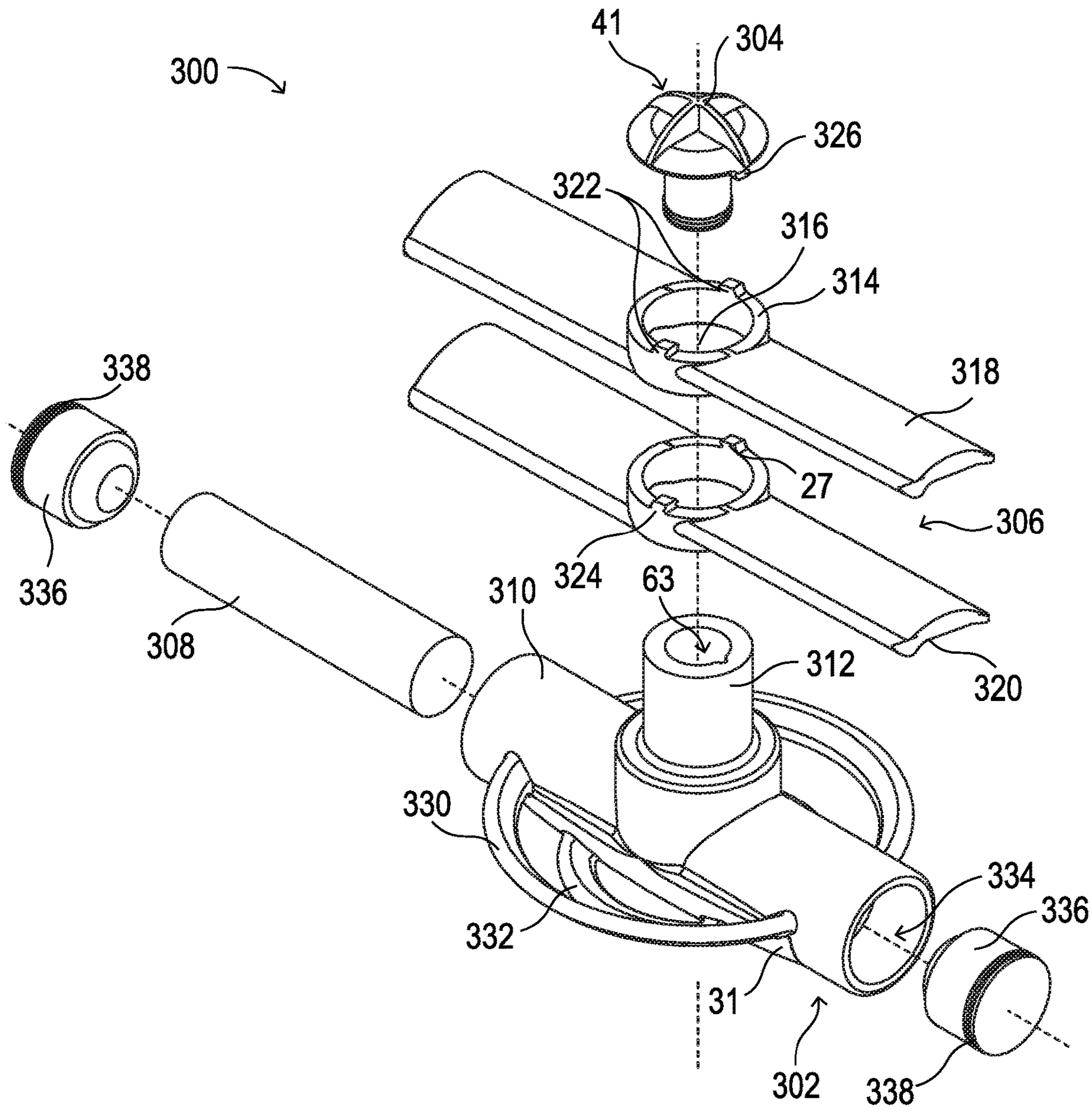
FIG. 14 includes an illustration of an exploded view of a magnetic impeller in accordance with an embodiment.

FIG. 14 illustrates an alternative magnetic impeller 300 which can be adapted to transition between a first configuration with a narrower profile and a second configuration with a wider profile. In such a manner, the magnetic impeller 300 can be inserted into a vessel having a narrow opening and expand once inside the vessel to a second configuration that provides increased mixing efficiency characteristics.

In a particular embodiment, the magnetic impeller 300 can generally include a plurality of blades 306, a rotatable element 302, a retention member 304, and a magnetic member 308.

The rotatable element 302 can include a body 310 and a post 312 which can extend from a surface of the body 310. In particular embodiments, the post 312 can extend generally perpendicular to a longest length of the body 310.

At least one of the plurality of blades 306, and in particular embodiments, at least two of the plurality of blades 306, can each have a hub 314 adapted to engage with the post 312. For example, as illustrated in FIG. 14, the hub 314 can define an aperture 316. The aperture 316 can have a diameter which is greater, and preferable slightly greater, than the diameter of the post 312. The retention member 304 can then be coupled to the post 312 to retain the blades 306 rotatably about the post 314 and thus engaged with the body 310.

Figure 15:
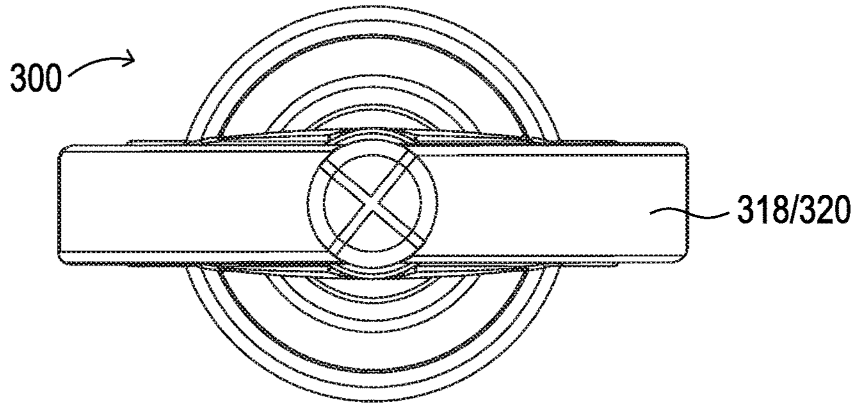
FIG. 15 includes a top view illustration of a magnetic impeller in a first configuration in accordance with an embodiment.

The magnetic impeller 300 can have a first configuration and a second configuration such that in the first configuration the magnetic impeller can be adapted to be inserted through an opening in a vessel and can not be inserted through the opening in the second configuration. For example, referring to FIG. 15, the magnetic impeller of FIG. 14 is illustrated in a first configuration, as seen from a top view. In the first configuration, a first blade 318 and a second blade 320 can generally align instead of crossing. With generally aligned blades 318 and 320, the magnetic impeller can have a narrower profile than in configurations where the blades 318 and 320 extend in different directions. Accordingly the magnetic impeller can be capable of being inserted through an opening of a vessel when in a first configuration.

Figure 16:
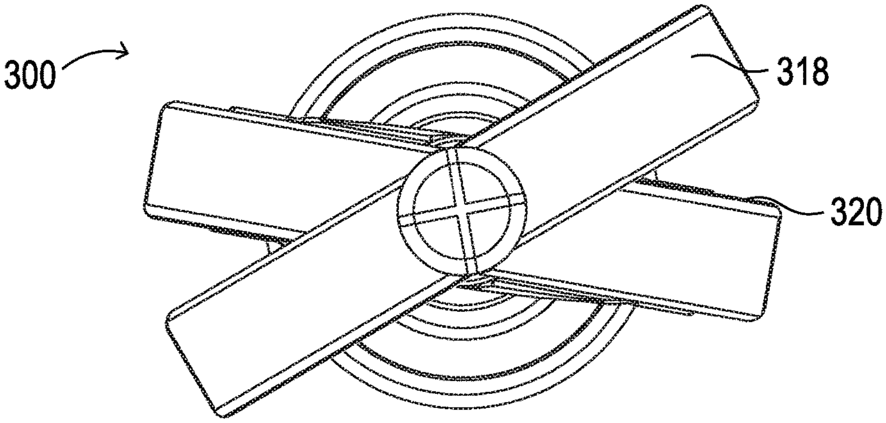
FIG. 16 includes a top view illustration of a magnetic impeller in between a first configuration and a second configuration in accordance with an embodiment.
Figure 17:
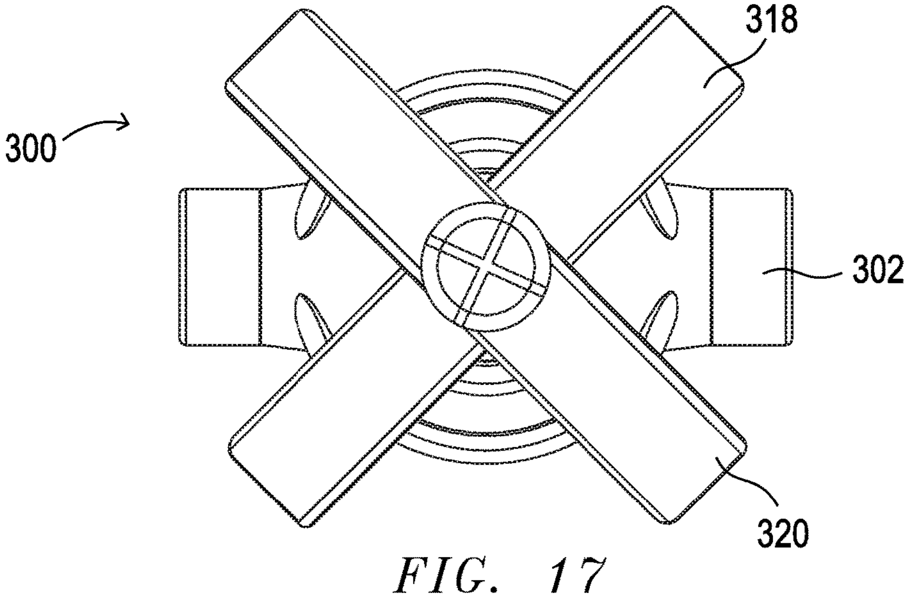
FIG. 17 includes a top view illustration of a magnetic impeller in a second configuration in accordance with an embodiment.

FIG. 16 illustrates a magnetic impeller 300 during transformation between the first configuration and the second configuration. FIG. 17 illustrates a magnetic impeller in the second configuration. The second configuration can be the desired configuration for operation of the magnetic impeller 300. The magnetic impeller 300 can transform into the second configuration from the first configuration by a relative rotation of the first or second blades 318 and 320 about the post 312.

For example, the first or second blades 318 and 320 can be configured to partially freely rotate relative to each other such that the first blade 318 can partially rotate without affecting the position of the second blade 320 or physically engaging the second blade 320. Similarly, the first or second blades 318 and 320 can be configured to partially freely rotate relative to the housing 302 such that the first or second blades 318 and 320 can partially rotate without affecting the position of the housing 302. In this way, the first blade 318, second blade 320, and housing 302 can all be generally aligned in the first configuration and partially rotate into a second configuration where the first blade 318, second blade 320, and housing 302 can extend at an angle relative to each other. As will be discussed in more detail below, the free rotation of the blades 318 and 320 and the housing 302 relative to each other can be partial by, for example, a series of corresponding flanges 322, 324, and 326 which limit the free relative rotation. In this way, once the blades 318 and 320 and the housing 302 have fully transformed into the second configuration, the corresponding flanges 322, 324, and 326 can engage and the blades 318 and 320 and the housing 302 can rotate together and maintain their relative positional relationship in the second configuration.

When the magnetic impeller 300 is in the second configuration, the magnetic impeller can be adapted to not fit through the opening of a vessel. For example, in the second position, the blades 318 and 320 can rotate, relative to each other, such that the blades, 318 and 320 extend in a different direction from the axis of rotation. The blades 318 and 320 can have a length which is larger than an opening in the vessel that the magnetic impeller is adapted to be inserted in. As such, when the blades can extend in a different direction in the second configuration, the profile of the magnetic impeller can be such that the magnetic impeller can not fit through the same opening that the magnetic impeller could fit through in the first configuration.

The magnetic impeller 300 can include a single blade, or a plurality of blades as illustrated in FIG. 14. In a particular embodiment, the magnetic impeller 300 can have at least 1 blade, such as at least 2 blades, at least 3 blades, or even at least 4 blades. The number of blades 306, and their relative size can be tailored depending on the size and shape of the vessel and particularly the vessel opening. The plurality of blades 306 can include a first blade 318 and a second blade 320. Each of the first blade 318 and the second blade 320 can be adapted to engage with the post 312 in a manner as described above. Accordingly, the first blade 318 and the second blade 320 can be adapted to rotate about a common axis. Further, as illustrated in FIGS. 14 to 17, the first blade 318 and the second blade 320 can be adapted to rotate in different planes. For example, the first blade 318 can be disposed above the second blade 320.

Figure 18:
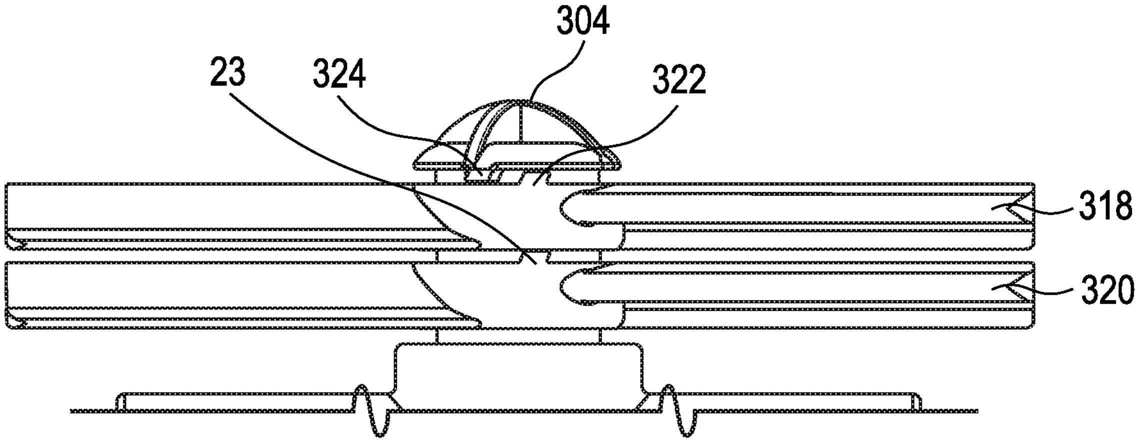
FIG. 18 includes a side view of a magnetic impeller in a first configuration in accordance with an embodiment.
Figure 19:
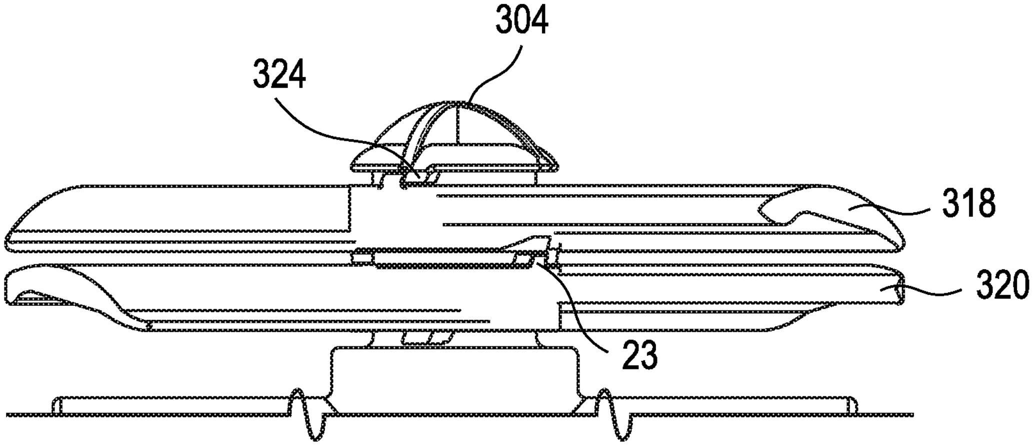
FIG. 19 includes a side view of a magnetic impeller in a second configuration in accordance with an embodiment.

As discussed above, at least one of the first blade 318 and the second blade 320 can partially freely rotate about the post 312 and relative to each other. When the magnetic impeller transforms to the second configuration, the first blade 318 or the second blade 320 can partially rotate and then engage with each other and with the rotatable element 302. For example, FIG. 18 illustrates a close up view of the post 312, the rotatable element 302 and the blades 318 and 320, and a plurality of spaced apart flanges 322, 324, and 326 on the each of the first blade 318, second blade 320, and the retention member 304 in the first configuration. As the blades 318 and 320 rotate into the second configuration, corresponding flanges 322, 324, and 326 can engage and thereby rotate together instead of freely rotating relative to each other as illustrated in FIG. 19. For example, the flanges 322 on the first blade 318 can be adapted to engage with a corresponding flange 324 on the retention member 304 once the desired relative position between the first and second blade 318 and 320 is reached. The desired relative position between the first and second blade 318 and 320 and the rotatable element 302 can be tailored as desired by altering the relative position of the correspondingly engaging flanges 322, 324, and 326.

Referring again to FIG. 14, the rotatable element 302 can be adapted to retain the magnetic member 308. The rotatable element 302 can have any desired shape. In particular embodiments, the rotatable element 302 can have a profile which is smaller than an opening in a vessel such that the magnetic impeller 300 can be inserted into the vessel through the opening as described in detail above.

Figure 20:
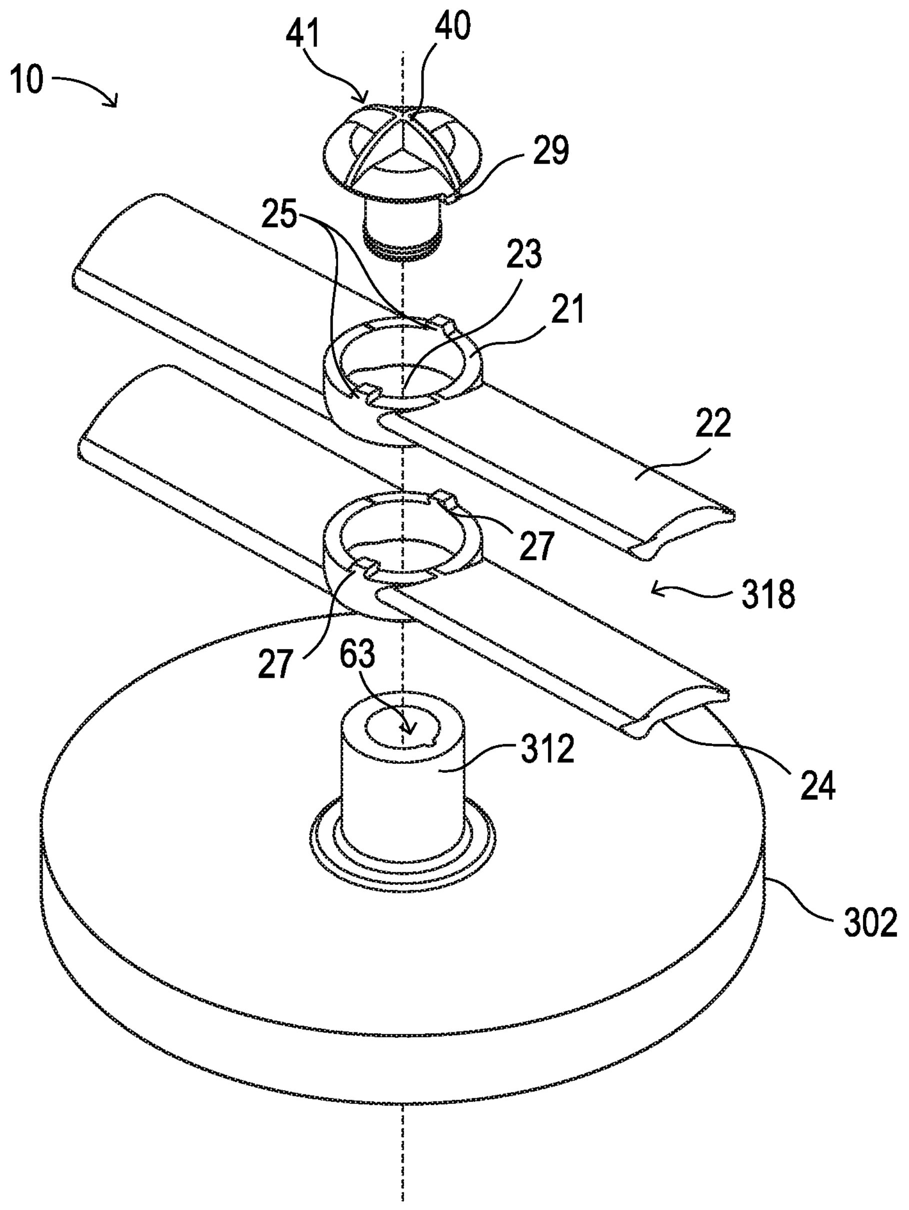
FIG. 20 includes an illustration of an exploded view of a magnetic impeller in accordance with an embodiment.
Figure 21:
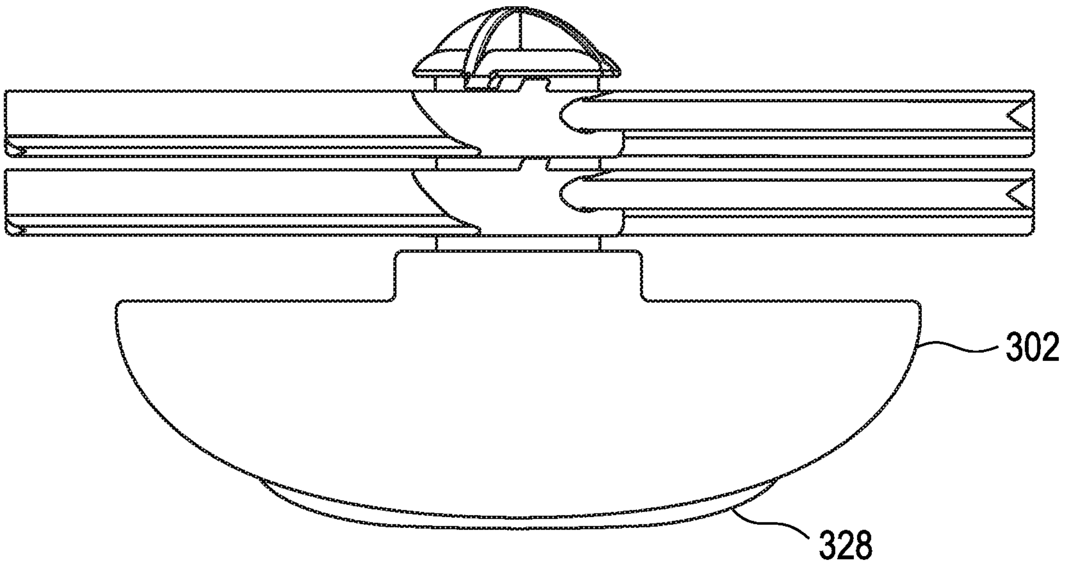
FIG. 21 includes a side view of a magnetic impeller in a first configuration in accordance with an embodiment.
Figure 22A:
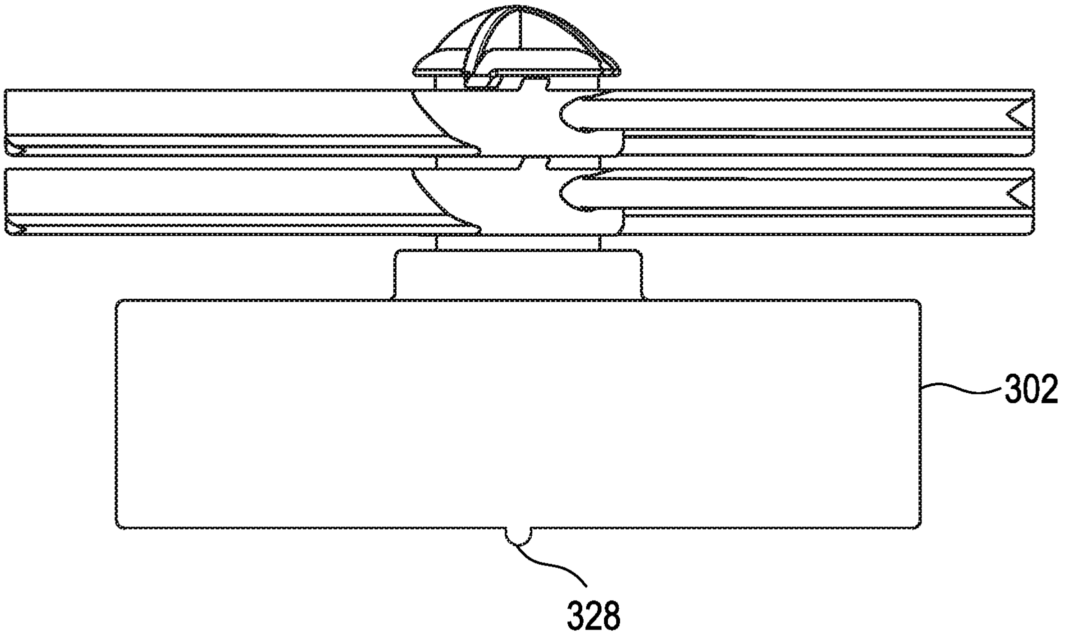
FIG. 22*a* includes a side view of a magnetic impeller according in a second configuration in accordance with an embodiment.
Figure 22B:
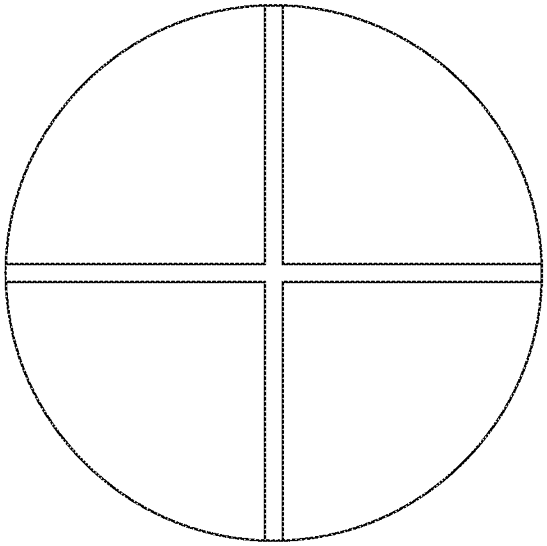
FIG. 22*b* includes a bottom view of a magnetic impeller in accordance with an embodiment.

In another embodiment, such as, for example, illustrated in FIGS. 20 to 22, the rotatable element 302 can have a generally disc-shaped profile. As used herein, the term "generally disc-shaped" refers to a deviation from a circular shape, when viewed from a top view, by no greater than 20% at any location, such as no greater than 15% at any location, no greater than 10% at any location, no greater than 5% at any location, or even no greater than 1% at any location. A disc-shaped rotatable element 302 can be adapted to impart a minimal mixing action on a nearby fluid. In such a manner, mixing can be facilitated almost exclusively by the blades 318. This may be particularly advantageous for mixing operations including delicate fluids or fluids which require a particular mixing action. When viewed from a side-view (FIGS. 21 and 22), the disc-shaped rotatable element 302 may have an arcuate or flat bottom surface.

In further embodiments, such as, for example, illustrated in FIGS. 20 to 22, the rotatable element 302 can incase magnetic elements therein. The magnetic element can be any of those described herein, and in particular embodiments can include elongate magnets and/or disc magnets. It is to be understood that disc shaped rotatable element 302 can be used with any blade and/or vessel configuration described herein.

As illustrated in FIGS. 21 through 24, in certain embodiments, the rotating element 302 can include a contact flange 328. The contact flange 328 can be disposed at least on the bottom surface of the rotatable element 302. The contact flange 328 can have a parabolic or otherwise arcuate shape and provide a point of contact between the magnetic impeller and the vessel when the magnetic impeller 300 is magnetically engaged and rotating. The contact flange 328 can reduce the friction generated during rotation of the magnetic impeller 300 by reducing the amount of surface area in contact with the vessel during operation. Further, symmetry of the contact flange 328, in any of the configurations, can improve stability of the rotatable element 302 during operation.

Figure 23:
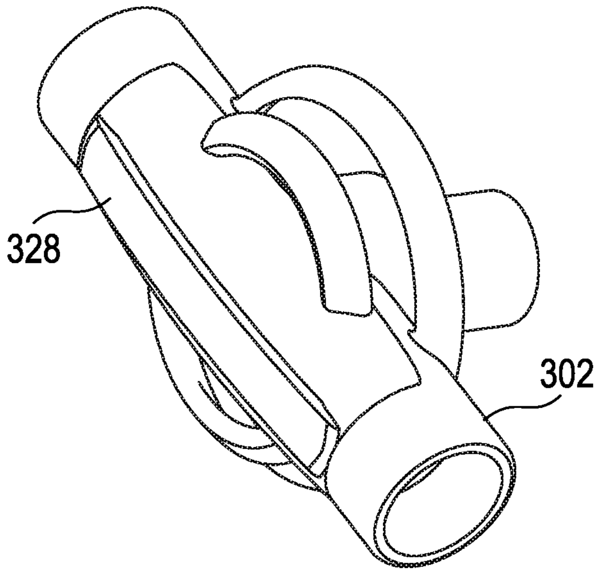
FIG. 23 includes a perspective view of a rotatable element in accordance with an embodiment.
Figure 24:
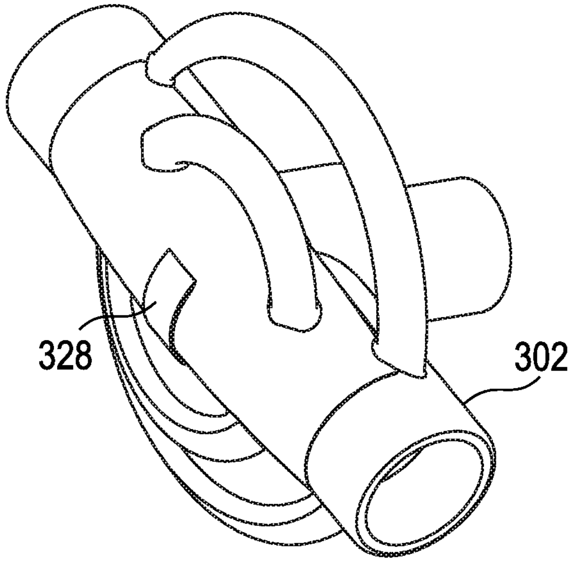
FIG. 24 includes a perspective view of a rotatable element in accordance with an embodiment.

The contact flange 328 can have any desired shape. In particular embodiments, the contact flange 328 can be parabolic or arcuate shape. Further, as illustrated in FIG. 23, the contact flange 328 can extend about the width or circumference of the rotatable element 302. In other embodiments, as illustrated in FIG. 24, the contact flange 328 can extend along the length of the rotatable element 302. It has been found that a contact flange 328 extending along the length of the rotatable element 302 can greatly reduce wobble of the magnetic impeller 300 during operation. In certain further embodiments, as particularly illustrated in FIG. 22*a*, the contact flange 328 can extend from the center towards the outer edge of the rotatable element in two directions. In other embodiments, as particularly illustrated in FIG. 22*b*, the contact flange 328 can extend from the center towards the outer edge of the rotatable element 302 in four directions. Accordingly, in certain embodiments, the contact flange 328 can extend from the center towards the outer edge of the rotatable element 302, in at least two, at least three, or even at least four directions.

Figure 60:
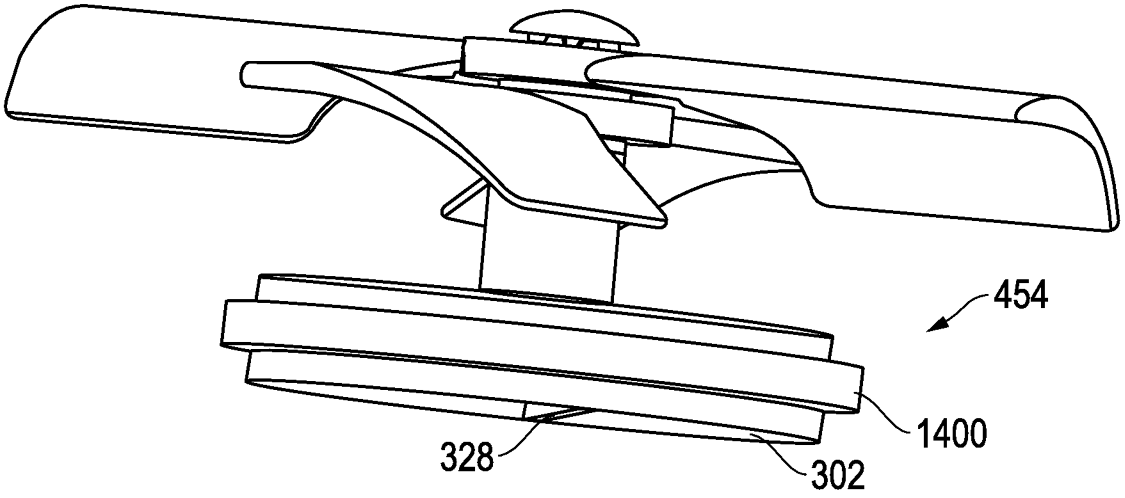
FIG. 60 includes an elevation view of a magnetic impeller in accordance with an embodiment.
Figure 61:
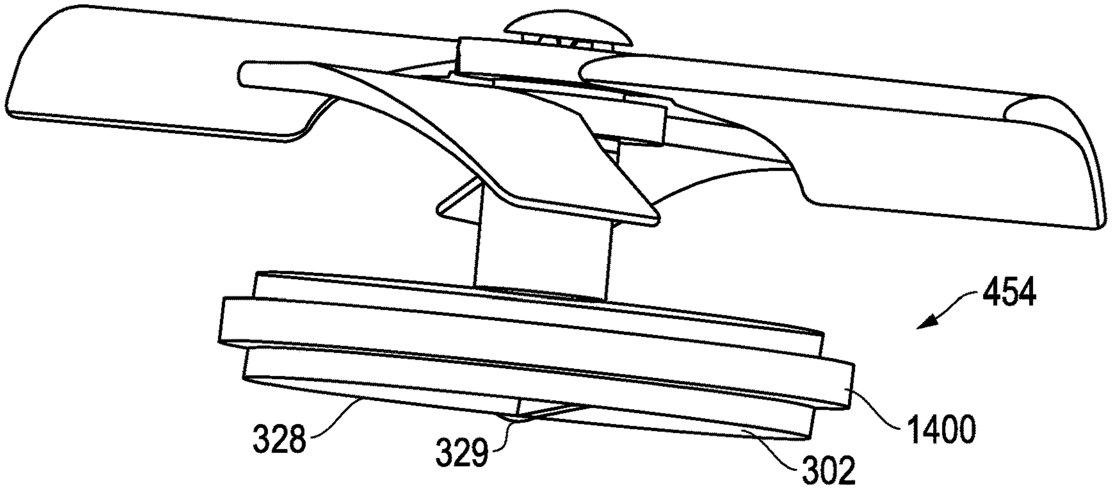
FIG. 61 includes an elevation view of a magnetic impeller in accordance with an embodiment.
Figure 62:
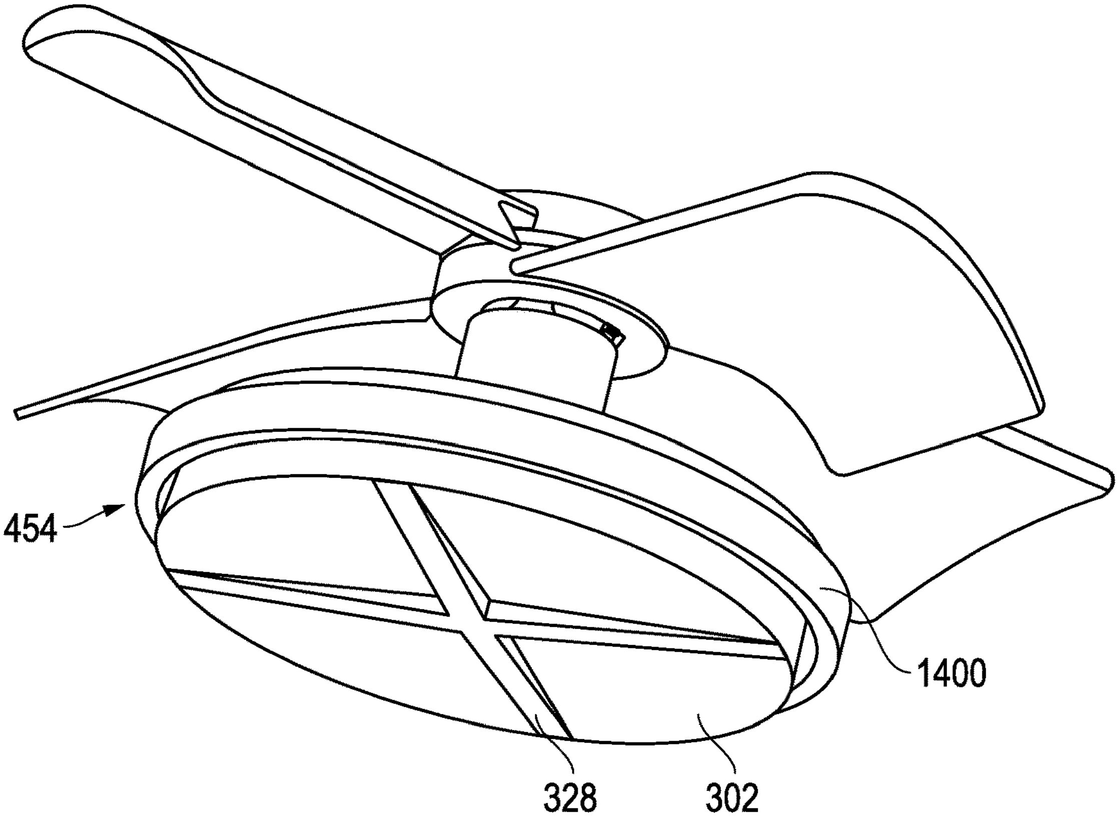
FIG. 62 includes a bottom perspective view of a magnetic impeller in accordance with an embodiment.

In certain embodiments, the contact flange 328 can have a non-uniform thickness. In particular embodiments, as illustrated in FIGS. 60 to 62, the contact flange 328 can have a maximum thickness at a center of the bottom surface of the rotatable element 302. The thickness of the contact flange 328 can decrease as it extends to the outer edge of the rotatable element. Further, the contact flange 328 can extend in at least two, at least three, or at least four directions from the maximum thickness at the center of the bottom surface of the rotatable element 302 to the outer edge of the rotatable element 302. In particular embodiments, having a maximum thickness at a center of the rotatable element 302 can reduce surface area contact during mixing. Specifically, tapering the contact flange 328 toward the outer edge can allow rotational pivoting around only a central portion of the contact flange 328, reducing frictional interaction with the vessel. Further, extending thinner portions of the contact flange 328 toward the outer edge of the rotatable element 302 can permit reduced start up drag by reducing surface area contact immediately prior to mixing. That is, prior to rotating, the rotatable element 302 can rest along a reduced contact area, which in turn can reduce start up force requirements.

In an embodiment, the contact flange 328 can terminate on the bottom surface of the rotatable element 302. That is, the contact flange 328 may not be visible when viewed from a top view. In a particular instance, the contact flange 328 can terminate prior to the outer edge of the rotatable element 302. That is, the contact flange 328 does not need to extend fully to the outer edge. In another particular instance, the contact flange 328 can extend fully to the outer edge.

In an embodiment, the thickness of the contact flange 328 can change in a linear manner from the center of the bottom surface to the outer edge. In another embodiment, the thickness of the contact flange 328 can change in a non-linear manner from the center of the bottom surface to the outer edge. For example, the contact flange 328 thickness can change in an arcuate, parabolic, stepped, castellated, or otherwise non-linear manner. Moreover, the change in thickness may be different for different portions of the contact flange 328. As discussed above, the contact flange 328 can extend from the center in four directions. By way of a non-limiting example, the thickness change in one of the four directions can be different than the thickness change in another of the four directions. The difference can relate to the shape of the thickness change or the rate at which the thickness changes. For example, a first extension can taper linearly from the center to the outer edge while a second extension can taper exponentially. In a particular instance, the profile of opposite extensions can be the same as one another. That is, contact flanges 328 including, for example, four extensions can have two sets of extension profiles where the same extension profiles are disposed diametrically opposite one another. This can enhance balance of the rotatable element 302, reducing wobble typically associated with eccentric or unbalanced rotation. Further, in particular embodiments, the cross shape can keep solids, e.g. salt crystals, from being trapped underneath the rotatable element 302, which could otherwise cause abrasion to the underside mixer surface or to the plate the mixer rotates on. In more particular embodiments, as illustrated in FIG. 61, the contact flange 328 can include a central protrusion 329. The central protrusion 329 can further reduce the contact surface and limit abrasion from solids.

Figure 22C:
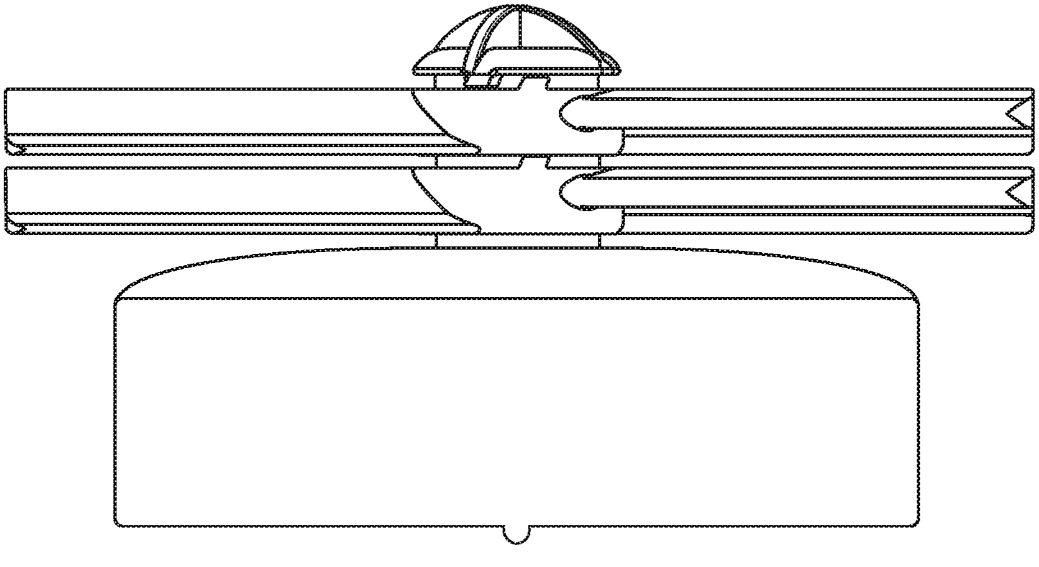
FIG. 22*c* includes a side view of a magnetic impeller in accordance with an embodiment.

Referring now to FIG. 22*c*, in certain embodiments, the rotatable element 302 can include an arcuate top surface 29 extending from the outer edge of the rotatable element 302 towards the shaft 312. In particular embodiments, the arcuate top surface 329 can aid in preventing particulate matter to settle on the surface of the rotatable element 302.

Referring again to FIG. 14, the rotatable element 302 can further include one or more supporting members 330 and 332. The one or more supporting members 330 and 332 can be adapted to aid the magnetic impeller 300 in maintaining an upright position when inserted into a vessel. For example, during insertion into a vessel, if the magnetic impeller 300 contacts the bottom of the vessel in a position other than a generally upright position, the supporting members 330 and 332 can facilitate translating or rolling the magnetic impeller 300 into a generally upright position. Further, the supporting members 330 and 332 can help provide stability to the magnetic impeller 300 during rotation. For example, during operation, the supporting members 330 and 332 can help to lower the center of gravity of the magnetic impeller 300 to provide stability. Further, the supporting members 330 and 332 can provide an anti-roll feature, where if the magnetic impeller 300 begins to wobble too greatly, the supporting members 330 and 332 can facilitate maintaining the magnetic impeller 300 in an upright position and discourage or prevent the magnetic impeller 300 from rolling over.

The supporting members 330 and 332 can have any desired shape. In particular embodiments, the supporting members 330 and 332 can include an arcuate surface protruding from the rotatable element 302. The arcuate surface can be ring shaped, or semi-circular shape, or any other shape which aides the magnetic impeller 300 in maintaining an upright position during insertion or operation.

In a very particular embodiment, the magnetic impeller 300 can include more than one supporting members 330 and 332. For example, as illustrated in FIG. 14, the magnetic impeller 300 can include a first supporting member 330 and a second supporting member 332. The first supporting member 330 can be disposed above the second supporting member 332. The first supporting member 330 can extend further from the rotatable element 302 than the second supporting member 332. The first and second supporting members 330 and 332 can have the same general shape or can have a different shape.

The magnetic impeller 300 can further include a magnetic member 308. Generally, the magnetic member 308 can be disposed in any arrangement within the rotatable element 302. In particular embodiments, the magnetic member 308 can be substantially centered within the body 310 such that the magnetic impeller 300 can be substantially symmetrical.

In a particular aspect, as seen in FIG. 14, the rotatable element 302 can include a cavity 334 for placement of the magnetic member 308. The cavity 334 may include an opening to allow for installation of the magnetic member 308 therein. The cavity 334 can be shaped to receive the magnetic member 308 and may include a cap 336 to form a substantially liquid tight seal of the magnetic member 308 therein. In certain embodiments, the cavity 334 can include more than one opening 334 and include a corresponding number of caps 336.

In a particular embodiment, the cap 336 may be placed in the opening of the cavity 334 to form an interference fit and secure the magnetic member 308 within the cavity 334. In another embodiment, the cap 336 may be hermetically sealed to the opening of the cavity 334. In yet another embodiment, the cap 336 may be threadably engaged to the opening by a corresponding threaded structure. In another embodiment, the cap 336 can include a gasket 338 which forms an interference fit with the opening of the cavity 334. In yet another embodiment, the cap 336 can be overmolded with the opening of the cavity 334. In yet a further embodiment, the cap 336 may be sealed to the opening by any other readily recognizable method for joining two members.

The magnetic impeller 300 can further include a vessel 340. The magnetic impeller 300 can be used with any vessel shape or size. Referring to FIGS. 25 to 28, in particular embodiments, the vessel 340 can have an opening 342 which is smaller than the cross sectional area of the body 344 of the vessel 340. In very particular embodiments, the vessel 340 can be a carboy. As used herein, a "carboy" refers to any vessel having a neck which is narrower than the body of the vessel, such as illustrated in FIGS. 25 to 28. As illustrated in FIGS. 25 to 28, the vessel 340 can have a generally cylindrical shape. In other embodiments, the vessel 340 can have any shape, such as rectangular, cylindrical, polygonal, or any other appropriate shape to retain fluid therein.

Figure 25:
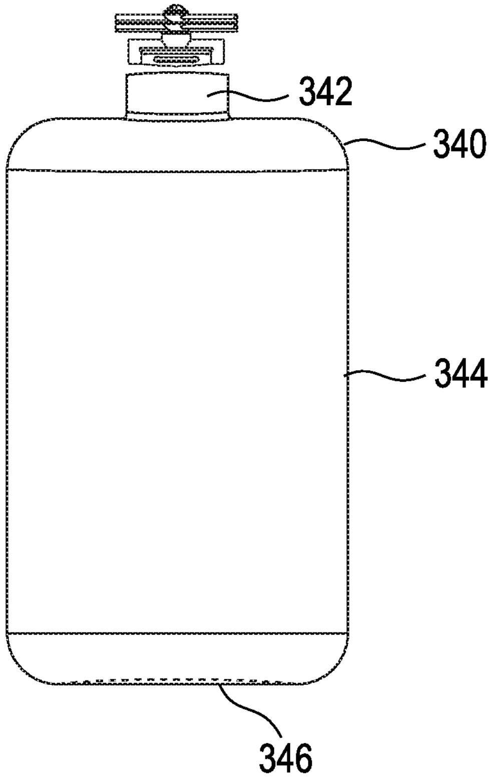
FIG. 25 includes a front view of a magnetic impeller before insertion into a vessel in accordance with an embodiment.
Figure 26:
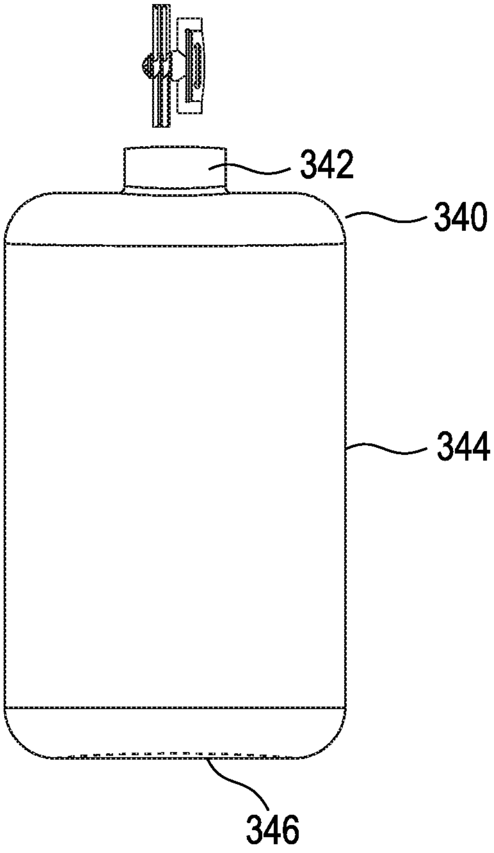
FIG. 26 includes a front view of a magnetic impeller in a first configuration being inserted into a vessel in accordance with an embodiment.
Figure 27:
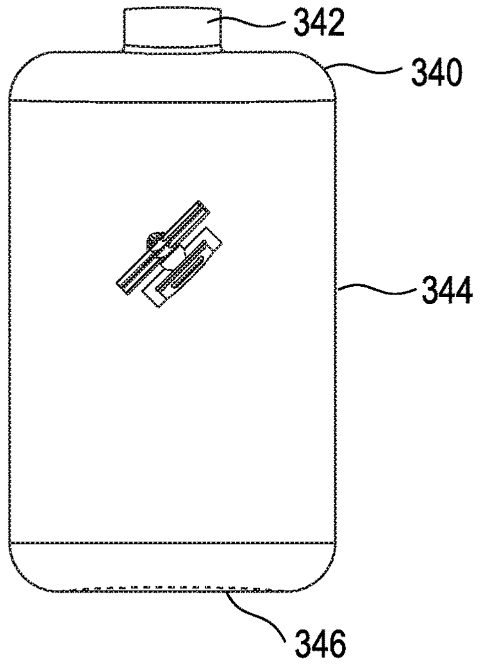
FIG. 27 includes a front view of a magnetic impeller falling in the vessel in accordance with an embodiment.
Figure 28:
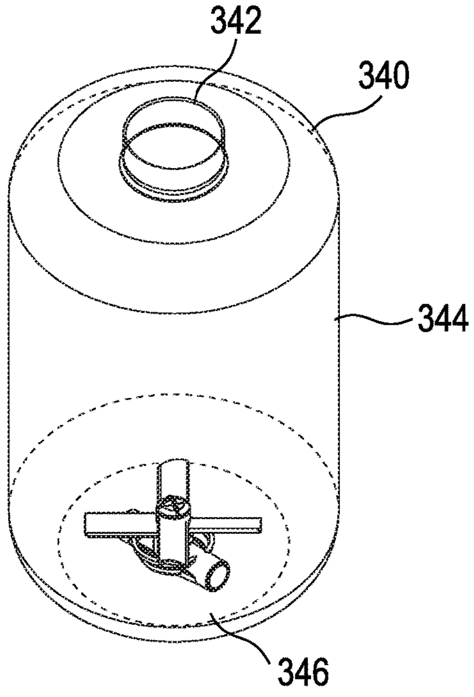
FIG. 28 includes a cut-away perspective view of a magnetic impeller inside of a vessel in the second configuration in accordance with an embodiment.

As shown in FIG. 25 and discussed above, the magnetic impeller 300 can have a blade length that can be longer than the opening 342 of the vessel 340. In this way, the magnetic impeller 300 can not be inserted into the vessel 340 with the blades fully deployed and positioned at an angle relative to each other. As shown in FIG. 26, when the magnetic impeller 300 is the first configuration, the magnetic impeller 300 can be inserted into the vessel 340 with the blades pointing through the opening 342 of the vessel 340. As the blades are aligned, the magnetic impeller 300 can fit through the opening 342. FIG. 27 illustrates the magnetic impeller 300 falling through the vessel 340. As the magnetic member 308 is heavy and disposed at the bottom half of the vessel 340, the magnetic impeller 300 has a tendency to self-orient into the correct, upright position as it is falling through the body 344 of the vessel 340. This effect is even more pronounced when dropping the magnetic impeller into a vessel 340 filled with fluid. FIG. 28 illustrates the magnetic impeller in the second configuration and in operation at the base 346 of the vessel 340. As seen, in the second, operational configuration, the blades and rotatable element are spaced at an angle from each other and thereby cross. The second configuration can have a higher mixing efficiency than the first configuration. For example, spacing the blades and rotatable element apart from each other such that the blades and rotatable element cross imparts improved mixing action on the fluid to be mixed by increasing the surface area contact with the fluid and improving the efficiency of fluid flow through and around the magnetic impeller.

In a particular embodiment, the blades 306 or the magnetic impeller can be injection molded using a polymer material. The blades 306 can also be formed by any other suitable method of construction, including, for example, shaping, bending, extruding, twisting, machining, or a combination thereof. Further, the blades or the magnetic impeller can comprise any suitable material for use in fluidic mixing. For example, the blades may comprise a polymer material, a metallic material, an epoxy, ceramic, glass, a fibrous material such as wood, or any combination thereof. In particular embodiments, elements of the magnetic impeller can include the rotatable element, blades and plugs, all of which may contain a polymeric material, and preferably contain a polymer material which will be generally chemically inert with the particular fluid to be mixed.

In a particular embodiment, the blades 306 can comprise a flexible material. In a particular aspect, a flexible material can enable the blades 306 to further compress during insertion of the magnetic impeller into the vessel 340. In this regard, the magnetic impeller can be utilized in vessels 340 having an even smaller opening. Of particular importance, in this regard, the blades 306 can have a minimum compressible width, $W_{BMIN}$, as defined by the tangential distance between the two furthest points thereof. In particular embodiments a ratio of $W_B/W_{BMIN}$ can be no less than 1.05, such as no less than 1.1, or even no less than 1.2.

To facilitate a flexible blade 306, in particular embodiments, the blades 306 can be constructed at least partially from a material having a Young's modulus of no greater than 5 GPa, such as no greater than 4 GPa, no greater than 3 GPa, no greater than 2 GPa, no greater than 1 GPa, no greater than 0.75 GPa, no greater than 0.5 GPa, no greater than 0.25 GPa, or even no greater than 0.1 GPa. In further embodiments, the blades 306 can be constructed from a material having a Young's modulus of no less than 0.01 GPa.

As the Young's modulus decreases, the relative flexibility of the blades 306 can increase, however, the ability for the blades 306 to maintain structural rigidity during mixing may decrease. Accordingly, the blades 306 may be constructed at least partially from a material having a low Young's modulus (e.g., 0.05 GPa) and partially from a material having a relatively high Young's modulus (e.g., 7.0 GPa).

In particular embodiments, the material having a relatively high modulus can be positioned along a central portion of the blade 306, and can extend substantially along the length thereof, while the material having the relatively low modulus can be positioned along the sides of the blade 306.

In particular embodiments, the blades 306 can at least partially comprise a silicone. In further embodiments, the blades 306 can be silicone based. In this regard, the blades 306 can be adapted to bend or flex and accommodate entry into a vessel having a relatively narrow opening. Of course, it should be understood that the blades 306 can comprise any other materials having a relatively low Young's modulus (as described above), and that this exemplary embodiment should not be construed as limiting the scope of the present disclosure.

Figure 29:
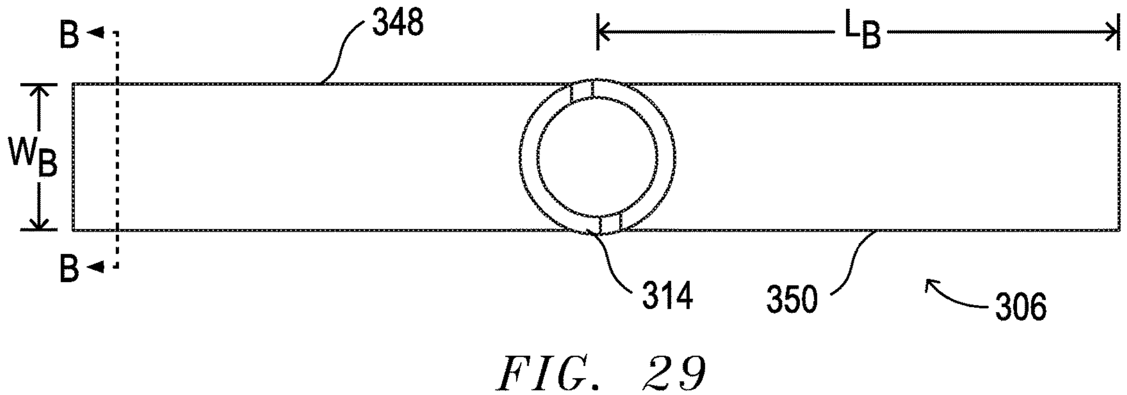
FIG. 29 includes a top view of a blade design in accordance with an embodiment.

Referring now to FIG. 29, which illustrates a top view of one embodiment of a blade design, the blades 306 can have a central hub 314 and a blade extending in generally opposite directions. As illustrated the blade can have a first section 348 and a second section 350, where the first section 348 extends from the hub in a different direction that the second section 350. As illustrated, the first and second sections 348 and 350 can have the same general shape, and can be rotationally symmetrical.

Figure 30:
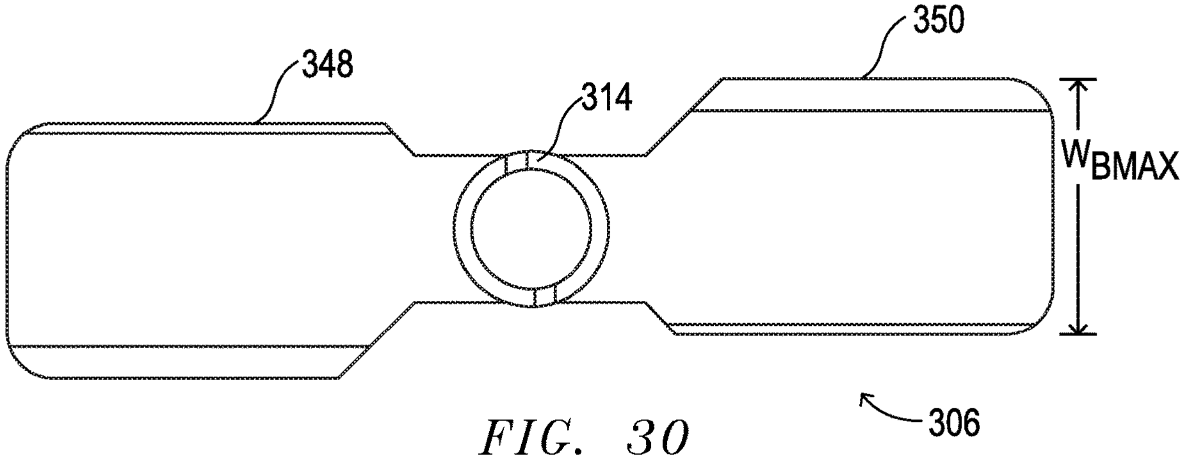
FIG. 30 includes a top view of a blade design in accordance with an embodiment.

Referring now to FIG. 30, which illustrates a top view of another embodiment of a blade design, the first and second sections 348 and 350 can be rotationally symmetrical, but not identical. Further, the maximum width of the blade $W_{BMAX}$ can be greater than the maximum width of the hub 314.

Figure 31:
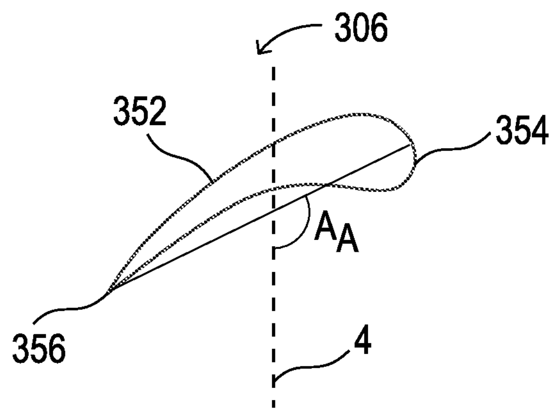
FIGS. 31 to 34 include cross-sectional side views of blade designs according to one or more of the embodiments described herein, as seen along Line B-B in FIG. 29.
Figure 32:
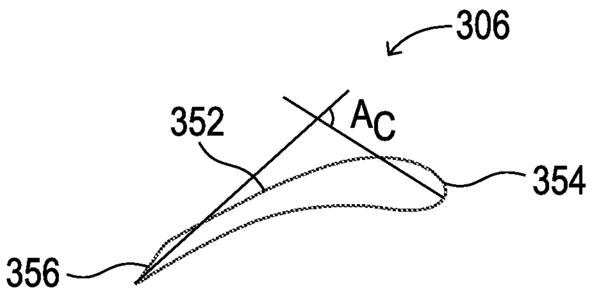

In a particular embodiment illustrated in FIGS. 31 and 32, the blades 306 can have a non-rectilinear cross-section. For example, a major surface 352 of the blades 306 may be an arcuate surface extending between a leading edge 354 and a trailing edge 356. The arcuate surface can be concave or convex relative to the blade 306. In this regard, the arcuate surface can extend outward (i.e., away from) from a tangent line drawn between the leading edge 354 and the trailing edge 356 or can extend inward (i.e., toward) into a tangent line drawn between the leading edge 354 and the trailing edge 356. This arcuate surface can be adapted to generate lifting forces in a fluid and push fluid below by a ram effect, thereby improving circulation below the blades.

Referring to FIG. 31, the non-rectilinear blades 306 can have an average major surface, as defined by the direct angle between the leading edge 354 and the trailing edge 356. The non-rectilinear blades 306 can have an angle of attack, $A_A$, as measured by the angle formed between the average major surface and the center axis of rotation of the blades 306. In particular embodiments, $A_A$ can be at least 20 degrees, such as at least 30 degrees, at least 40 degrees, at least 50 degrees, at least 60 degrees, at least 70 degrees, at least 80 degrees, or even at least 85 degrees. In further embodiments, $A_A$ can be no greater than 85 degrees, such as no greater than 80 degrees, no greater than 70 degrees, no greater than 60 degrees, no greater than 50 degrees, or even no greater than 40 degrees. In even more particular embodiments, $A_A$ can also be within a range between any of the values described above.

As $A_A$ increases, the lift generated by the blades 306 can correspondingly increase, generating enhanced lifting characteristics of the blades 306 within a fluid. Specifically, as the angle of attack, $A_A$ increases from 90 degrees to 135 degrees, the lifting characteristics of the blade 306 can increase. It should be understood that, conversely, as the angle of attack, $A_A$ increases from 135 degrees to 180 degrees, the lifting characteristic of the blade 306 can decrease. However, while the lifting characteristic of the blades 306 may decrease within a range of between 135 degrees and 180 degrees, the mixing efficiency of the magnetic impeller may increase as the relative surface area of the blades 306 contacting the fluid increases, thereby increasing the relative force employed by the blade 306 onto the fluid.

Thus, in a more particular embodiment, $A_A$ can be within a range between and including 105 degrees to 130 degrees. In yet a more particular embodiment, $A_A$ can be within a range between and including 115 degrees and 130 degrees.

Referring now to FIG. 32, the blades 306 can also define a camber angle, $A_C$, as defined by an by an external angle formed by the intersection of the tangents of the leading edge 354 and the trailing edge 356. In particular embodiments, $A_C$ can be greater than 5 degrees, such as greater than 10 degrees, greater than 20 degrees, greater than 30 degrees, greater than 40 degrees, greater than 50 degrees, or even greater than 60 degrees. In further embodiments, $A_C$ can be less than 100 degrees, such as less than 90 degrees, less than 80 degrees, less than 70 degrees, less than 60 degrees, less than 50 degrees, less than 40 degrees, or even less than 30 degrees. In even more particular embodiments, $A_C$ can also be within a range between any one of the values described above. As $A_C$ increases, the lifting forces generated by the blades 306 within the fluid can increase. This in turn can generate enhanced mixing efficiency of the fluid.

Figure 33:
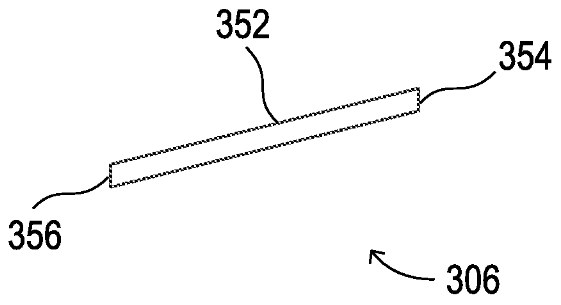

Referring to FIG. 33, which illustrates a cross section of a different embodiment of a blade design, the blades 306 can have a rectilinear cross section as measured perpendicular to the major surface 352 of the blade 306. In such an embodiment, the blades 306 can have an angle of attack, $A_A$, as measured by the angle formed between the major surface 352 of the blade 306 and the center axis of rotation of the rotatable element 302. The angle of attack is a parameter of lift. As the angle of attack increases, the ability of the blades 306 to generate a lifting force within a fluid can increase. Correspondingly, as the angle of attack decreases, the ability of the blades 306 to generate a lifting force within a fluid can decrease.

In blade embodiments having a rectilinear cross section, $A_A$ can be at least 20 degrees, such as at least 30 degrees, at least 40 degrees, at least 50 degrees, at least 60 degrees, at least 70 degrees, at least 80 degrees, or even at least 85 degrees. In further embodiments, $A_A$ can be no greater than 85 degrees, such as no greater than 80 degrees, no greater than 70 degrees, no greater than 60 degrees, no greater than 50 degrees, or even no greater than 40 degrees. In even more particular embodiments, $A_A$ can also be in a range of any of the values described above.

Figure 34:
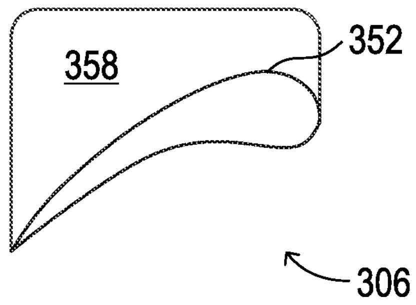

Referring to FIG. 34, which illustrates a cross section of a further embodiment of a blade design, the blades 306 can each comprise a distal flange 358 extending from the blade 306 at its distal end. The distal flange 358 may facilitate increased fluid agitation and mixing of the fluidic ingredients of the fluid. The distal flange 358 may extend generally perpendicular to the major surface 352 of the blade 306, or at any other suitable or desirable angle to effect the desired mixing. The distal flange 358 can have either a rectilinear or non-rectilinear shape, as desired to enhance fluidic flow and alter the lifting and mixing characteristics of the blade 306.

Figure 35:
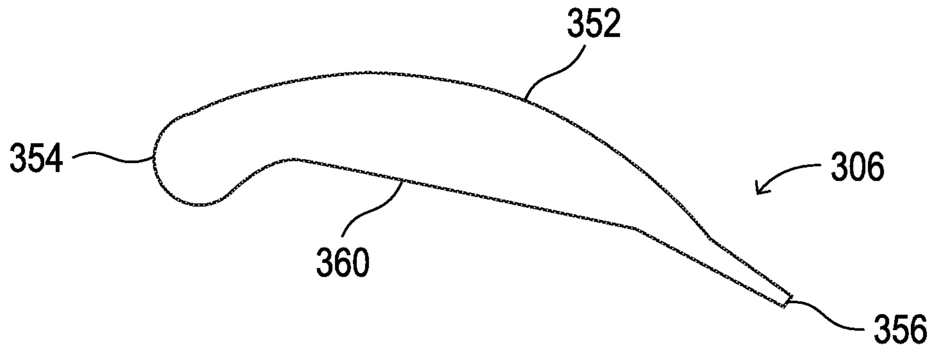
FIG. 35 includes a cross-sectional side view of a blade design in accordance with an embodiment.

Referring now to FIG. 35, which illustrates a cross section of yet another embodiment of a blade design, the blade 306 can have an arcuate major surface 352 on the upper surface between the leading edge 354 and the trailing edge 356. In further embodiments, the blade 306 can have at least one generally linear surface on a second major surface 360, which is disposed opposite the arcuate major surface 352. Generally, the second major surface 360 can be closer to the vessel bottom than the arcuate major surface 352. In this regard, during rotational operation, the second major surface 360 can push, or ram, fluid into the vessel bottom, generating a lifting action. Moreover, in certain embodiments, pushing the fluid into the vessel bottom can further enhance suspension characteristics within the fluid.

Figure 36:
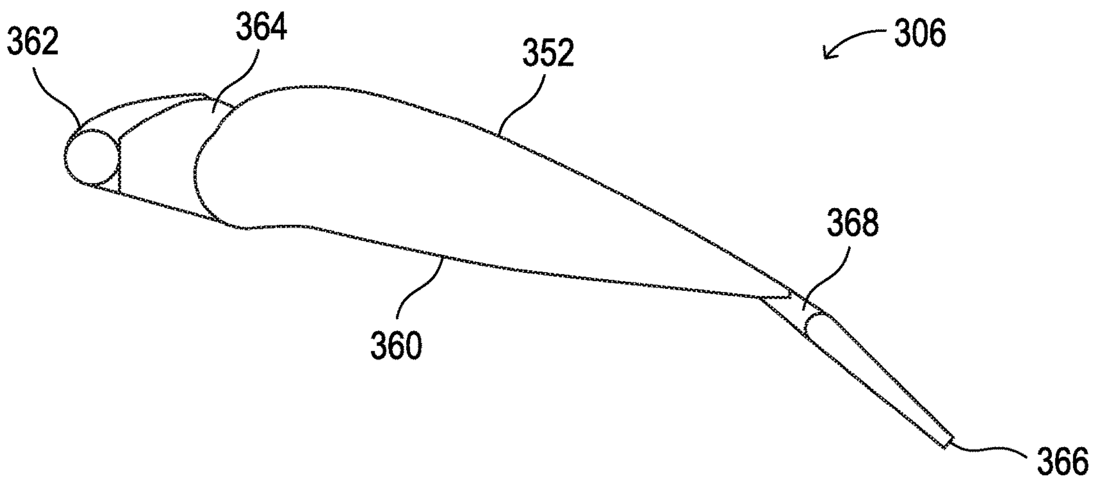
FIG. 36 includes a cross-sectional side view of a blade design in accordance with an embodiment.
Figure 37:
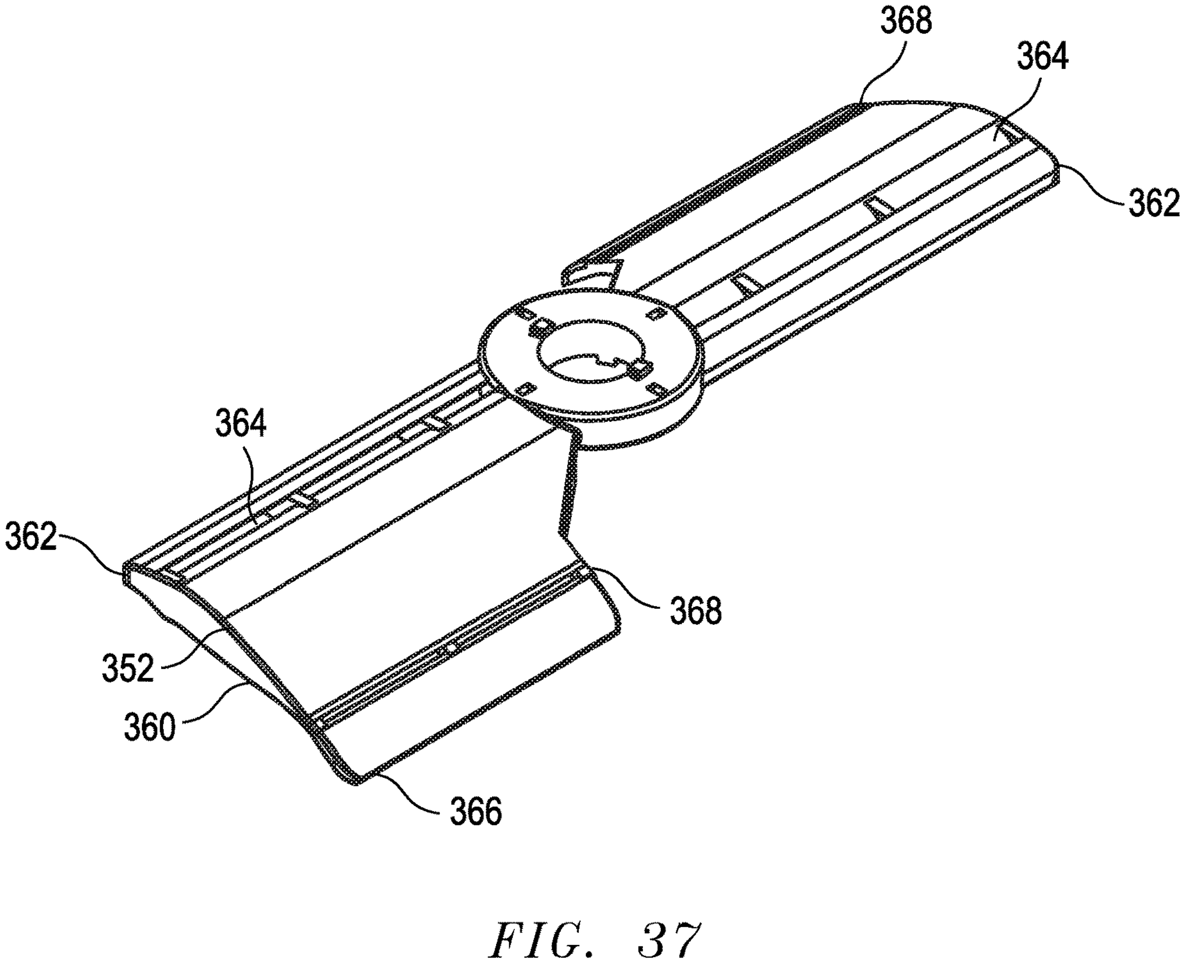
FIG. 37 includes a perspective view of a blade design in accordance with an embodiment.

Referring now to FIGS. 36 and 37, which illustrate a cross section and top view of another embodiment of a blade design, the blade 306 can have an extendable or deployable leading edge 362. The extendable or deployable leading edge 362 can be deployed during rotation when a sufficient amount of force is applied by the fluid to extend the leading edge 362.

In particular embodiments, the extendable or deployable leading edge 362 can begin to deploy at rotational speeds of less than 1 RPM. In other embodiments, the extendable or deployable leading edge 362 can begin to deploy at 1 RPM, at 5 RPM, or even at 10 RPM.

In certain embodiments, the extendable or deployable leading edge 362 can be fully deployed, or fully extended, at a rotational speed of no greater than 200 RPM, such as no greater than 90 RPM, no greater than 80 RPM, no greater than 70 RPM, no greater than 60 RPM, no greater than 50 RPM, no greater than 40 RPM, no greater than 35 RPM, no greater than 30 RPM, no greater than 25 RPM, or even no greater than 20 RPM. Moreover, the extendable or deployable leading edge 362 can be fully deployed at any rotational speed between 1 RPM and 100 RPMs, such as, for example, at 35 RPM.

When deployed, the extendable or deployable leading edge 362 can move relative to the rest of the blade 306. In certain embodiments, the extendable leading edge 362 can translate away from the rest of the blade 306 in a direction perpendicular to the arcuate major surface 352. The extendable leading edge 362 can translate along the axis of rotation of the fluid agitating element. In this regard, the aggregate width of the blade, $W_B$, can increase after deployment of the extendable leading edge 362 as seen from a view perpendicular to the arcuate major surface 352. In a certain aspect, as the width of the blade, $W_B$, increases, the surface contact between the blade 306 and the fluid can increase. This increased surface contact can affect a greater fluidic mixing and suspension characteristic at a reduced rotational speed.

During deployment of the blades 306, the translation of the extendable leading edge 362 can generate or increase in size an opening 364 in the major surfaces 352 and 360 of the blade 306 at a location adjacent to the leading edge 364. In a particular aspect, this opening 364 can increase fluid circulation and flow within the vessel 340 by diverting at least some of the fluid from a coplanar path around the major surfaces 352 and 360 to a trans-sectional path between the major surfaces 352 and 360. In other words, fluid can be diverted through thickness of the blades 306 such that a turbulent fluid pattern can be generated within the vessel 340. It should be understood that turbulent fluid patterns may increase suspension characteristics of the fluid flow while simultaneously affecting a more homogenous and complete mixing action.

Moreover, the addition or increase in size of the openings 364 in the blade 306 can serve to break up or eliminate fluidic dead spots or inefficiencies typically associated with relative planar movement of an object within a fluid.

Referring still to FIGS. 36 and 37, the blade 306 can additionally include an extendable or deployable trailing edge 366. The extendable or deployable trailing edge 366 can be deployed during rotation when a sufficient amount of force is applied by the fluid to extend the trailing edge 366.

In particular embodiments, the extendable or deployable trailing edge 366 can begin to deploy at a rotational speed of less than 1 RPM. In other embodiments, the extendable or deployable trailing edge 366 can begin to deploy at 1 RPM, at 5 RPM, or even at 10 RPM.

In certain embodiments, the extendable or deployable trailing edge 366 can be fully deployed, or fully extended, at a rotational speed of no greater than 100 RPM, such as no greater than 90 RPM, no greater than 80 RPM, no greater than 70 RPM, no greater than 60 RPM, no greater than 50 RPM, no greater than 40 RPM, no greater than 35 RPM, no greater than 30 RPM, no greater than 25 RPM, or even no greater than 20 RPM. Moreover, the extendable or deployable trailing edge 366 can be fully deployed at any rotational speed between 1 RPM and 100 RPMs, such as, for example, at 35 RPM.

When deployed, the extendable or deployable trailing edge 366 can move relative to the rest of the blade 306. Similar to the extendable leading edge 362 discussed above, in particular embodiments, the extendable trailing edge 366 can translate away from the rest of the blade 306 in a direction perpendicular to the arcuate major surface 352. In such a manner, the aggregate width of the blade, $W_B$, can increase after deployment of the extendable leading edge 366 as seen from a view perpendicular to the arcuate major surface 352.

Similar to that disclosed above, during deployment of the blades 306, the translation of the extendable trailing edge 366 can generate or increase in size an opening 368 in the major surfaces 352 and 360 of the blade 306 at a location adjacent to the trailing edge 366. In a particular aspect, this opening 368 can increase fluid circulation and flow within the vessel 340 by diverting at least some of the fluid from a coplanar path around the major surfaces 352 and 360 to a trans-sectional path between the major surfaces 352 and 360. In other words, fluid can be diverted through thickness of the blades 306 such that turbulent fluid patterns generate within the vessel 340. It should be understood that turbulent fluid patterns may increase suspension characteristics of the fluid flow while simultaneously affecting a more homogenous and complete mixing action.

Moreover, as described above, the addition or increase in size of the openings 364 and 368 in the blade 306 can serve to break up or eliminate fluidic dead spots or inefficiencies typically associated with relative movement of an object within a fluid.

Having deployable or extendable portions of the blades can serve at least two additional purposes. The first is easing the ability of the blades to be inserted into a vessel since in an unextended or undeployed state, the blades have a smaller width $W_B$. Furthermore, when deployed, the larger surface area and changes to the angle of attack, $A_A$, and the camber angle, $A_C$, can increase mixing efficiency, and particularly increase the ability to provide particulate suspension at low RPMs and simultaneously impart a low shear force on the suspended particulate.

Specifically, as the width and camber angle of the blades adjusts during rotational movement thereof, the blades can affect improved fluidic mixing and suspension properties. For example, as the width of the blades, $W_B$, increases, the surface area contact between the blades and the fluid can increase. This in turn can reduce the necessary RPMs required to mix a fluid or generate a desirable suspension therein. Correspondingly, by reducing RPMs, the magnetic impeller can facilitate equal or even improved mixing characteristics over higher RPM assemblies while imparting a lower shear force to the fluid. This can permit an effective mixing of delicate components, such as, for example, biological organisms or pharmaceuticals, without reducing the effectiveness thereof.

Figure 38:
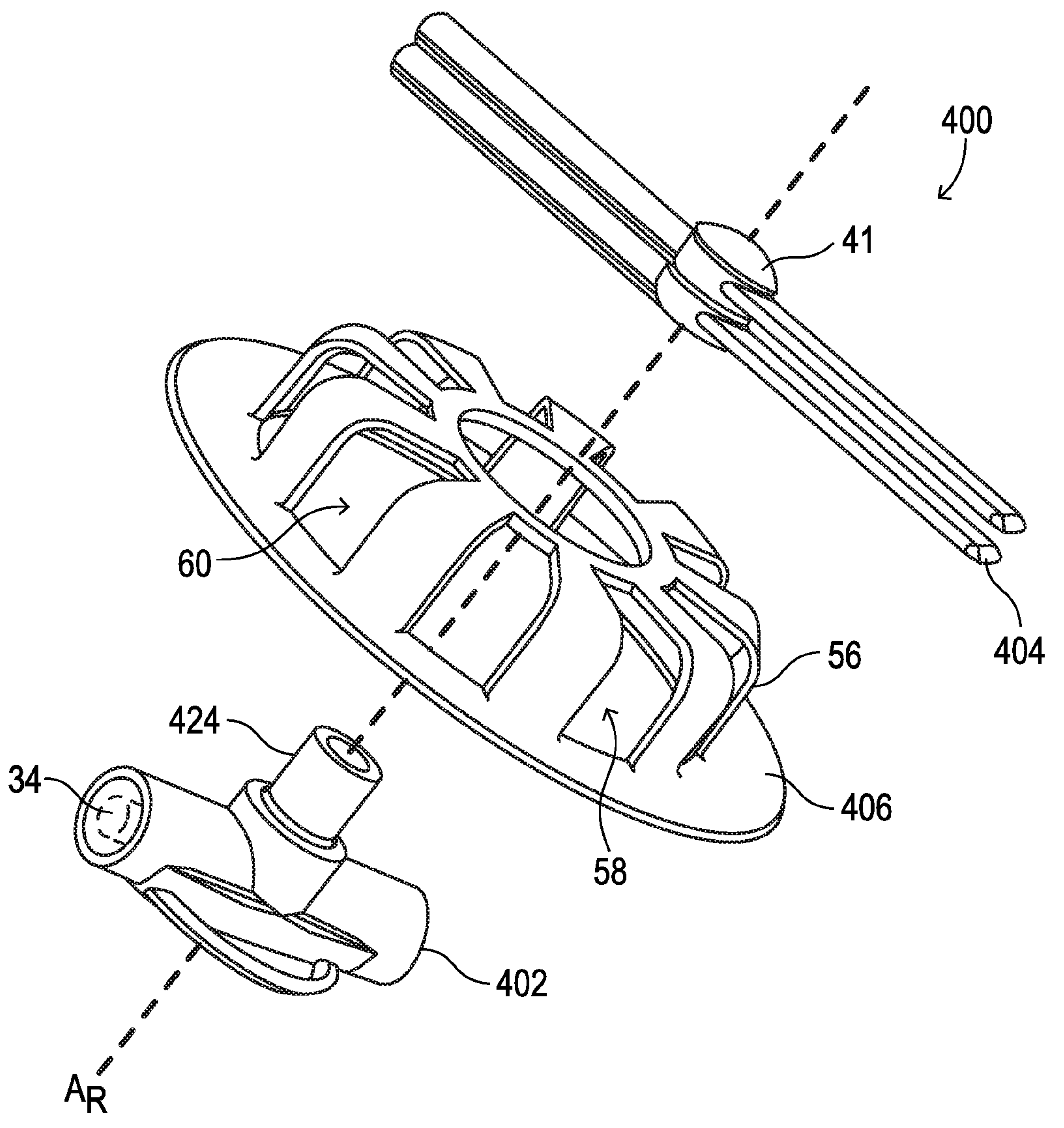
FIG. 38 includes an exploded perspective view of a magnetic impeller in accordance with an embodiment.

FIG. 38 illustrates an alternative magnetic impeller 400 including a rotatable element 402, at least one blade 404, and a cage 406.

In certain embodiments, the cage 406 can be coupled to another member, such as the floor of a vessel, a base, or a mixing dish to bound or confine the rotatable element 402. Embodiments in accordance with this magnetic impeller preassembly can be assembled, packaged, and shipped, and then, at a later time, when the desired mixing action is determined, a desired blade type can be selected and engaged with the mixing preassembly. The formed magnetic impeller can then be sealed, sterilized, and filled with fluid(s) to be mixed.

Figure 39:
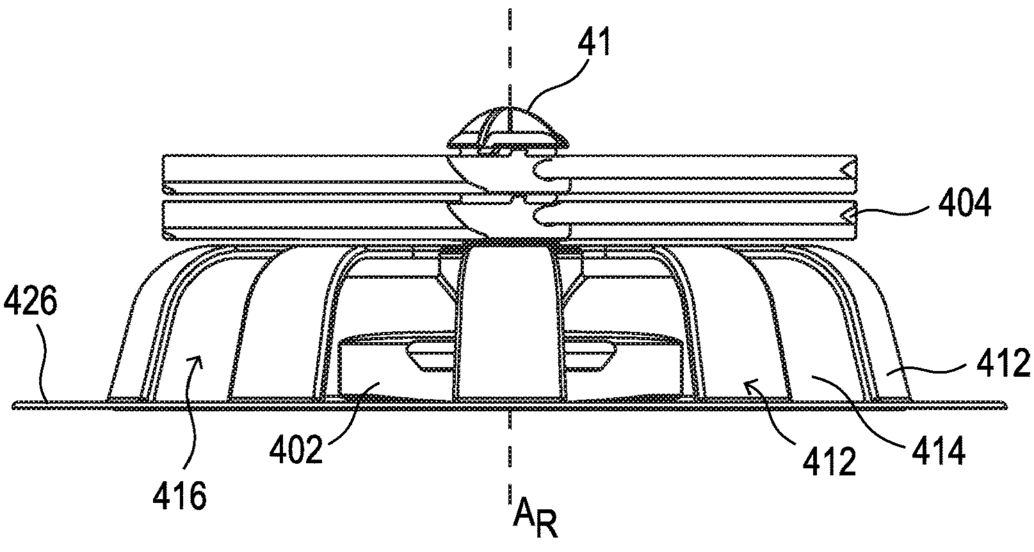
FIG. 39 includes an assembled magnetic impeller in accordance with an embodiment.

In certain embodiments, the cage 406 can bound the rotatable element 402 within the cage 406 while the at least one blade 404 is disposed outside the cage 406. In such configuration, the rotatable element 402 and the blades 404 are in assembled form as particularly illustrated, for example, in FIG. 39. In certain embodiments, each of the blades 404 (when a plurality is present) can be disposed outside of the cage 406.

Figure 40:
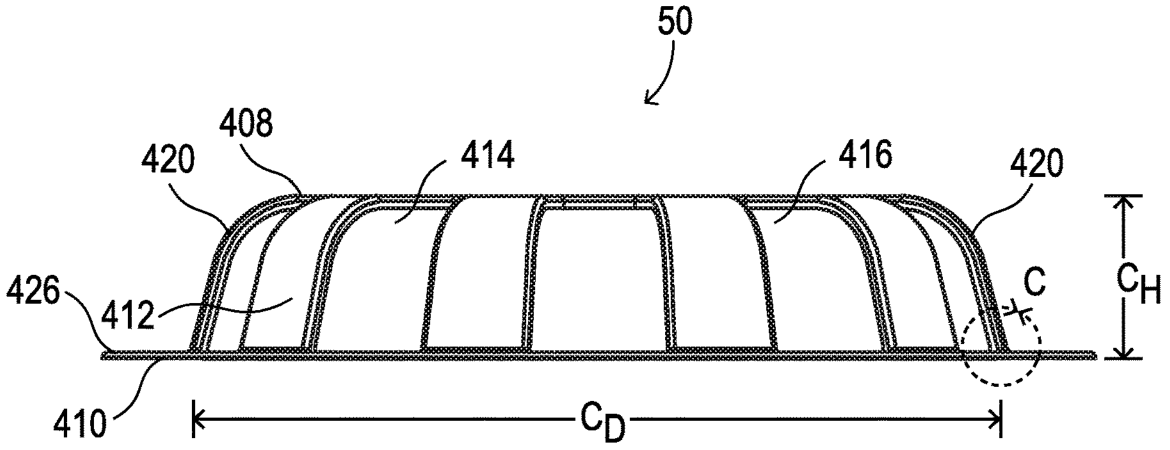
FIG. 40 includes a side view of a cage in accordance with an embodiment.
Figure 41:
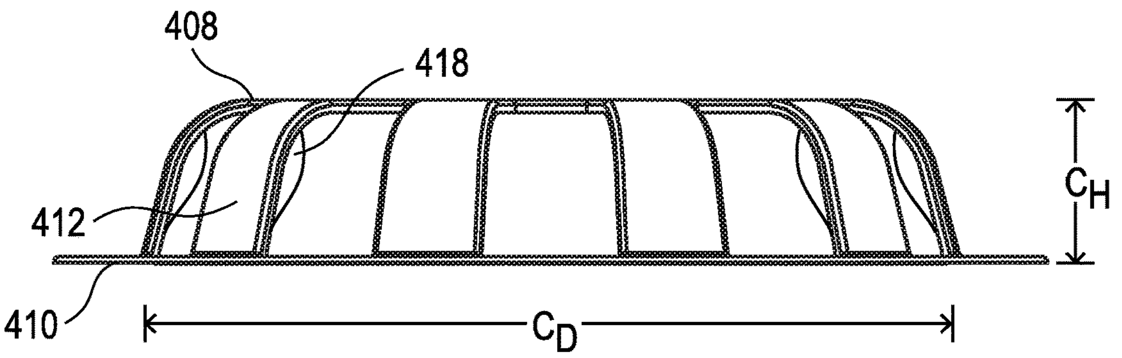
FIG. 41 includes a side view of a cage in accordance with an embodiment.

Referring now to FIG. 40, the cage 406 can have a top surface 408, a bottom surface 410, and at least one side wall 412 disposed between the top surface 408 and the bottom surface 410. The cage 406 can form any desired shape, such as, for example, a dome shape, a box shape, or any other polygonal shape which can allow the rotatable element 402 to freely rotate when engaged with a magnetic drive.

In further embodiments, the cage 406 can have at least one opening 414, and preferably a plurality of openings 414, extending through the side wall 412 of the cage 406. In a particular embodiment, the at least one opening 414 can allow for fluid communication between a first cavity 416, as defined by the cage 406, and a second cavity, as defined by a vessel, and as described in more detail below.

In particular embodiments, the at least one side wall 412 of the cage 406 can have at least one opening 414, and a preferably a plurality of openings 414, extending through the cage 406 which can allow fluid communication with the first cavity 416. As particularly illustrated in FIG. 40, the plurality of openings 414 can be spaced apart from each other. The plurality of openings 414 can take on any desired spacing or shape. In fact, a particular advantage of certain embodiments of the present disclosure is the customizability of the pattern of openings 414 or design of the cage 406. For example, the profile of the plurality of openings 414 and overall cage design can be customized to provide a desired baffling effect, ensuring that fluid does not settle within the first cavity 406 or elsewhere with the second cavity defined by a vessel, as will be described in more detail below.

In a particular embodiment, the cage 406 can include one or more fins 418. The fins 418 can at least partially extend from the side wall 412 of the cage 406 toward the rotatable element 402 disposed in the first cavity 416. The fins 418 can enhance the break and mixing of fluids including particulate or solids material. The fins 418 can extend towards the rotatable element 402, but the edge of the fins 418 should still be spaced apart from the rotatable element 402 to allow the rotatable element 402 to freely rotate.

In particular embodiments, at least one of the plurality of openings 414 can extend across a substantial portion, or even essentially all of the height $C_H$ of the cage 406. The height $C_H$ is defined by the distance between the top surface 408 and the bottom surface 410 the cage 406.

In particular embodiments, as illustrated in FIG. 40, the cage 406 can include a profile which as at least one arcuate surface 420 forming an outer surface of the cage 406. Further, in particular embodiments, the cage 406 can include a profile which includes at least two arcuate surfaces 406 forming an outer surface of the cage 406.

Figure 42:
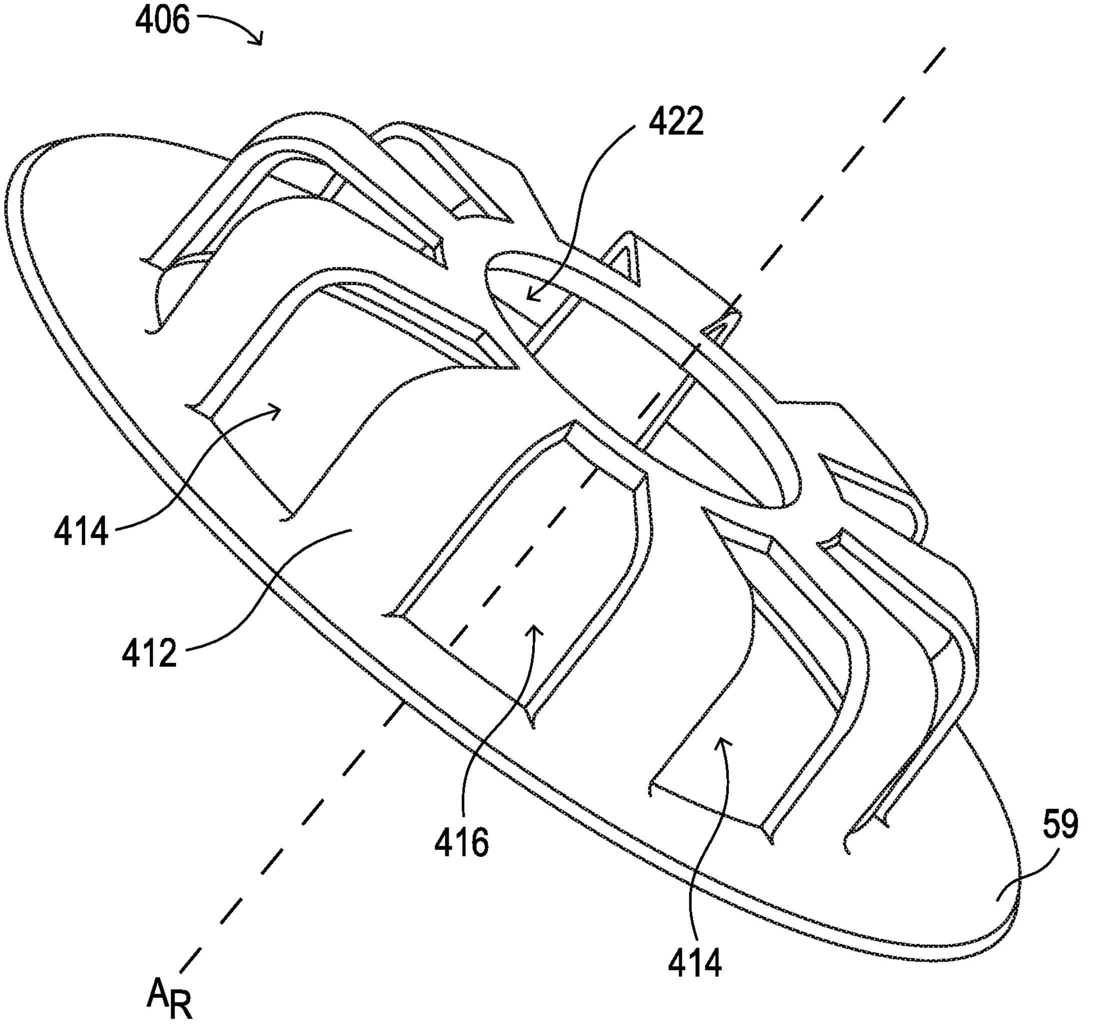
FIG. 42 includes a perspective view of a cage in accordance with an embodiment.
Figure 43:
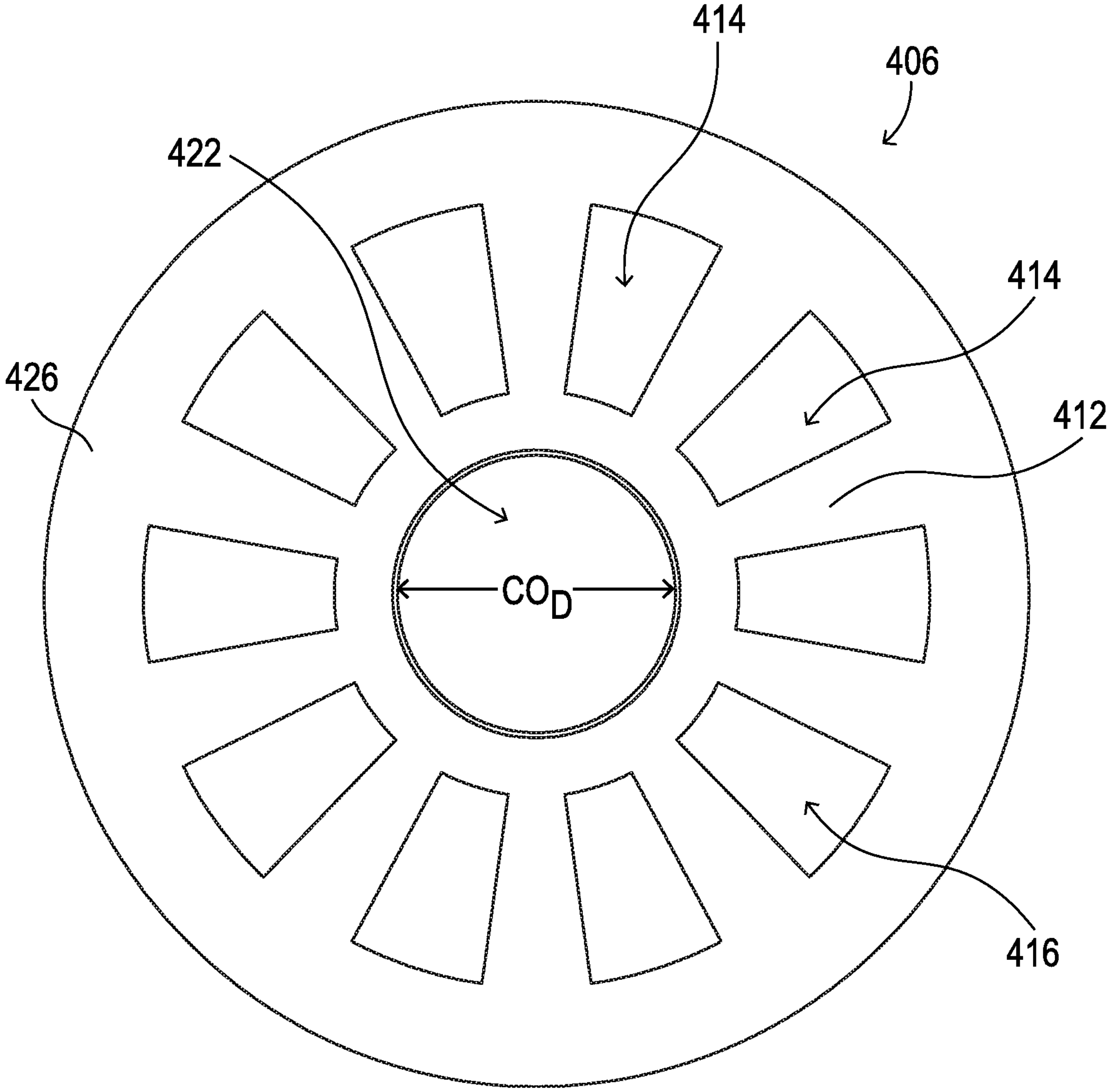
FIG. 43 includes a top view of a cage in accordance with an embodiment.

Referring particularly to FIGS. 42 and 43, the cage 406 can include a central opening 422 disposed about a desired or predetermined ideal axis of rotation $A_R$ of the rotatable element 402. A post 424 on the rotatable element 402 can extend through the central opening 422 of the cage 406. The profile of the central opening 422 can determine the maximum translational movement of the rotatable element, particularly the post 424, in a direction normal to the axis of rotation $A_R$. Accordingly, the cage 406 can be adapted to provide a maximum translation movement of the rotatable element 402 in a direction normal to an axis of rotation $A_R$ through the central opening 422. In certain embodiments, the central opening 422 can have a different shape than the other openings in the plurality of openings 414, such as the opening disposed on at least one side wall 412 of the cage 406 described above. In particular embodiments, the central opening 422 can have a generally annular or circular profile. In further embodiments, the opening 414 disposed on at least one side wall 412 of the cage 406 can be polygonal.

Figure 51:
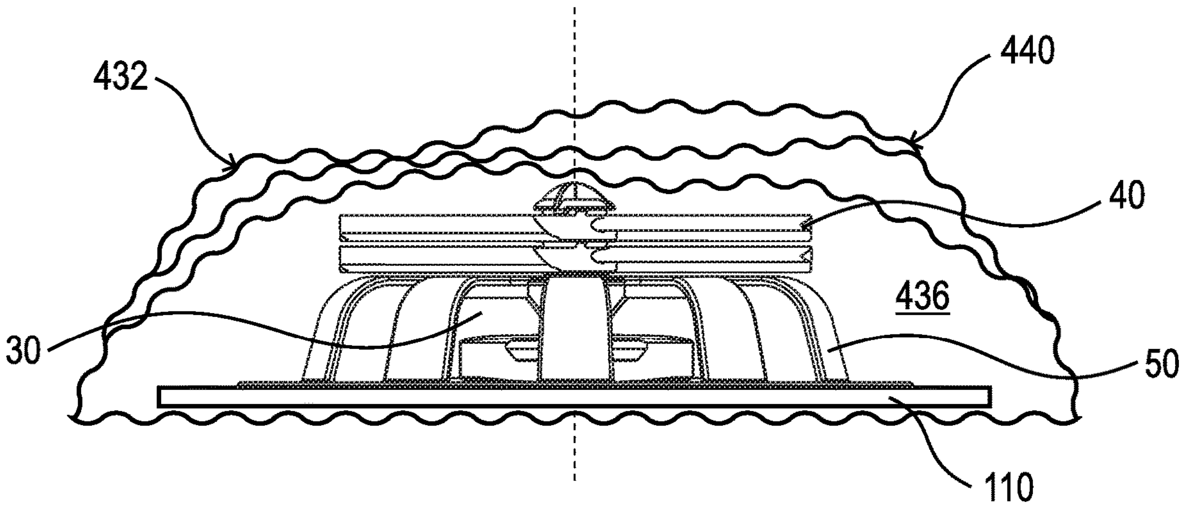
FIG. 51 includes a side view of a shipping kit in accordance with an embodiment.

As particularly illustrated in FIG. 43, which shows a top view of a cage 406, the central opening 422 of the cage 50 can have a diameter $CO_D$. Further, as illustrated in FIG. 51, the rotatable element 402 can have a diameter $H_D$. In certain embodiments, the diameter of the rotatable element, $H_D$, can be greater than the diameter of the central opening $CO_D$. In this way, the rotatable element 402 can not be removed in its operating orientation through the central opening 422 of the cage 406 once the cage 406 is connected to a vessel, base, or mixing dish. In a more particular embodiment, the rotatable element 402 can be sized such that it can not be removed through the central opening 422 of the cage 406 even when reoriented from its operating orientation.

Referring again to FIGS. 38 to 43, in particular embodiments the cage 406 can further include a flange 426, which can be disposed adjacent to the sidewall 412 of the cage 406 at a location opposite the top surface 408. The flange 426 can extend from the side wall 412 and form a mounting surface. For example, the flange 426 can be adapted to be connected to the floor of a vessel, a base, or a mixing dish, as described in more detail below. In particular embodiments, the flange 426 can be welded to the floor of a vessel, a base, or a mixing dish. In other embodiments, the flange 426 can be connected to the floor of a vessel, a base, or a mixing dish by a snap in connection or any other suitable connection method.

Figure 44:
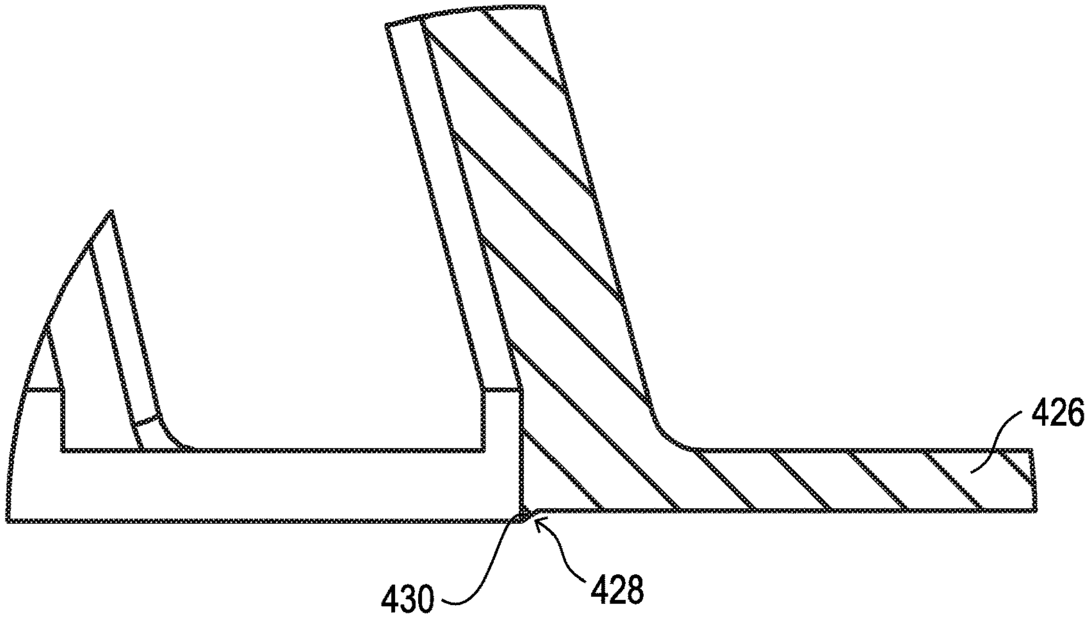
FIG. 44 includes a close up of Circle C in FIG. 40 in accordance with an embodiment.

As illustrated in FIG. 44, the flange 426 can further include a sealing portion 428 adapted to deter unmixed fluids and powders from being trapped under the flange 426. The sealing portion 428 can include an offset from the remainder of cage 406. The offset can include an angled edge 430 connecting the sealing portion 428 and the cage 406.

The cage 406 can be formed of any desirable material. In particular embodiments, the cage 406 can be formed from a material which does not chemically interact with the fluid to be mixed. In very particular embodiments, the cage 406 can be formed from a polymer material, such as, for example, a high density polyethylene (HDPE).

Figure 45A:
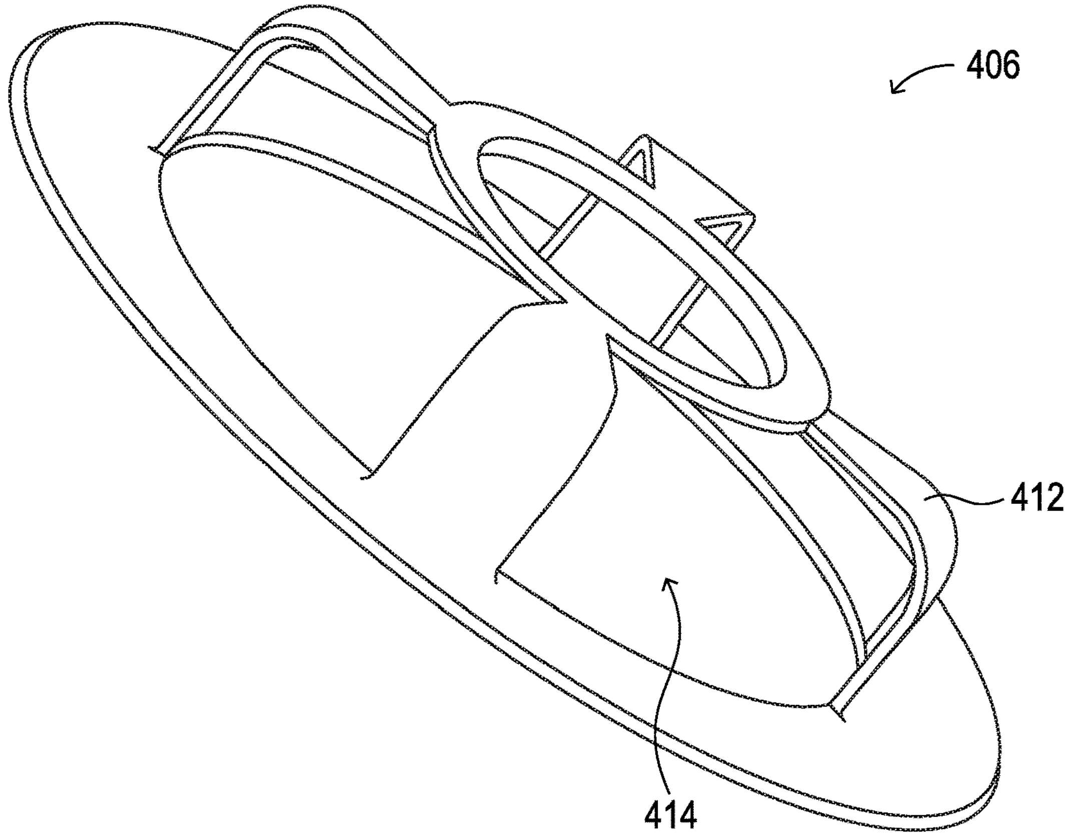
FIG. 45*a* includes a perspective view of a cage in accordance with an embodiment.
Figure 45B:
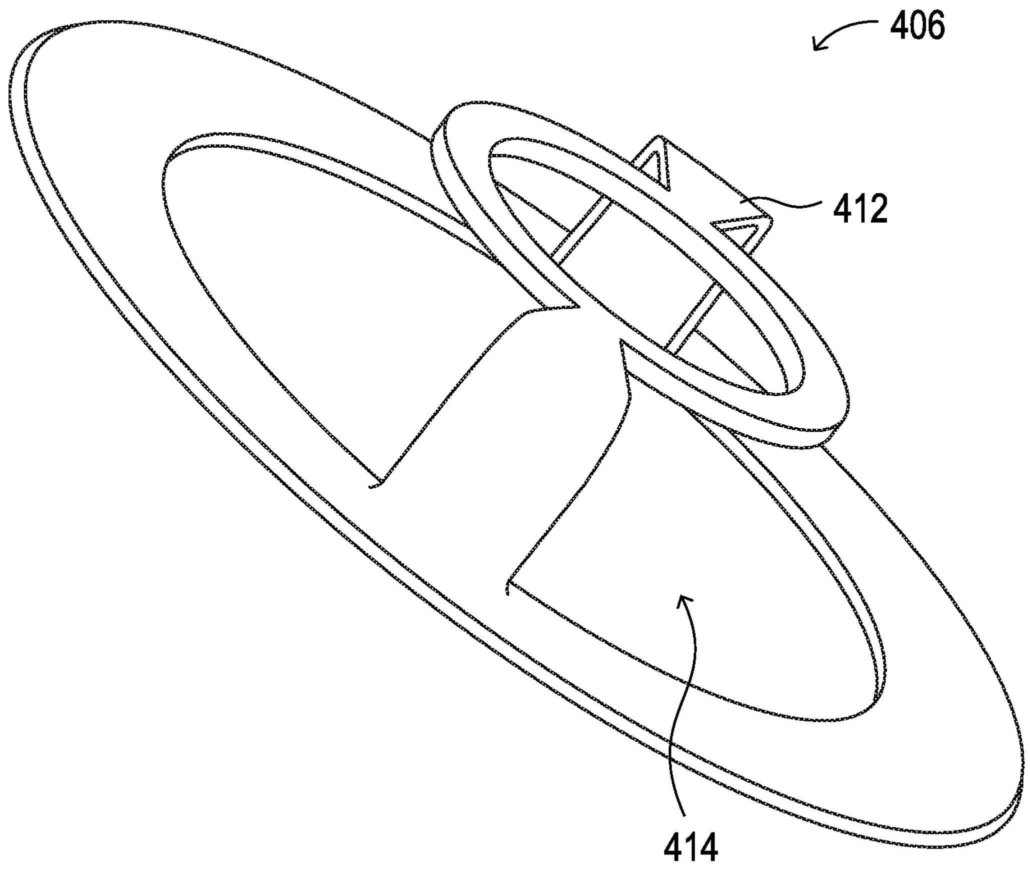
FIG. 45*b* includes a perspective view of a cage in accordance with an embodiment.

Referring now to FIGS. 45*a* and 45*b*, in certain embodiments, the cage 406 can have a small number of side walls 412, and relatively large cavities 414. In particular embodiments, the cage 406 can have no more than 6 sidewalls, no more than 5 sidewalls, no more than 4 sidewalls, no more than 3 sidewalls, no more than 2 sidewalls, or even no more than 1 sidewall. For example, FIG. 45*a* illustrates one embodiment having four sidewalls 412, and FIG. 46*a* illustrates one embodiment having two sidewalls 412.

Figure 45C:
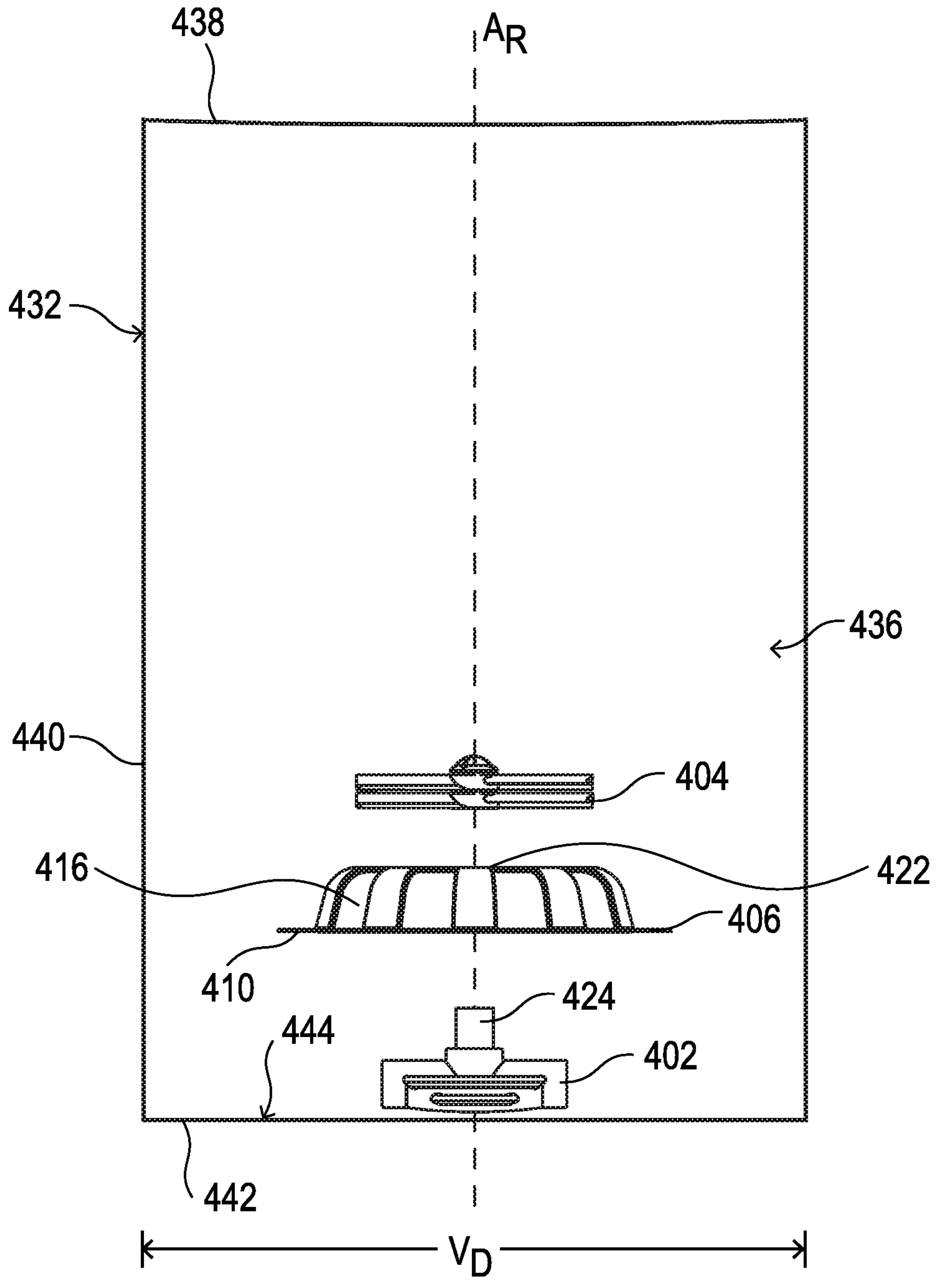
FIG. 45*c* includes an exploded front view of a magnetic impeller including a vessel in accordance with an embodiment.

Referring now to FIG. 45*c*, in certain embodiments, the magnetic impeller can further include a vessel 432. The interior of the vessel 432 can define a second cavity 436, which can be adapted to hold a fluid or fluids to be mixed. Further, as discussed above, the cage 406 can define a first cavity 416 such that the first cavity 416 and the second cavity 436 can be in fluid communication. For example, as discussed in more detail above, the cage 406 can have at least one opening, and particularly a plurality of openings, through which fluid can flow between the first cavity 416 and the second cavity 436.

As described above, in particular embodiments, the rotatable element 402 can have a post 424 disposed between and coupling the rotatable element 402 and the at least one blade 404. In such embodiments, the post 424 can extend into both the first cavity 416 and the second cavity 436. Further, the post 424 can extend into both the first cavity 416 and the second cavity 436 through the at least one opening, and particularly through a central opening 422 disposed about the desired axis of rotation $A_R$ of the rotatable element 402.

The vessel 432 can have a top surface 438, a side surface 440, and a bottom surface 442, defining a floor 444. In particular embodiments, the floor 444 can have a generally or even substantially flat surface.

In certain embodiments, the cage 406 can be connected to the floor 444 of the vessel 432. For example, as described above, the cage 406 can have a top surface 408, a bottom surface 410, and a side surface 412, and the bottom surface 410 of the cage 406 can be connected to the floor 444 of the vessel 432. In particular embodiments, the bottom surface 410 of the cage 406 can be directly connected to the floor 444 of the vessel 432. As used herein, the phrase "directly connected to the floor" refers to any connection method, such as welding, as well as removable connections, such as snap-in connections, or the like. Further, the phrase "directly connected to the floor" excludes the cage 406 being directly connected to a side wall 440 of the vessel 432 or a side wall of a mixing dish. As used herein, the phrase "mixing dish" includes any structure having a base and an annular side wall attached to the base 442.

Figure 46:
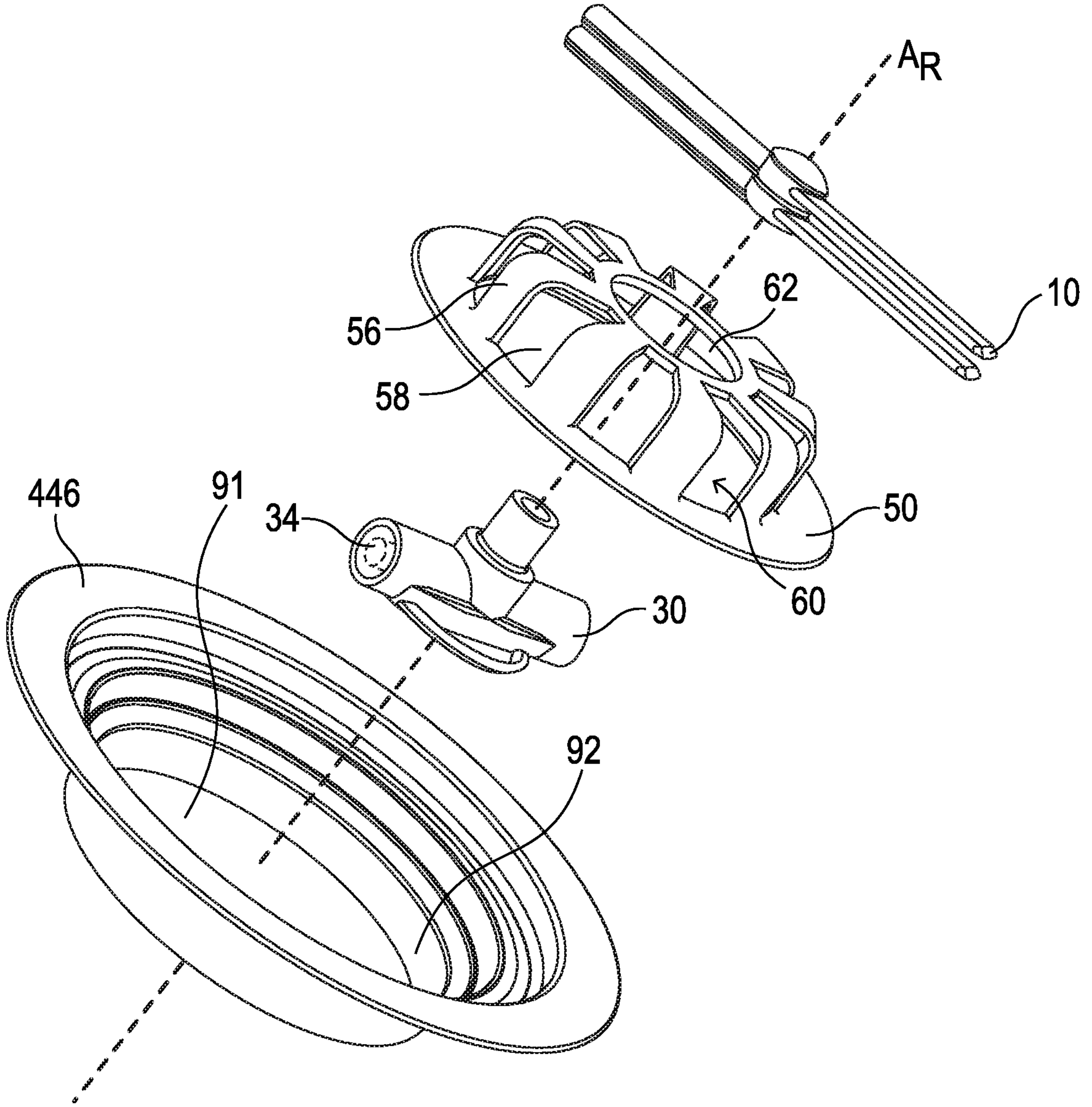
FIG. 46 includes an exploded perspective view of a magnetic impeller including a mixing dish in accordance with an embodiment.
Figure 47:
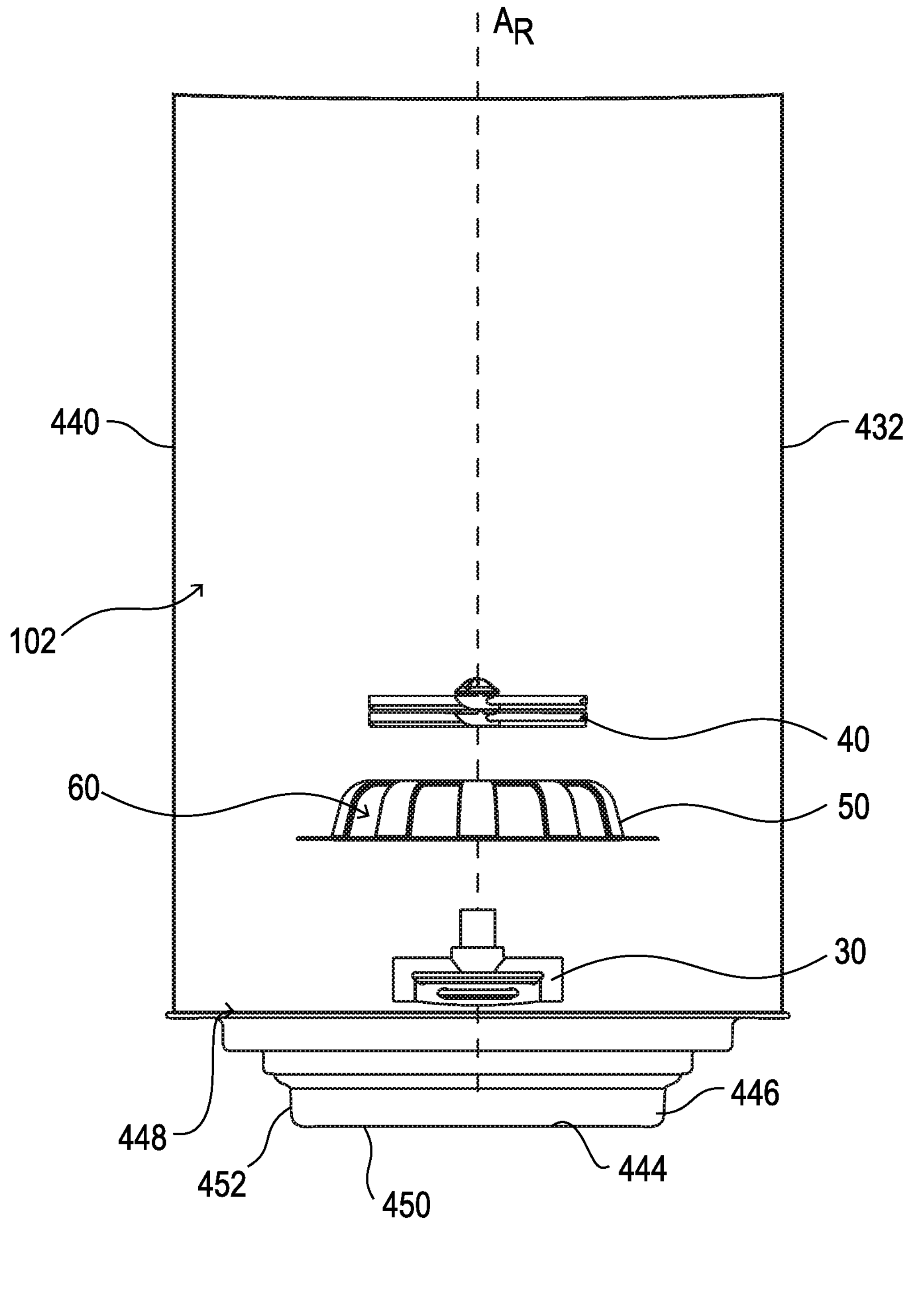
FIG. 47 includes a magnetic impeller including a mixing dish and a vessel in accordance with an embodiment.

Referring to FIG. 46, in particular embodiments, the magnetic impeller can include a mixing dish 446, and the mixing dish 446 can form a part of the vessel 432, or be disposed on or otherwise connected to or form an integral part of the vessel 432. In particular embodiments, such as illustrated in FIG. 47, the mixing dish 446 can form an interior surface 448 of the vessel 432. In certain embodiments, the mixing dish 446 can have a floor 450, and the floor 450 of the mixing dish 446 can form the floor 444 of the vessel 432 as described above. Therefore, in such embodiments, the cage 406 can be connected, or even directly connected, to the floor 444 of the mixing dish 446.

In particular embodiments, the mixing dish 446 can have at least one annular side wall 452, which in certain embodiments, can also have a rigidity greater than that of the at least one flexible side wall 440 of the vessel 432. As described above, the cage 406 can be connected to the floor 444, and when the mixing dish 446 includes an annular side wall 452, the side surface 414 of the cage 406 can be spaced apart from the annular side wall 452 of the mixing dish 446 by a predetermined or desired distance.

Figure 48:
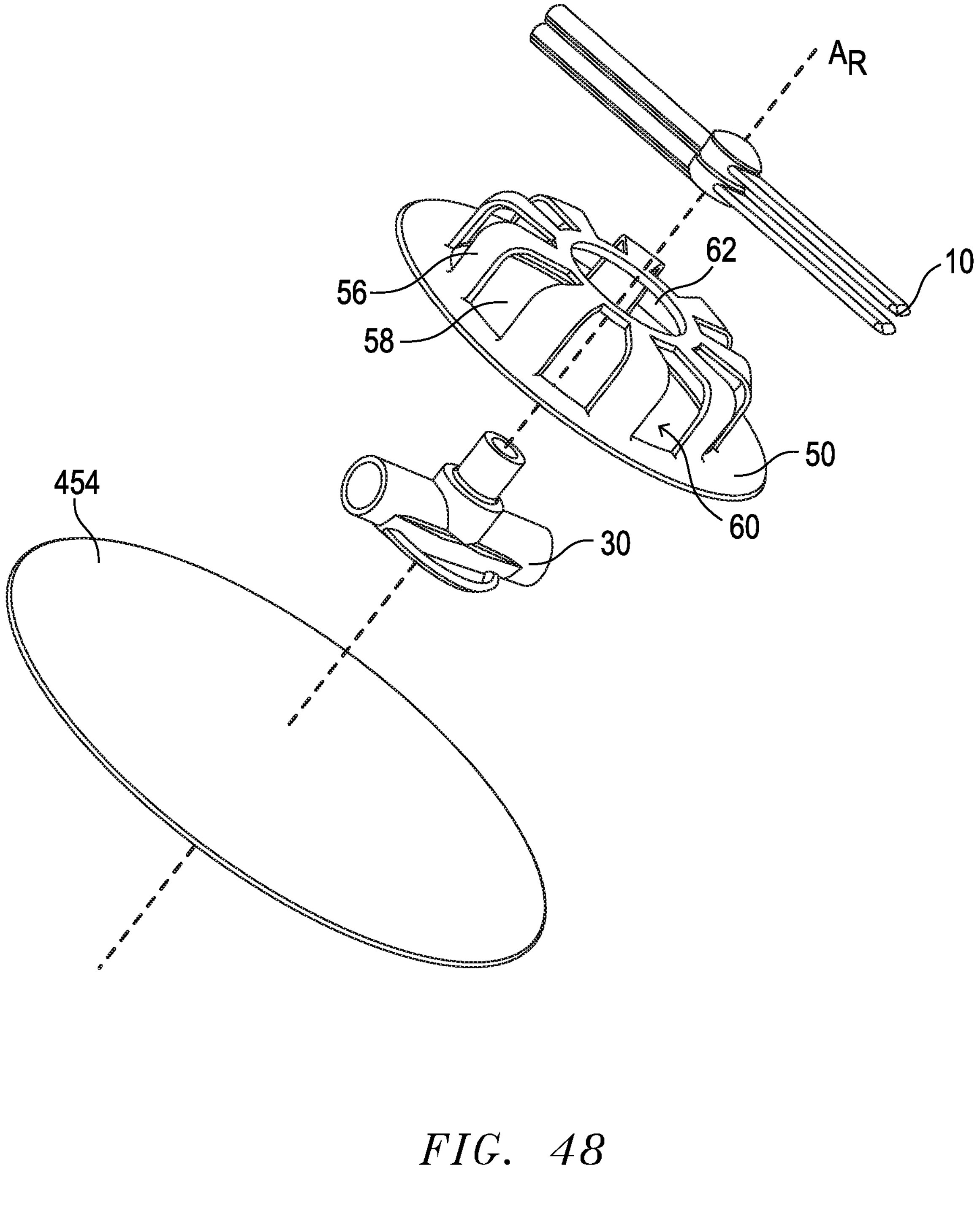
FIG. 48 includes an exploded perspective view of a magnetic impeller including a base in accordance with an embodiment.

In other embodiments, as particularly illustrated in FIG. 48, a magnetic impeller can not include a mixing dish, but rather can include a base 454. The base 454 can be devoid of an annular side wall extending at a sharp angle about the entire outer profile of the base 454. As used herein, the term "base" includes a generally planar surface, which does not include a complete annular side wall unitary with the base. The definition of the term "base" includes a structure having a partial annular side wall unitary with the base. Further, the definition of the term "base" includes a structure having a partial or complete annular side wall forming a part of the cage when the cage 406 is connected to the base 454. The base 454 can form any desirable shape. In certain embodiments, the base 454 can have a generally disc or circular shape. In other embodiments, the base 454 can have any polygonal shape. In further embodiments, the base 454 can have a higher rigidity than the at least one flexible side wall 440 of the vessel 432. The base 454 can have a generally flat contour or in other embodiments, can be tapered toward the center.

Figure 49:
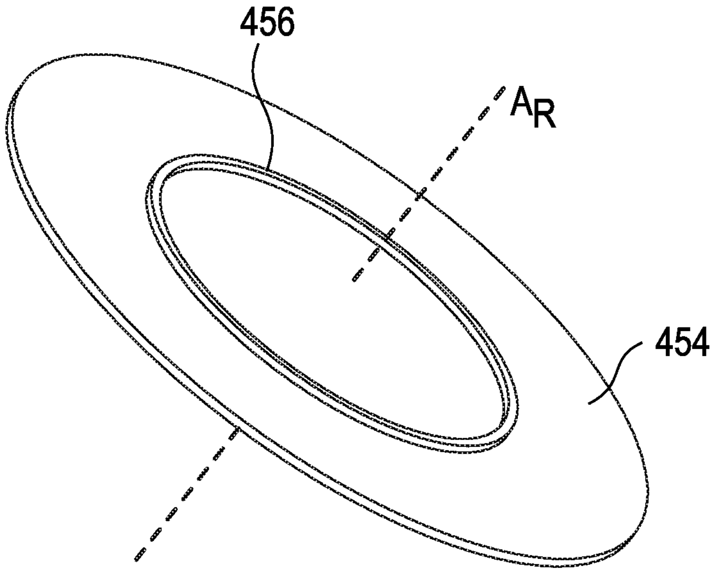
FIG. 49 includes a perspective view of a base in accordance with an embodiment.

Referring to FIG. 49, in very particular embodiments, the base 454 can have a protrusion 456 disposed about the desired axis of rotation $A_R$ of the rotating element 402. The protrusion 456 can be in the form of a ring or have a generally annular shape. The protrusion 456 can act to limit the translational movement of the rotating element 402 normal to the desired axis of rotation $A_R$ of the rotating element 402 when the rotating element 402 is rotating. The protrusion 456 can have a generally small height. For example, the protrusion 456 can have a height of less than 2 inches, such as less than 1 inch, less than 0.5 inches, or even less than 0.25 inches, wherein the height is defined as a distance the protrusion 456 extends in a direction normal to the major surface of the base 454.

Figure 50:
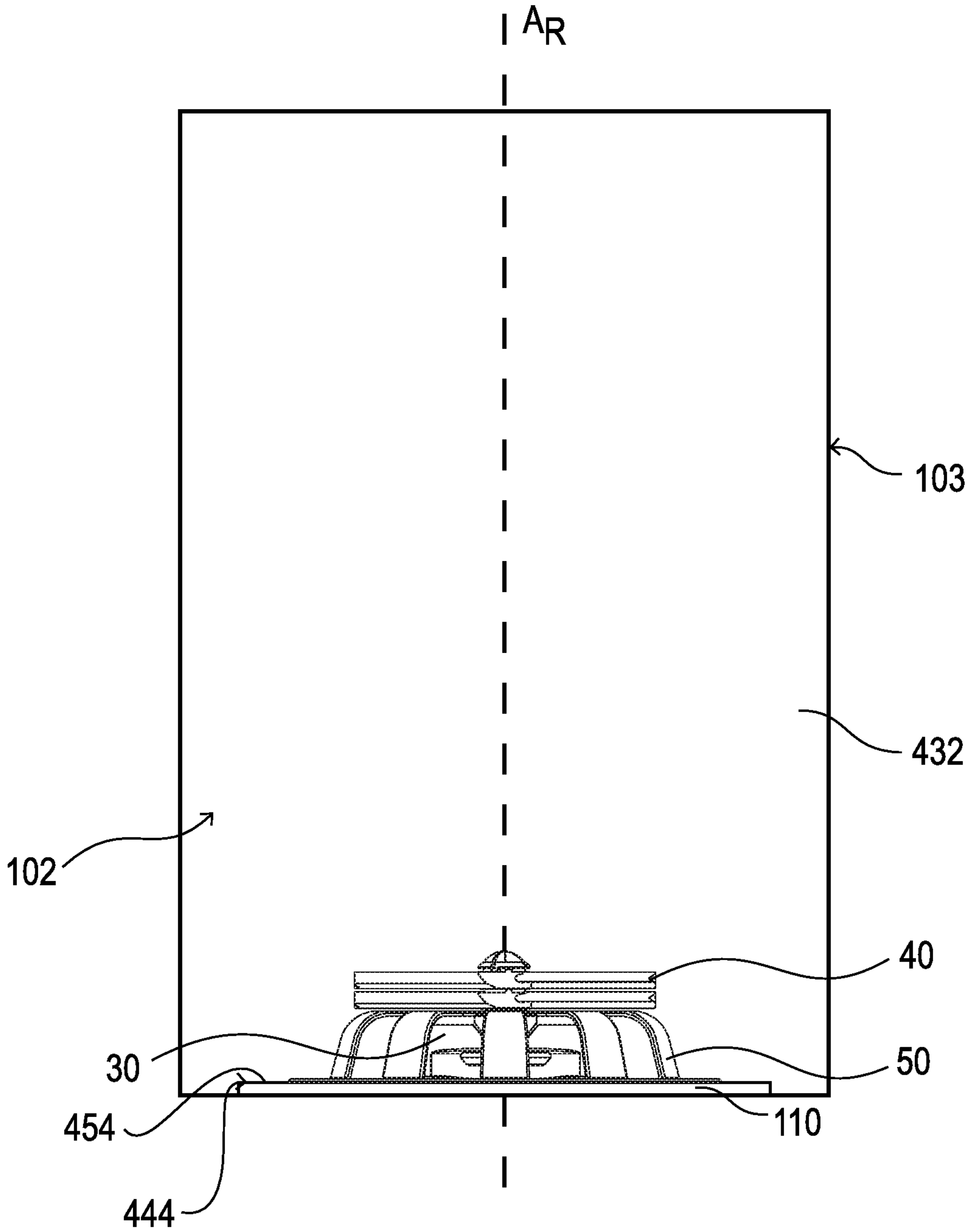
FIG. 50 includes a side view of a magnetic impeller including a base and a vessel in accordance with an embodiment.

Referring to FIG. 50, in certain embodiments, the base 454 can form an interior surface 444 of the vessel 432. In particular embodiments, the base 454 can form essentially the entire bottom interior surface 444 of the vessel 432. For example, the base 454 can be disposed on or connected to a flexible vessel 432 such that the flexible vessel 432 forms the bottom outer surface 444 and the base 454 forms the bottom interior surface 444. In other embodiments, the base 454 can form both the bottom interior surface and the bottom outer surface.

In further embodiments, as illustrated, for example, in FIGS. 59 to 63, the base 454 can include an overmolded ring 1400 encapsulating a magnetic element (not illustrated). For example, the magnetic element can disposed between two portions of the base 454 and the overmolded ring 1400 can seal the two base portions together and encapsulate the magnetic element within the base. Overmolding of the ring 1400 can be performed through one or more suitable overmolding processes. For example, the ring 1400 can be molded in situ with the two base portions. In another embodiment, the ring 1400 can be at least partially prepared prior to engagement with the two base portions. Molding can be done through one or more processes including, for example, injection molding, extrusion molding, blow molding, compression molding, laminating, or any combination thereof. The process of molding the ring 1400 to the two base portions can seal an internal cavity of the base 454, preventing fluid contact with the magnetic element. Simultaneously, the molding process can create a desirable outer edge of the base 454. For example, in certain embodiments, it may be desirable for the bases 454 to include a soft outer edge. Use of soft materials in forming the ring 1400 can create this desired characteristic. In other embodiments, the ring 1400 can provide a balancing function, stabilizing the base 454 and mitigating unwanted wobble which may occur with light-weight bases 454 rotating at high speeds.

In certain embodiments, the ring 1400 can undergo one or more additional machining steps after molding. For example, the ring 1400 can be blasted with a medium, scraped, sanded, cut, speckled, or otherwise acted upon to create a desired material characteristic.

Referring to FIG. 51, as discussed above, in certain embodiments, the vessel 432 can have at least one flexible side wall 440. Accordingly, in certain embodiments, the vessel 432, and particularly, the at least one flexible side wall 440 of the vessel 432 can be at least partly collapsible. Further, the vessel 432 can be hermitically sealed from the outside environment and the second cavity 436 of the vessel 432 can be sterile.

In further embodiments, in addition to the at least one flexible side wall 440, the vessel 432 can further include a bottom surface 444. The bottom surface 444 can have a greater rigidity than the at least one flexible side wall 440. The bottom surface 444, having a greater rigidity that the at least one flexible side wall 440, can also be referred to herein as a “rigid surface.” The bottom surface 444 can be adapted to be an engaging surface with the rotatable element 402. The bottom surface 444 can be formed by the floor of the mixing dish or the base in a manner as described above.

In particular embodiments, the vessel 432 can include a side wall 440 that has a flexible portion and a rigid portion. The rigid portion of the side wall 440 can be disposed adjacent the bottom surface, and the flexible portion adjacent to the rigid portion.

Referring again to FIG. 42, in certain embodiments, the rotatable element 402 can be free standing. For example, the rotatable element 402 can be physically decoupled from the vessel 432 or the mixing dish or the base, where applicable. Accordingly, in certain embodiments, the rotatable element 402 can be free to translate in a direction normal to the axis of rotation $A_R$ of the rotatable element 402.

Figure 52:
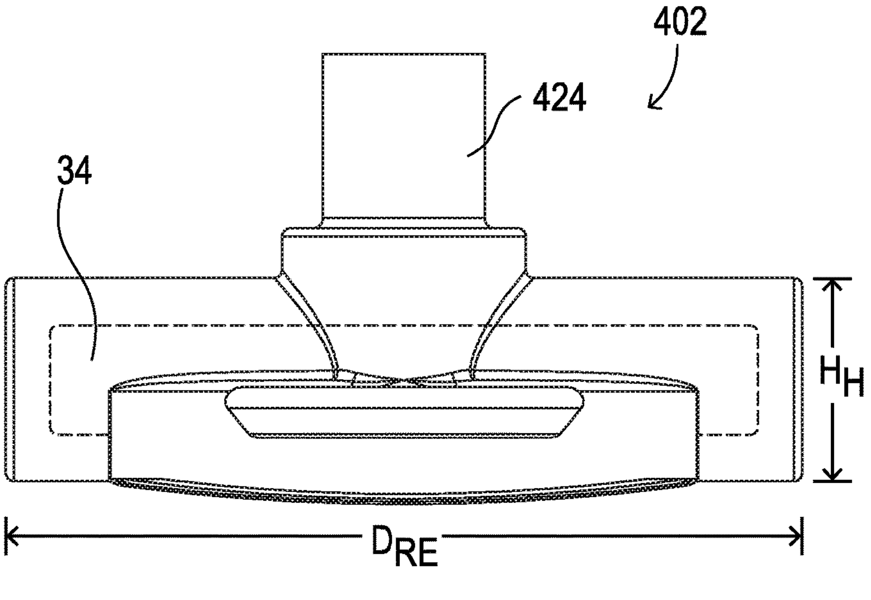
FIG. 52 includes a side view of a rotatable element in accordance with an embodiment.

Referring to FIG. 52, in certain embodiments, the rotatable element 402 can have a height $H_{RE}$, as determined as the longest height along the axis of rotation $A_R$, viewing from the side, excluding the post 424. Further, as discussed above, the cage 406 can have at least one side wall 412 having a height $C_H$ as determined as the distance between the top surface 408 and the bottom surface 410. In particular embodiments of the present disclosure, the height $C_H$ of the at least one sidewall 412 can be greater than the height, $H_{RE}$, of the rotatable element.

The rotatable element 402 can have a diameter $D_{RE}$, and the cage can have a diameter $C_D$, as measured between diametrically opposite locations of the side wall 412. In certain embodiments, a ratio of $C_D/H_D$ can be greater than 1, such as at least 1.2, at least 1.3, at least 1.4, or even at least 1.5. In a further aspect, $C_D/H_D$ can be no greater than 20, such as no greater than 15, no greater than 10, no greater than 5, or even no greater than 2. Moreover, the ratio of $C_D/H_D$ can be within a range between and including any of the values described above, such as, for example, between 1.3 and 1.4. Such a ratio can allow the rotatable element 402 to freely rotate without interacting with a sidewall 412 of the cage 406.

As described in one or more embodiments herein, the magnetic impeller can be free-standing. For example, the magnetic impeller can be decoupled or not physically attached to the vessel. Accordingly, the magnetic impeller can be used with a wide variety of shapes and sizes of vessels.

Referring again to FIGS. 25 to 28, in particular embodiments, the vessel 340 can have an opening 342 which is smaller than the cross sectional area of the body 344 of the vessel 340. In very particular embodiments, the vessel can be a carboy. As used herein, a “carboy” refers to any vessel having a neck which is narrower than the body of the vessel, such as illustrated in FIGS. 25 to 28. As illustrated in FIGS. 25 to 28, the vessel can have a generally cylindrical shape. In other embodiments, the vessel can have any shape, such as rectangular, cylindrical, polygonal, or any other appropriate shape to retain fluid therein.

The magnetic impeller described in accordance with one or more embodiments herein can even be used with a vessel having a convex bottom wall, without substantial walking or disengagement from the magnetic drive. Although, as will be described in more detail below, particular advantageous embodiments include a substantially planar bottom well of the vessel. As discussed above, magnetic impellers which have improved the mixing ability beyond a traditional magnetic stir bar require some type of physical attachment to a vessel or a specialized vessel in order to stably drive a magnetic impeller.

Figure 53:
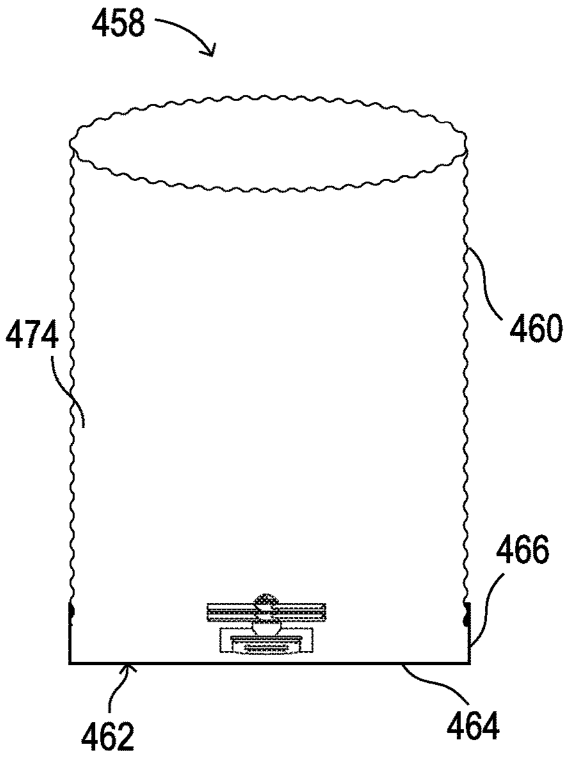
FIG. 53 includes a cross section of a magnetic impeller including a flexible vessel having a rigid portion in accordance with an embodiment.

As illustrated in FIG. 53, the magnetic impeller can include a flexible vessel 458. As used herein, the phrase “flexible vessel” refers to a vessel having at least one flexible surface such that the flexible vessel can at least partially conform to an interior contour of a rigid vessel when filled with fluid. In particular embodiments, the flexible vessel 458 can be partially rigid and include at least one flexible surface, such as a flexible side wall 460. The flexible bag can further include a rigid member 462. The rigid member 462 can at least partially define a bottom wall 464 of the flexible vessel 458. In very particular embodiments, the flexible vessel 458 can further include at least one partially rigid sidewall including a flexible side wall portion 460 and a rigid side wall portion 466.

As used herein, the phrase the rigid member 462 refers to a material having a greater rigidity than the flexible portion 460 of the flexible vessel 458. For example, the rigid member 462 can be adapted to provide a surface having a higher rigidity than the flexible portion 460 of the flexible vessel 458 upon which the magnetic impeller can rotate.

Referring now to FIG. 53, in very particular embodiments, the rigid member 462 can include a substantially planar surface 468. For example, in very particular embodiments, the planar surface 468 can be generally flat. In even further particular embodiments, the rigid member 462 can have a general disc or plate shape. In other embodiments, the rigid member 462 can include a major surface having a convex or concave curvature.

In very particular embodiments of the present disclosure, the rigid member 462 or any other structure within the vessel can be devoid of a coupling structure which physically limits the movement of the fluid agitating element about the bottom wall 464 of the vessel.

Figure 54:
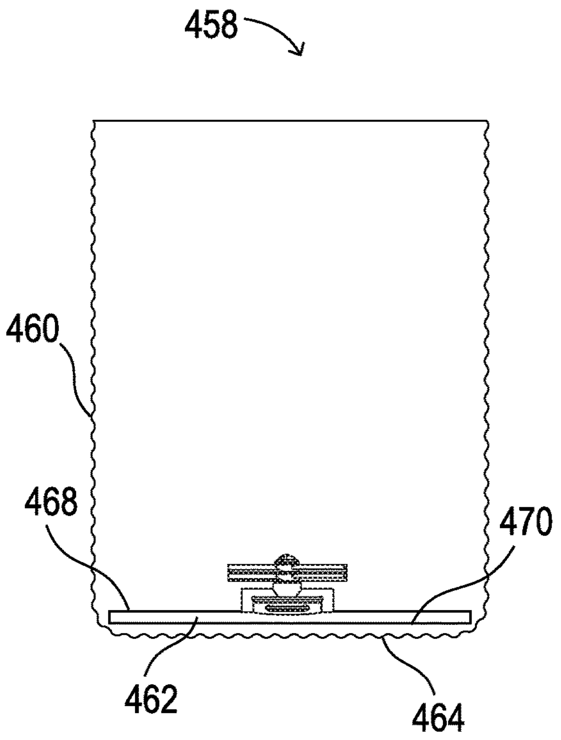
FIG. 54 includes a cross section of a magnetic impeller including a flexible vessel and a rigid member in accordance with an embodiment.
Figure 55:
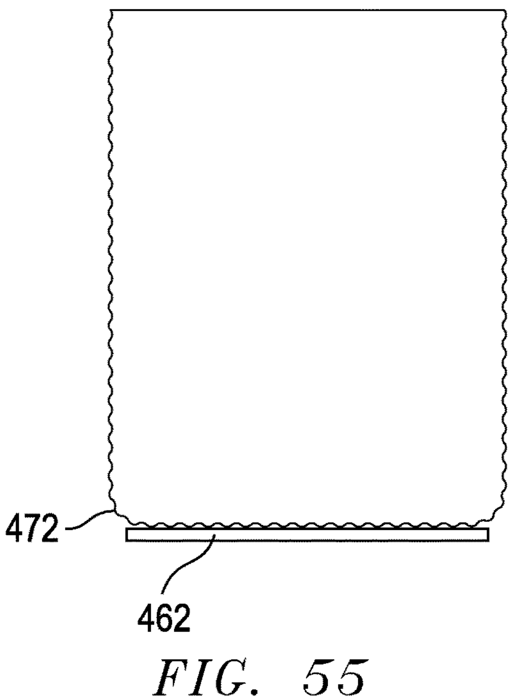
FIG. 55 includes a cross section of a magnetic impeller including a flexible vessel and a rigid member in accordance with an embodiment.

In certain embodiments, the rigid member 462 can be attached to or connected to the flexible vessel. For example, the rigid member 462 can be welded to the vessel. In certain embodiments, as illustrated in FIG. 54, the rigid member 462 can be attached to an interior surface 470 of the vessel, and particularly to an interior surface of the flexible sidewall 460 of the vessel. In other embodiments, as illustrated in FIG. 55, the rigid member 462 can be attached to an exterior surface 472 of the vessel. In particular embodiments, the rigid member 462 can be attached to the vessel such that the rigid member 462 at least partially forms a bottom wall 464 of the vessel.

In certain embodiments, the flexible vessel 458 can be sealed. For example, the flexible vessel 458 can define an interior cavity 474, and the interior cavity 474 can be hermetically sealed from the environment. In particular embodiments, the magnetic impeller can be sealed inside the flexible vessel 458. In particular embodiments, the interior cavity 474 can be sterile.

Figure 56:
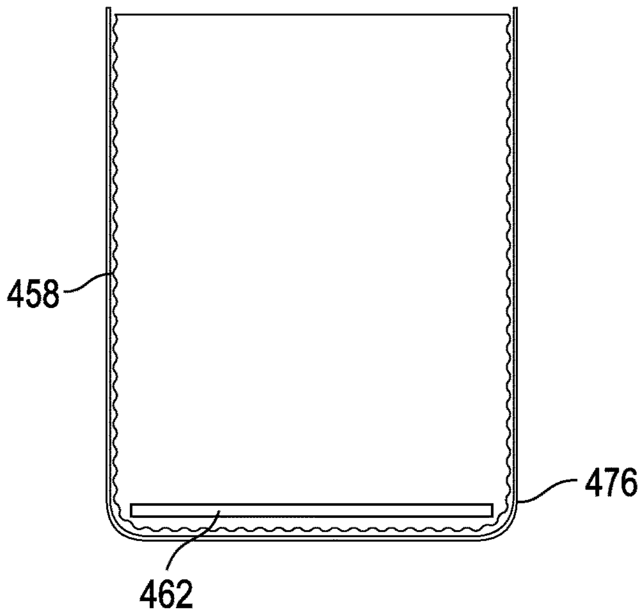
FIG. 56 includes a cross section of a magnetic impeller including a rigid vessel, a flexible vessel, and a rigid member in accordance with an embodiment.

Referring now to FIG. 56, in further embodiments of the present disclosure, the magnetic impeller can include a flexible vessel 458, a rigid vessel 476, and a magnetic impeller disposed within the flexible vessel 458. The flexible vessel can be adapted to be disposed within the rigid vessel. The flexible vessel 458 can be disposable, also referred to as a single use vessel.

The flexible vessel 458 or the rigid vessel 476 can be adapted to hold between 5 liters and 500 liters of fluid, or even between 50 liters and 300 liters of fluid.

In certain embodiments, the rigid vessel 476 can have a generally cylindrical shape. In another embodiment, the rigid vessel 476 can have a generally planar bottom wall.

In very particular embodiments, the rigid vessel 476, the flexible vessel 458, or the rigid member 462 can include a polymeric material.

Figure 57:
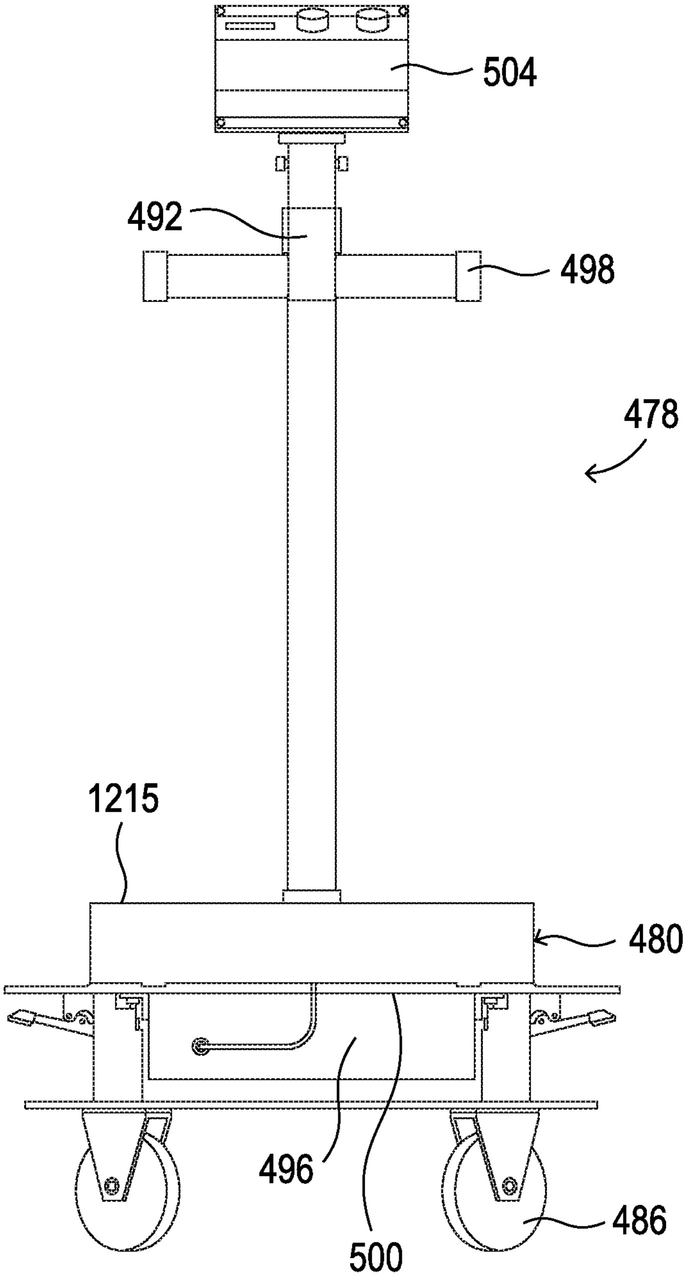
FIG. 57 includes a front view of a magnetic impeller including a cart in accordance with an embodiment.
Figure 58:
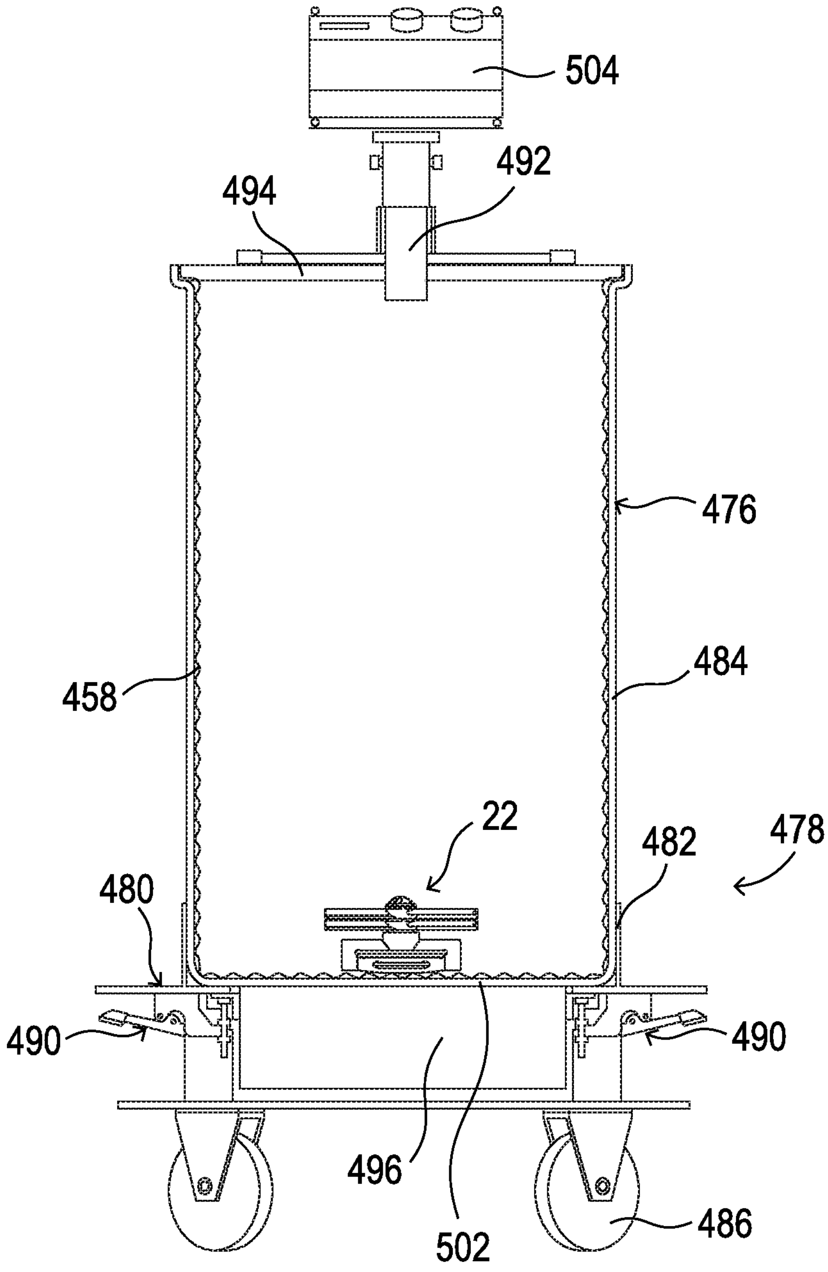
FIG. 58 includes a cross section of a magnetic impeller including a cart, a rigid vessel, and flexible vessel in accordance with an embodiment.
Figure 59:
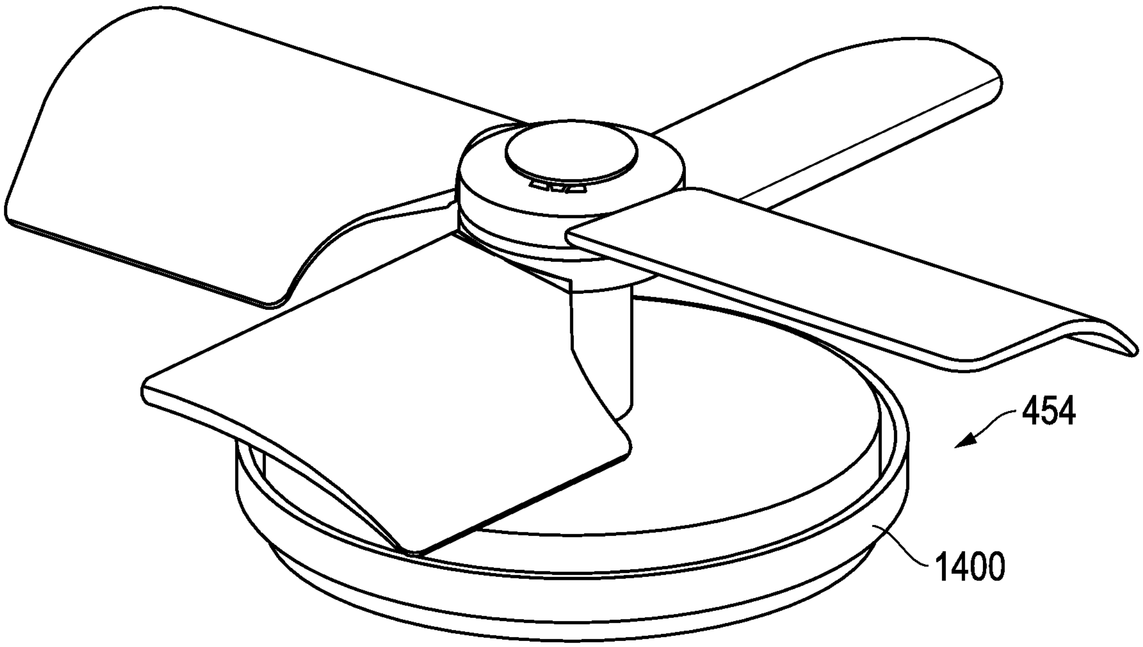
FIG. 59 includes a top perspective view of a magnetic impeller in accordance with an embodiment.

Referring now to FIGS. 57 and 58, in further embodiments of the present disclosure, the magnetic impeller can further include a cart 478. FIG. 57 illustrates a front view of a cart without a vessel, and FIG. 58 illustrates a cross-section of a magnetic impeller including a cart 478, a rigid vessel 476 and a flexible vessel 458 with a magnetic impeller (e.g., magnetic impeller 300) disposed within the flexible vessel 458. The cart 478 can include a stand 480 which can be adapted to support and hold components of the magnetic impeller in desired positions or orientations. For example, the stand 480 can be adapted to hold the rigid vessel 476 in an upright position. The stand 480 can include a supporting structure 482 adapted to receive and hold at least a portion of the side wall 484 of the rigid vessel 476.

In further embodiments, the stand 480 can be a dynamic stand adapted to accommodate a wide variety of tank sizes. In particular embodiments, the stand 480 can include an adjustable supporting structure. The adjustable supporting structure can include, for example, a pivotable member, a rotatable member, a translatable member, or a member having a combination of adjustable features, which can adjust to accommodate different tank sizes. One or more fasteners can hold the adjustable supporting structure in position. In an embodiment, the fasteners can include mechanical fasteners which can be selectively engaged to prevent relative movement of the adjustable supporting structure. In certain embodiments, the fasteners can be secured at certain preset locations such that the adjustable supporting structure is selectively adjustable between a finite number of positions. In other embodiments, the fasteners can be secured at any location along a portion of the base.

The cart 478 can further include at least one wheel or roller 486, such as a caster. In other words, the cart 478 can be adapted to be easily movable, even when the vessels are filled with a fluid. In this regard, the cart 478 can further include a handle 490. The handle 490 can be adapted to aid a user in manually moving the cart 478 and entire magnetic impeller. The cart 478 can further include a stabilizing structure 492. The stabilizing structure 492 can be coupled to the rigid vessel 476 to aid in preventing the rigid vessel 476 from tipping over when filled with fluid. In particular embodiments, the stabilizing structure 492 can be coupled to the rigid vessel near a top edge 494, such as near the open side or edge of the rigid vessel 476. In further embodiments of the present disclosure, the magnetic impeller can further include a magnetic drive 496. The magnetic drive 496 can be adapted to drive or rotate the magnetic element coupled with the magnetic impeller 300, thus initiating mixing.

In certain embodiments, the cart 478 can further be adapted to hold the magnetic drive 496. In particular embodiments, the cart 478 can be adapted to releasably hold the magnetic drive 496. For example, the cart 478 can include a clamping mechanism 498 adapted to hold the magnetic drive 496 directly adjacent to and contacting a surface of the stand 500 or a bottom wall 502 of the rigid vessel 476.

In further embodiments, the magnetic impeller can further include a controller 504. The controller 504 can be in communication with inlet lines and outlet lines and can be adapted to control fluid flowing into and out of the magnetic impeller. In other embodiments, the controller 504 can be in communication with the magnetic drive 496 and can be adapted to control the magnetic drive 496, particularly the speed at which the magnetic drive operates. In still further embodiments, the controller 504 can be adapted to control fluid flowing into and out of the magnetic impeller and be adapted to control the magnetic drive 496, and thus the speed of rotation of the magnetic impeller 300. The controller 504 can be coupled to the cart 478. In particular embodiments, the controller 504 can be coupled to the cart 478 proximate the handle 490.

The rigid or flexible vessel can be made out of any desirable material. For example, the rigid or flexible vessel can contain a polymer, a metal or metallic material, ceramic, glass, or a fibrous material. In particular embodiments, the rigid vessel can include a rigid polymeric material.

Figure 63:
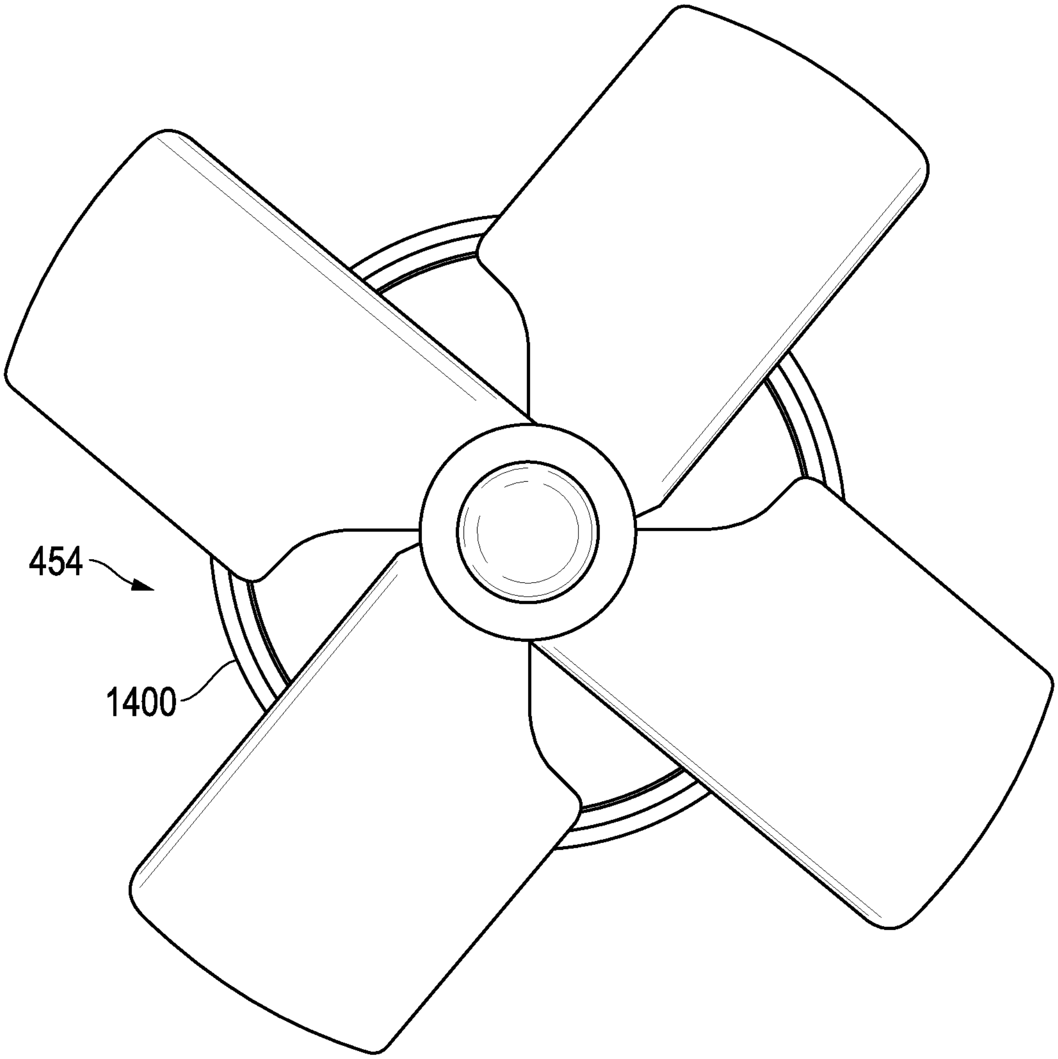
FIG. 63 includes a top view of a magnetic impeller in accordance with an embodiment.
Figure 64:
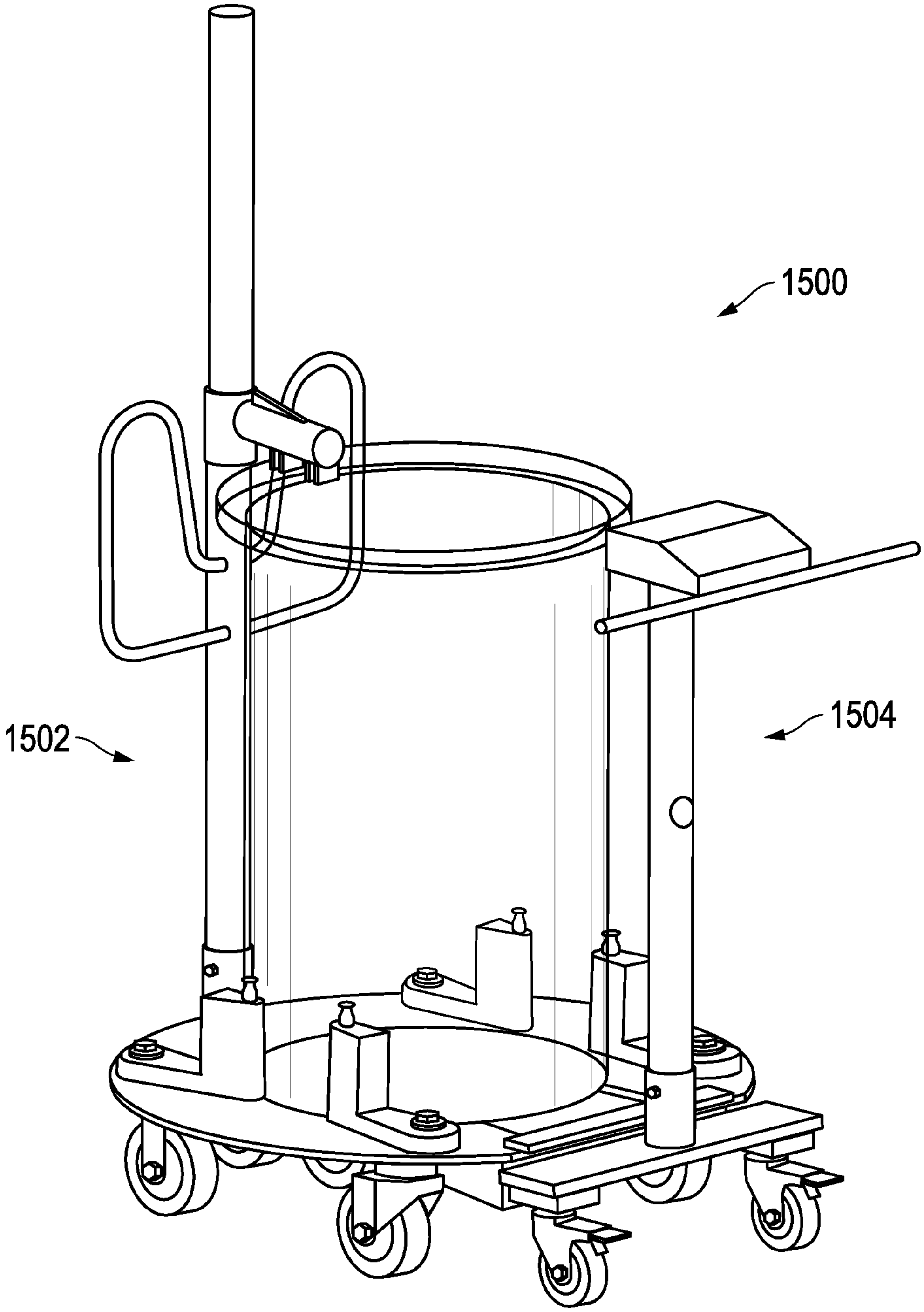
FIG. 64 includes a perspective view of a cart system in accordance with an embodiment, as seen after engagement of the first cart with the second cart.
Figure 65:
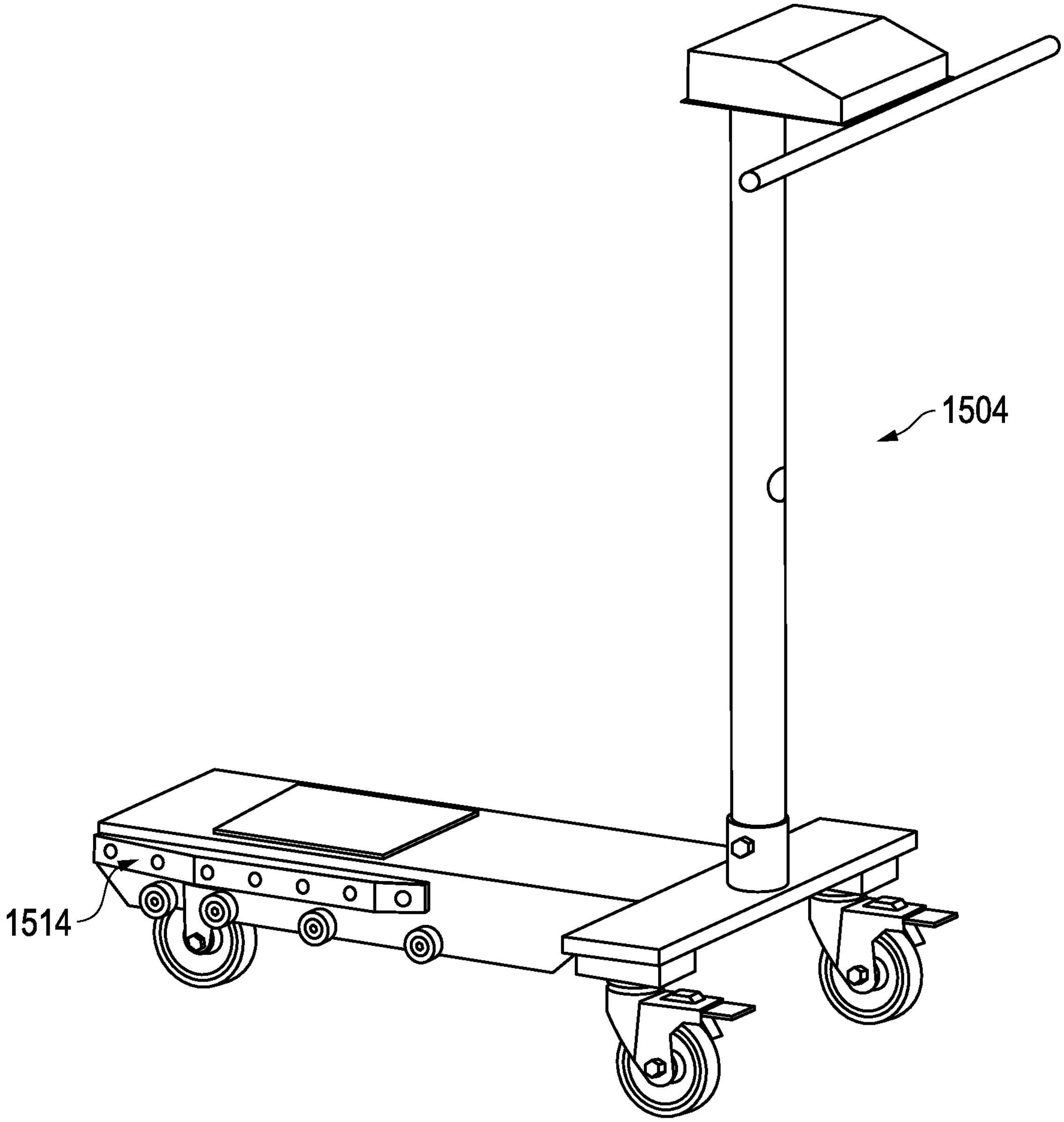
FIG. 65 includes a perspective view of a second cart in accordance with an embodiment.

In further embodiments, as illustrated in FIGS. 63 to 65, the magnetic impeller can include a modular cart assembly 1500 including a first cart 1502 and a second cart 1504. The modular cart assembly 1500 can include all the features of the cart 478 discussed above. For example, in certain embodiments, the first cart 1502 can include the rigid vessel 476 and the flexible vessel 458 with the magnetic impeller (e.g., magnetic impeller 300) disposed within the flexible vessel 458. The first cart 1502 can include the stand 480 which can be adapted to support and hold components of the magnetic impeller in desired positions or orientations. Further, in certain embodiments, as illustrated in FIG. 64, the second cart 1502 can be a separate cart housing the magnetic drive 496.

The first and second carts 1502, 1504 can be coupled to each other. In particular embodiments, the first cart 1502 can be adapted to receive the second cart 1504. The first cart 1502 can include a first complimentary feature, such as an alignment channel 1512 and the second cart can include a second complementary feature, such as a guide 1514 to accurately align the second cart 1504 within the alignment channel so that the magnetic drive is in the proper location for driving the magnetic impeller, as illustrated in FIG. 65. The modular cart assembly can include a lock to secure the second cart 1502 and the magnetic drive 496 in the appropriate position.

In more particular embodiments, the modular cart assembly can include a plurality of first carts 1502 each adapted to receive the second cart 1504. Further, the plurality of first carts 1502 can each include the same size vessel or at least one cart 1502 can include a different size vessel. In certain embodiments, the separate carts may allow the second cart 1504 containing the magnetic drive 496 to not be dedicated to a single vessel but to move from one first cart 1502 to another first cart 1502. This may promote system versatility and can reduce the number of magnetic drives required for complex mixing operations.

Further embodiments of the present disclosure are directed to magnetic impellers having improved mixing performance, which can be described, for example, as high particle suspension at low RPMs. Such improvement can be seen in both the circulation and, particularly, the ability to maintain particulates in suspension during a mixing operation. For example, one type of particulate suspension is cell suspension, which is used in the pharmaceutical and biological industries. One way to describe and quantify the ability of a magnetic impeller to maintain particulates in suspension is the Particulate Suspension Test. The particulate suspension test measures the amount of particulates in suspension and provides results as a percentage of particulates suspended (i.e. particulate suspension efficiency). The procedure for carrying out the Particulate Suspension Test is provided in detail below in the examples.

In certain embodiments, a magnetic impeller as described herein can have a particulate suspension efficiency of at least 50%, at least 60%, at least 70%, at least 75%, at least 80%, at least 85%, at least 90%, at least 95%, at least 97%, or even at least 99% as measured according to the Particulate Suspension Test. Further, in very particulate embodiments, the magnetic impeller described herein can have all particles in suspension, such as 100% particulate suspension efficiency.

A further particular advantage of certain embodiments of the present disclosure is the achievement of the above particulate suspension efficiency at low RPMs. In certain embodiments, a magnetic impeller as described herein can have the above mentioned particulate suspension efficiency at no greater than 30 RPMs, no greater than 40 RPMs, no greater than 50 RPMs, no greater than 55 RPMs, no greater than 60 RPMs, no greater than 65 RPMs, no greater than 70 RPMs, no greater than 75 RPMs, no greater than 80 RPMs, no greater than 85 RPMs, no greater than 90 RPMs, no greater than 95 RPMs, no greater than 100 RPMs, no greater than 110 RPMs, no greater than 120 RPMs, no greater than 130 RPMs, no greater than 140 RPMs, no greater than 150 RPMs, no greater than 160 RPMs, no greater than 170 RPMs, no greater than 180 RPMs, no greater than 190 RPMs, or even no greater than 200 RPMs.

In very particular embodiments, the magnetic impeller described herein can have a mixing suspension efficiency of at least 70%, at least 75%, at least 80%, at least 85%, at least 90%, at least 95%, at least 97%, or even at least 99% at no greater than 200 RPMs.

In very particular embodiments, the magnetic impeller described herein can have a mixing suspension efficiency of at least 70%, at least 75%, at least 80%, at least 85%, at least 90%, at least 95%, at least 97%, or even at least 99% at no greater than 150 RPMs.

In very particular embodiments, the magnetic impeller described herein can have a mixing suspension efficiency of at least 70%, at least 75%, at least 80%, at least 85%, at least 90%, at least 95%, at least 97%, or even at least 99% at no greater than 100 RPMs.

Similar to the advantage described above of being able to achieve improved particulate suspension efficiencies at low RPMs, a magnetic impeller described herein can also impart a low shear to the medium's being mixed.

As used herein, "shear" is synonymous with "shear stress" and refers to a force which deforms, or causes to deform, a fluid (e.g., liquid or gas). Shear stress is generally a measure of the force of friction between a fluid and a body. As should be understood, a fluid at rest can support no shear stress. Conversely, when a fluid is in motion, shear stresses can develop within the fluid. In this regard, any fluid moving along a boundary will incur shear stress in a region along that boundary. Typically, if the force of friction along the boundary is constant, the shear stress will be linearly dependent on the velocity gradient. However, introduction of particles into the fluid may skew traditional shear equations.

EXAMPLES

Example 1

Levitation

A magnetic impeller as illustrated in FIG. 1 is fixedly installed within a vessel such that the magnetic impeller will not slide within the vessel during operation. A fluid comprising purified water is introduced into the vessel such that the fluid entirely covers the magnetic impeller. A driving magnet is positioned concomitant with the magnetic member of the magnetic impeller such that a magnetic couple is formed therebetween. A quarter of a cup of course sea salt is then introduced into the fluid within the vessel and the driving magnet is turned on.

The driving magnet is rotated, causing the magnetic impeller to rotate. The fluid agitating element began to aerodynamically levitate and translate along the column upon a rotation of approximately 65 revolutions per minute.

Example 2

Particulate Suspension

A magnetic impeller as illustrated in FIG. 1, with the blades as illustrated in FIGS. 19-20 was constructed and tested for its ability to suspend particulate materials at various speeds of rotation. A cylindrical container was filled with 100 L of water. 1000 spherical polymer beads having a specific gravity of 1.2 and an average diameter of 2 cm were added to the water. A magnetic drive was positioned underneath of the vessel and activated. The container was visually observed with a Go Pro® camera and the number of pellets in suspension and out of suspension were counted. A pellet was considered out of suspension if the pellet did not rise above the plane of the blades after a 10 second interval. Similarly, a pellet was considered in suspension if the pellet rises above the plane of the blades within a 10 second interval. The particulate suspension efficiency was then calculated as a percentage of the total number of beads in suspension divided by the total number of beads.

Furthermore, the amount of shear imparted to the fluid by the magnetic impeller was determined. The following results were obtained.

TABLE 1

Particulate Suspension Test Results

| RPMs | Total # of Pellets in Suspension | Total # of Pellets out of Suspension | Particulate Suspension Efficiency (%) | Shear |
|---|---|---|---|---|
| 75 | 1000 | 0 | 100% | |
| 65 | 1000 | 0 | 100% | |
| 55 | 950 | 50 | 95% | |

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Items.

Item 1. A non-superconducting magnetic impeller comprising: a rotatable element having a axis of rotation and comprising a magnetic element, wherein the rotatable element has freedom to rotate around the axis of rotation, and wherein the rotatable element is adapted to levitate during operation at a speed of less than 1000 revolutions per minute (RPM).

Item 2. A non-superconducting magnetic impeller adapted to aerodynamically levitate.

Item 3. A magnetic impeller comprising:

a rotatable element having a axis of rotation, wherein the rotatable element has freedom to rotate around the axis of rotation; and a ferromagnetic element disposed within the rotatable element.

Item 4. A rotatable element having an axis of rotation, the rotatable element comprising a ferromagnetic element, wherein the rotatable element is adapted to levitate in a direction parallel to the axis of rotation.

Item 5. A magnetic impeller comprising an impeller bearing; a rotatable element rotatable about or within the impeller bearing; wherein the impeller bearing is fixed relative to the rotation of the rotatable element; and wherein the magnetic impeller is adapted to support a fluid layer between the impeller bearing and the rotatable element.

Item 6. A magnetic impeller comprising:

an impeller bearing;

a rotatable element comprising a magnetic element, wherein the rotatable element is adapted to rotate about the impeller bearing; and a fluid pump bearing adapted to provide a fluid layer between the impeller bearing and the rotatable element.

Item 7. A rotatable element having a axis of rotation, the rotatable element comprising:

a magnetic element; and an opening on the axis of rotation adapted to engage a support, the opening comprising a plurality of channels adapted to permit flow of fluid within the plurality of channels.

Item 8. An assembly comprising a magnetic impeller comprising a magnetic element, wherein the magnetic impeller has a first configuration and a second configuration, and wherein the magnetic impeller is adapted to have a narrower profile in the first configuration than the second configuration.

Item 9. An assembly comprising:

a vessel having a bottom and an opening;

a magnetic impeller comprising:

a plurality of blades, wherein the magnetic impeller has a first configuration and a second configuration, wherein the magnetic impeller has a profile in the first configuration adapted to pass through the opening; and a magnetic element;

wherein magnetic impeller is physically decoupled from the vessel.

Item 10. An assembly comprising a free-standing magnetic impeller comprising a magnetic element and a plurality of blades, wherein the free-standing magnetic impeller is adapted to mix a fluid retained within a vessel without being physically held to a predetermined location within the vessel.

Item 11. An assembly comprising a magnetic impeller comprising a first blade and a second blade, wherein the first and second blades are adapted to rotate about a common axis, and wherein the first blade is disposed above the second blade, and wherein the magnetic impeller is adapted to permit substantial alignment of the first blade and the second blade in a first configuration, and wherein the magnetic impeller is adapted to partially freely rotate the first blade relative to the second blade.

Item 12. A magnetic impeller comprising: a blade having a axis of rotation; a magnetic member; and wherein the blade has freedom to move in a direction parallel with the axis of rotation independently of the magnetic member.

Item 13. A magnetic impeller comprising: a vessel defining an inner volume; a blade having a axis of rotation, the blade disposed of within the inner volume; and a magnetic member rotationally coupled to the blade, and decoupled in a direction parallel with the axis of rotation.

Item 14. A magnetic impeller comprising: a rotatable element having a axis of rotation, wherein the rotatable element is adapted to rotate at a substantially constant axial position along the axis of rotation; a blade coupled to the rotatable element along the axis of rotation, wherein the blade is adapted to translate along the axis of rotation; and a magnetic member affixed to the rotatable element.

Item 15. A magnetic impeller comprising: a magnetic member; and a blade having a axis of rotation, wherein the blade is adapted to be removably coupled to the magnetic impeller independent of the magnetic member.

Item 16. A magnetic impeller having a particulate suspension efficiency of at least 90% as measured according to The Particulate Suspension Test at 75 RPMs.

Item 17. An assembly comprising: a magnetic impeller comprising a blade, wherein a major surface of the blade has a leading edge and a trailing edge, and wherein the blade has at least one opening through the blade adjacent the leading edge, and at least one opening through the blade adjacent the trailing edge.

Item 18. An assembly comprising: a rotatable magnetic impeller comprising a blade, wherein the blade is adapted to increase in nominal width during rotation.

Item 19. An assembly comprising: a rotatable magnetic impeller comprising a flexible blade, wherein the flexible blade is adapted to change shape in response to its spin rate (revolutions per minute).

Item 20. An assembly comprising: a magnetic impeller comprising: a rotatable element comprising a magnetic element; and at least one blade; and a cage partly bounding the magnetic impeller such that the rotatable element is disposed within the cage and the at least one blade is disposed outside the cage.

Item 21. An assembly comprising: a vessel comprising a floor; a magnetic impeller comprising a magnetic element and at least one blade; and a cage, wherein the cage at least partly bounds the magnetic impeller, wherein the cage has a top surface, a bottom surface, and a side surface, and wherein the bottom surface of the cage is connected to the floor of the vessel.

Item 22. A shipping kit comprising: a vessel comprising at least one rigid surface and at least one flexible surface; a magnetic impeller comprising: a rotatable element comprising a magnetic element; and at least one blade; and a cage partly bounding the magnetic impeller and connected to the at least one rigid surface; wherein the first cavity is sealed, and wherein the vessel is in a collapsed state.

Item 23. A method of forming an assembly comprising: providing a vessel having at least partially flexible side walls, and a rigid surface, providing a rotatable element of a magnetic impeller, connecting a cage to the vessel such that the cage bounds the rotatable element; connecting at least one blade to the rotatable element such that the plurality of blades rotate when the rotatable element is rotated and the plurality of blades remain outside of the cage while the rotatable element is bound by the cage.

Item 24. An assembly comprising: a base; a magnetic impeller comprising: a rotatable element comprising a magnetic element; and a plurality of blades; a cage partly bounding the magnetic impeller, wherein the cage is connected to the base, wherein the cage and base form a first cavity; and wherein the magnetic impeller is physically decoupled from the cage and/or base.

Item 25. A magnetic impeller having a particulate suspension efficiency of at least 90% as measured according to The Particulate Suspension Test at 75 RPMs.

Item 26. An assembly or magnetic impeller comprising: a magnetic impeller comprising a blade, wherein a major surface of the blade has a leading edge and a trailing edge, and wherein the blade has at least one opening through the blade adjacent the leading edge, and at least one opening through the blade adjacent the trailing edge.

Item 27. An assembly or magnetic impeller comprising: a rotatable magnetic impeller comprising a blade, wherein the blade is adapted to increase in nominal width during rotation.

Item 28. An assembly or magnetic impeller comprising: a rotatable magnetic impeller comprising a flexible blade, wherein the flexible blade is adapted to change shape in response to its spin rate (revolutions per minute).

Item 29. An assembly or magnetic impeller comprising: a flexible vessel comprising a flexible surface and a rigid surface, wherein the rigid surface is disposed on a bottom wall of the vessel; a magnetic impeller comprising a magnetic element, wherein the magnetic impeller is physically decoupled from the flexible vessel; wherein the rigid surface is a substantially planar surface.

Item 30. An assembly or magnetic impeller comprising: a flexible vessel comprising a flexible surface and a rigid surface, wherein the rigid surface is disposed on a bottom wall of the vessel; a magnetic impeller comprising a magnetic element, wherein the magnetic impeller is physically decoupled from the vessel; a magnetic impeller support member adapted to interact with a magnetic field of the magnetic element, and wherein the magnetic impeller support member is adapted to hold, but not rotate, the magnetic impeller adjacent the bottom wall, and wherein the magnetic impeller support member is physically decoupled from the magnetic impeller.

Item 31. An assembly or magnetic impeller comprising: a flexible vessel comprising a flexible surface and a rigid surface, wherein the rigid surface is disposed on a bottom wall of the vessel; a magnetic impeller comprising a magnetic element, wherein the magnetic impeller is physically decoupled from the vessel, wherein the magnetic impeller is disposed within an interior cavity of the sealed vessel; a rigid vessel, wherein the rigid vessel is adapted to receive the flexible vessel; and a cart, wherein the cart comprises a stand adapted to hold the rigid vessel in an upright configuration, and wherein the cart has at least one wheel or roller.

Item 32. A shipping kit comprising a magnetic impeller within a sealed, collapsed, flexible vessel, and a magnetic impeller support member adapted to maintain the location of the magnetic impeller adjacent a rigid surface of the flexible vessel.

Item 33. The assembly, method, shipping kit, non-superconducting magnetic impeller, magnetic impeller, or rotatable element according to any one of the preceding claims, wherein the magnetic impeller comprises:

an impeller bearing;

a rotatable element having a axis of rotation and comprising a magnetic element and at least one blade, wherein the rotatable element is adapted to rotate about the impeller bearing, and wherein the rotatable element has a height, $H_{RE}$; and a fluid pump bearing adapted to provide a fluid layer between the impeller bearing and the rotatable element.

Item 34. The assembly, method, shipping kit, non-superconducting magnetic impeller, magnetic impeller, or rotatable element according to any one of the preceding items, wherein the rotatable element is adapted to translate along the impeller bearing.

Item 35. The assembly, method, shipping kit, non-superconducting magnetic impeller, magnetic impeller, or rotatable element according to any one of the preceding items, wherein the rotatable element is adapted to translate along the impeller bearing a maximum distance, $H_{LEV}$, as defined by the difference between a height of the impeller bearing, $H_{EH}$ and $H_{RE}$.

Item 36. The assembly, method, shipping kit, non-superconducting magnetic impeller, magnetic impeller, or rotatable element according to any one of the preceding items, wherein a ratio of $H_{IB}/H_{RE}$ is at least about 1.1, at least about 1.2, at least about 1.3, at least about 1.4, or even at least about 1.5.

Item 37. The assembly, method, shipping kit, non-superconducting magnetic impeller, magnetic impeller, or rotatable element according to any one of the preceding items, wherein a ratio of $H_{IB}/H_{RE}$ is no greater than about 3.0, no greater than 2.0, no greater than 1.5, or even no greater than 1.25.

Item 38. The assembly, method, shipping kit, non-superconducting magnetic impeller, magnetic impeller, or rotatable element according to any one of the preceding items, wherein the impeller bearing has a center axis or rotation, and wherein the center axis of rotation of the impeller bearing is generally concentric with the axis of rotation of the rotatable element.

Item 39. The assembly, method, shipping kit, non-superconducting magnetic impeller, magnetic impeller, or rotatable element according to any one of the preceding items, wherein the impeller bearing further comprises a flange, wherein the flange comprises a plug or a disc extending radially from a distal end of the impeller bearing, and wherein the flange is adapted to retain the rotatable element axially along the fixed support.

Item 40. The assembly, method, shipping kit, non-superconducting magnetic impeller, magnetic impeller, or rotatable element according to any one of the preceding items, wherein the at least one blade has a non-rectilinear cross-sectional profile, and wherein the at least one blade is adapted to generate lift in a fluid.

Item 41. The assembly, method, shipping kit, non-superconducting magnetic impeller, magnetic impeller, or rotatable element according to any one of the preceding items, wherein there are at least 2 blades, at least 3 blades, at least 4 blades, at least 5 blades, at least 6 blades, at least 7 blades, at least 8 blades, at least 9 blades, or even at least 10 blades.

Item 42. The assembly, method, shipping kit, non-superconducting magnetic impeller, magnetic impeller, or rotatable element according to any one of the preceding items, wherein there are no greater than 20 blades, no greater than 15 blades, no greater than 10 blades, no greater than 9 blades, no greater than 8 blades, no grater than 7 blades, no greater than 6 blades, no greater than 5 blades, or even no greater than 4 blades.

Item 43. The assembly, method, shipping kit, non-superconducting magnetic impeller, magnetic impeller, or rotatable element according to any one of the preceding items, wherein each blade has a major surface defined by a width, $W_B$, and a length, $L_B$, and wherein a ratio of $L_B/W_B$ is at least 2.0, at least 2.5, at least 3.0, at least 3.5, at least 4.0, at least 4.5, or even at least 5.0.

Item 44. The assembly, method, shipping kit, non-superconducting magnetic impeller, magnetic impeller, or rotatable element according to any one of the preceding items, wherein each blade has an average thickness, $T_B$, and wherein a ratio of $W_B/T_B$ is at least 2.0, at least 2.5, at least 3.0, at least 4.0, at least 5.0, or even at least 10.0.

Item 45. The assembly, method, shipping kit, non-superconducting magnetic impeller, magnetic impeller, or rotatable element according to any one of the preceding items, comprising a magnetic element, wherein the magnetic element is adapted to engage with a drive magnet.

Item 46. The assembly, method, shipping kit, non-superconducting magnetic impeller, magnetic impeller, or rotatable element according to any one of the preceding items, wherein the magnetic element is ferromagnetic.

Item 47a. The assembly, method, shipping kit, non-superconducting magnetic impeller, magnetic impeller, or rotatable element according to any one of the preceding items, wherein the magnetic element is comprised of a ferromagnetic material selected from the group consisting of a steel, an iron, a cobalt, a nickel, and a precious metals, particularly palladium or platinum.

Item 47b. The assembly, method, shipping kit, non-superconducting magnetic impeller, magnetic impeller, or rotatable element according to any one of the preceding items, wherein the magnetic element comprises a neodymium magnet.

Item 47c. The assembly, method, shipping kit, non-superconducting magnetic impeller, magnetic impeller, or rotatable element according to any one of the preceding items, wherein the magnetic drive comprises a neodymium magnet.

Item 48. The assembly, method, shipping kit, non-superconducting magnetic impeller, magnetic impeller, or rotatable element according to any one of the preceding items, wherein the magnetic element has a mass, $M_{ME}$, in grams, wherein the driving magnet has a power, $P_{DM}$, as characterized by its magnetic flux density and measured in teslas, and wherein a ratio of $P_{DM}/M_{ME}$ is at least 1.0, at least 1.2, at least 1.4, at least 1.6, at least 1.8, at least 2.0, at least 2.5, at least 3.0, or even at least 5.0.

Item 49. The assembly, method, shipping kit, non-superconducting magnetic impeller, magnetic impeller, or rotatable element according to any one of the preceding items, wherein the magnetic element is adapted to maintain engagement with the driving magnet when the magnetic element is subjected to an acceleration of at least 0.5 revolutions per minute per second (RPM/s), at least 0.75 RPM/s, at least 1 RPM/s, at least 1.5 RPM/s, at least 2 RPM/s, at least 5 RPM/s, at least 10 RPM/s, or even at least 20 RPM/s.

Item 50. The assembly, method, shipping kit, non-superconducting magnetic impeller, magnetic impeller, or rotatable element according to any one of the preceding items, comprising a fluid pump bearing adapted to provide a fluid layer between the impeller bearing and the rotatable element, the fluid pump bearing defined by an annular cavity formed between the impeller bearing and the rotatable element.

Item 51. The assembly, method, shipping kit, non-superconducting magnetic impeller, magnetic impeller, or rotatable element according to any one of the preceding items, wherein the fluid pump bearing is adapted to provide a fluid layer within the annular cavity at a relative rotational speed between the impeller bearing and the rotatable element of less than about 65 revolutions per minute (RPM).

Item 52. The assembly, method, shipping kit, non-superconducting magnetic impeller, magnetic impeller, or rotatable element according to any one of the preceding items, wherein the impeller bearing and rotatable element have a relative coefficient of static friction, $\mu_s$, and a relative coefficient of kinetic friction, $\mu_k$, and wherein a ratio of $\mu_s$:$\mu_k$ is at least 1.2, at least 1.5, at least 2.0, at least 3.0, at least 5.0, at least 10.0, at least 20.0, or even at least 50.0.

Item 53. The assembly, method, shipping kit, non-superconducting magnetic impeller, magnetic impeller, or rotatable element according to any one of the preceding items, wherein the fluid layer formed between the impeller bearing and the rotatable element has a thickness, $T_{FL}$, and wherein $T_{FL}$ is approximately constant within the annular cavity.

Item 54. The assembly, method, shipping kit, non-superconducting magnetic impeller, magnetic impeller, or rotatable element according to any one of the preceding items, wherein the impeller bearing includes a plurality of flutes, and wherein the flutes provide a channel for fluid flow therein.

Item 55. The assembly, method, shipping kit, non-superconducting magnetic impeller, magnetic impeller, or rotatable element according to any one of the preceding items, wherein the rotatable element includes a plurality of flutes, and wherein the flutes provide a channel for fluid flow therein.

Item 56. The assembly, method, shipping kit, non-superconducting magnetic impeller, magnetic impeller, or rotatable element according to any one of the preceding items, wherein the flutes form a helical pattern.

Item 57. The assembly, method, shipping kit, non-superconducting magnetic impeller, magnetic impeller, or rotatable element according to any one of the preceding items, wherein there are at least 2 flutes per inch (FPI), at least 3 (FPI), at least 4 (FPI), at least 5 (FPI), at least 6 (FPI), at least 7 (FPI), at least 8 (FPI), at least 9 (FPI), or even at least 10 (FPI).

Item 58. The assembly, method, shipping kit, non-superconducting magnetic impeller, magnetic impeller, or rotatable element according to any one of the preceding items, wherein there are no greater than 20 (FPI), no greater than 15 (FPI), no greater than 10 (FPI), no greater than 5 (FPI), no greater than 4 (FPI), or even no greater than 3 (FPI).

Item 59. The assembly, method, shipping kit, non-superconducting magnetic impeller, magnetic impeller, or rotatable element according to any one of the preceding items, wherein the annular region defined by the fluid pump bearing has a minimum thickness, $T_{ARMIN}$, wherein the annular region has a maximum thickness, $T_{ARMAX}$, and wherein a ratio of $T_{ARMIN}/T_{ARMAX}$ is at least 1.1, at least 1.2, at least 1.3, at least 1.4, at least 1.5 at least 1.6, at least 1.7, at least 1.8, at least 1.9, or even at least 2.0.

Item 60. The assembly, method, shipping kit, non-superconducting magnetic impeller, magnetic impeller, or rotatable element according to any one of the preceding items, wherein the rotatable element is adapted to levitate during operation at a speed of less than about 900 revolutions per minute (RPM), less than about 800 RPM, less than about 700, RPM, less than about 600 RPM, less than about 500 RPM, less than about 400 RPM, less than about 300 RPM, less than about 200 RPM, less than about 100 RPM, less than about 75 RPM, less than about 65 RPM.

Item 61. The assembly, method, shipping kit, non-superconducting magnetic impeller, magnetic impeller, or rotatable element according to any one of the preceding items, wherein the impeller includes at least one blade having a major surface, wherein each blade further comprises at least one flange, and wherein the at least one flange projects from the major surface of the blade.

Item 62. The assembly, method, shipping kit, non-superconducting magnetic impeller, magnetic impeller, or rotatable element according to any one of the preceding items, wherein the rotatable element has a axis of rotation, and wherein each blade projects radially outward from an outer surface of the rotatable element.

Item 63. The assembly, method, shipping kit, non-superconducting magnetic impeller, magnetic impeller, or rotatable element according to any one of the preceding items, wherein the major surface of each blade is substantially rectilinear.

Item 64. The assembly, method, shipping kit, non-superconducting magnetic impeller, magnetic impeller, or rotatable element according to any one of the preceding items, further comprising a fillet, the fillet adapted to provide a smooth transition between the blade and an outer surface of the rotatable element.

Item 65. The assembly, method, shipping kit, non-superconducting magnetic impeller, magnetic impeller, or rotatable element according to any one of the preceding items, wherein the blade has an angle of attack, $A_A$, as measured by the angle formed between the major surface of the blade and the axis of rotation of the rotatable element, and wherein $A_A$ is at least 20 degrees, at least 30 degrees, at least 40 degrees, at least 50 degrees, at least 60 degrees, at least 70 degrees, at least 80 degrees, or even at least 85 degrees.

Item 66. The assembly, method, shipping kit, non-superconducting magnetic impeller, magnetic impeller, or rotatable element according to any one of the preceding items, wherein $A_A$ is no greater than 85 degrees, no greater than 80 degrees, no greater than 70 degrees, no greater than 60 degrees, no greater than 50 degrees, or even no greater than 40 degrees.

Item 67. The assembly, method, shipping kit, non-superconducting magnetic impeller, magnetic impeller, or rotatable element according to any one of the preceding items, wherein the blade is adapted to provide lift in a fluid.

Item 68. The assembly, method, shipping kit, non-superconducting magnetic impeller, magnetic impeller, or rotatable element according to any one of the preceding items, wherein the major surface of the blade includes a leading edge and a trailing edge.

Item 69. The assembly, method, shipping kit, non-superconducting magnetic impeller, magnetic impeller, or rotatable element according to any one of the preceding items, wherein the blade has a camber angle, $A_C$, and wherein $A_C$ is greater than 5 degrees, greater than 10 degrees, greater than 20 degrees, greater than 30 degrees, greater than 40 degrees, greater than 50 degrees, or even greater than 60 degrees.

Item 70. The assembly, method, shipping kit, non-superconducting magnetic impeller, magnetic impeller, or rotatable element according to any one of the preceding items, wherein $A_C$ is less than 100 degrees, less than 90 degrees, less than 80 degrees, less than 70 degrees, less than 60 degrees, less than 50 degrees, less than 40 degrees, or even less than 30 degrees.

Item 71. The assembly, method, shipping kit, non-superconducting magnetic impeller, magnetic impeller, or rotatable element according to any one of the preceding items, wherein the major surface of the blade includes a plurality of vortex generators.

Item 72. The assembly, method, shipping kit, non-superconducting magnetic impeller, magnetic impeller, or rotatable element according to any one of the preceding items, comprising at least two flanges, at least three flanges, or even at least four flanges.

Item 73. The assembly, method, shipping kit, non-superconducting magnetic impeller, magnetic impeller, or rotatable element according to any one of the preceding items, wherein the at least one flange has a non-rectilinear cross section Item 74. The assembly, method, shipping kit, non-superconducting magnetic impeller, magnetic impeller, or rotatable element according to any one of the preceding items, wherein the flange comprises a winglet.

Item 75. The assembly, method, shipping kit, non-superconducting magnetic impeller, magnetic impeller, or rotatable element according to any one of the preceding items, comprising:

an impeller bearing having a base plate and a post extending from the base plate;

a rotatable element having a axis of rotation and rotatable about or within the impeller bearing; and a magnetic element;

wherein the impeller, in particular, the impeller bearing, is not physically coupled to a vessel.

Item 76. The assembly, method, shipping kit, non-superconducting magnetic impeller, magnetic impeller, or rotatable element according to any one of the preceding items, wherein the impeller bearing is adapted to be removably inserted into the vessel.

Item 77. The assembly, method, shipping kit, non-superconducting magnetic impeller, magnetic impeller, or rotatable element according to any one of the preceding items, wherein the impeller bearing is adapted to be rapidly repositionable within the vessel.

Item 78. The assembly, method, shipping kit, non-superconducting magnetic impeller, magnetic impeller, or rotatable element according to any one of the preceding items, wherein the impeller bearing is adapted to be rapidly removable from within the vessel.

Item 79. The assembly, method, shipping kit, non-superconducting magnetic impeller, magnetic impeller, or rotatable element according to any one of the preceding items, wherein the base plate has a axis of rotation, and wherein the post projects from the base plate along the axis of rotation.

Item 80. The assembly, method, shipping kit, non-superconducting magnetic impeller, magnetic impeller, or rotatable element according to any one of the preceding items, wherein the base plate is adapted to orient relatively below the post during operation.

Item 81. The assembly, method, shipping kit, non-superconducting magnetic impeller, magnetic impeller, or rotatable element according to any one of the preceding items, wherein the base plate is weighted.

Item 82. The assembly, method, shipping kit, non-superconducting magnetic impeller, magnetic impeller, or rotatable element according to any one of the preceding items, wherein the base plate has a weight, $W_{BP}$, wherein the magnetic impeller has a weight, $W_{MA}$, and wherein a ratio of $W_{MA}/W_{BP}$ is no greater than 1.5, no greater than 1.4, no greater than 1.3, no greater than 1.2, or even no greater than 1.1.

Item 83. The assembly, method, shipping kit, non-superconducting magnetic impeller, magnetic impeller, or rotatable element according to any one of the preceding items, wherein the rotatable element is adapted to rotate about the post.

Item 84. The assembly, method, shipping kit, non-superconducting magnetic impeller, magnetic impeller, or rotatable element according to any one of the preceding items, wherein the post has a height $H_{RE}$, wherein the rotatable element has a height, $H_{RE}$, and wherein a ratio of $H_{RE}/H_{RE}$ is greater than 1.2, greater than 1.3, greater than 1.4, greater than 1.5, greater than 1.6, greater than 1.7, or even greater than 2.0.

Item 85. The assembly, method, shipping kit, non-superconducting magnetic impeller, magnetic impeller, or rotatable element according to any one of the preceding items, wherein the rotatable element is permitted to translate along the axis of rotation a distance, $H_{LEV}$, as defined by the difference between $H_{RE}$ and $H_{RE}$.

Item 86. The assembly, method, shipping kit, non-superconducting magnetic impeller, magnetic impeller, or rotatable element according to any one of the preceding items, further comprises a hub having an inner bore axially aligned with the axis of rotation, and a plurality of blades extending radially outward from the hub, wherein the magnetic element is statically affixed to the rotatable element.

Item 87. The assembly, method, shipping kit, non-superconducting magnetic impeller, magnetic impeller, or rotatable element according to any one of the preceding items, wherein the magnetic element is affixed to the hub.

Item 88. The assembly, method, shipping kit, non-superconducting magnetic impeller, magnetic impeller, or rotatable element according to any one of the preceding items, wherein the magnetic impeller further comprises a vessel.

Item 89. The assembly, method, shipping kit, non-superconducting magnetic impeller, magnetic impeller, or rotatable element according to any one of the preceding items, wherein the vessel comprises a flexible sheet.

Item 90. The assembly, method, shipping kit, non-superconducting magnetic impeller, magnetic impeller, or rotatable element according to any one of the preceding items, wherein the vessel can be adapted to form a fluid containing cavity.

Item 91. The assembly, method, shipping kit, non-superconducting magnetic impeller, magnetic impeller, or rotatable element according to any one of the preceding items, comprising: an impeller bearing; a rotatable element having a axis of rotation, wherein the rotatable element is adapted to rotate about the impeller bearing, and wherein the magnetic member is engaged with the rotatable element; and a fluid pump bearing adapted to provide a fluid layer between the impeller bearing and the rotatable element.

Item 92. The assembly, method, shipping kit, non-superconducting magnetic impeller, magnetic impeller, or rotatable element according to any one of the preceding items, wherein the rotatable element includes a pump gear disposed around the axis of rotation, the pump gear having a plurality of flutes.

Item 93. The assembly, method, shipping kit, non-superconducting magnetic impeller, magnetic impeller, or rotatable element according to any one of the preceding items, wherein an internal surface of the pump gear includes at least 1 flute per inch (FPI), at least 2 FPI, at least 3 FPI, at least 4 FPI, at least 5 FPI, at least 10 FPI, or even at least 20 FPI.

Item 94. The assembly, method, shipping kit, non-superconducting magnetic impeller, magnetic impeller, or rotatable element according to any one of the preceding items, wherein the flutes are positioned at an angle, $A_F$, as defined by the angle between the flute and the axis of rotation, and wherein $A_F$ is at least 2 degrees, at least 3 degrees, at least 4 degrees, at least 5 degrees, at least 10 degrees, at least 15 degrees, or even at least 20 degrees.

Item 95. The assembly, method, shipping kit, non-superconducting magnetic impeller, magnetic impeller, or rotatable element according to any one of the preceding items, wherein the impeller bearing includes a top surface, and an outer bearing surface, and wherein the outer bearing surface includes a plurality of flutes.

Item 96. The assembly, method, shipping kit, non-superconducting magnetic impeller, magnetic impeller, or rotatable element according to any one of the preceding items, wherein the flutes are oriented at an angle $A_{CF}$, as defined by the angle between the flutes and the axis of rotation, and wherein $A_{CF}$ is at least 2 degrees, at least 3 degrees, at least 4 degrees, at least 5 degrees, at least 10 degrees, at least 15 degrees, or even at least 20 degrees.

Item 97. The assembly, method, shipping kit, non-superconducting magnetic impeller, magnetic impeller, or rotatable element according to any one of the preceding items, wherein the impeller bearing further comprises a radial extension, the radial extension extending from the top surface of the impeller bearing.

Item 98. The assembly, method, shipping kit, non-superconducting magnetic impeller, magnetic impeller, or rotatable element according to any one of the preceding items, wherein the rotatable element has a first and second surface, the second surface proximate the impeller bearing, and wherein the second surface further comprises a plurality of radial grooves extending from the axis of rotation.

Item 99. The assembly, method, shipping kit, non-superconducting magnetic impeller, magnetic impeller, or rotatable element according to any one of the preceding items, wherein the grooves are arcuate.

Item 100. The assembly, method, shipping kit, non-superconducting magnetic impeller, magnetic impeller, or rotatable element according to any one of the preceding items, wherein the grooves are adapted to form a fluid layer between the impeller bearing and the rotatable element.

Item 101. The assembly, method, shipping kit, non-superconducting magnetic impeller, magnetic impeller, or rotatable element according to any one of the preceding items, comprising a fluid pump bearing adapted to provide a fluid layer between the impeller bearing and the rotatable element, the fluid pump bearing defined by an annular cavity formed between the impeller bearing and the rotatable element.

Item 102. The assembly, method, shipping kit, non-superconducting magnetic impeller, magnetic impeller, or rotatable element according to any one of the preceding items, wherein the fluid pump bearing is adapted to provide the fluid layer within the annular cavity at a relative rotational speed between the impeller bearing and the rotatable element of less than about 1 revolution per minute (RPM).

Item 103. The assembly, method, shipping kit, non-superconducting magnetic impeller, magnetic impeller, or rotatable element according to any one of the preceding items, wherein the fluid pump bearing is adapted to move the fluid layer from a first opening in the annular cavity to a second opening in the annular cavity.

Item 104. The assembly, method, shipping kit, non-superconducting magnetic impeller, magnetic impeller, or rotatable element according to any one of the preceding items, wherein the fluid pump bearing is adapted to generate a first pressure, $P_1$, as measured at a first opening in the annular cavity, and a second pressure $P_2$, as measured at a second opening in the annular cavity, and wherein, $P_2$ is greater than $P_1$.

Item 105. The assembly, method, shipping kit, non-superconducting magnetic impeller, magnetic impeller, or rotatable element according to any one of the preceding items, wherein the impeller and rotatable element have a relative coefficient of static friction, $\mu_s$, and wherein the impeller, fluid layer, and rotatable element have coefficient of kinetic friction, $\mu_k$, and wherein a ratio of $\mu_s/\mu_k$ is at least 1.2, at least 1.5, at least 2.0, at least 3.0, at least 5.0, at least 10.0, at least 20.0, or even at least 50.0.

Item 106. The assembly, method, shipping kit, non-superconducting magnetic impeller, magnetic impeller, or rotatable element according to any one of the preceding items, wherein the fluid layer formed between the impeller bearing and the rotatable element has a thickness, $T_{FL}$, and wherein $T_{FL}$ is approximately constant within the annular cavity.

Item 107. The assembly, method, shipping kit, non-superconducting magnetic impeller, magnetic impeller, or rotatable element according to any one of the preceding items, wherein the annular region defined by the fluid pump bearing has a minimum thickness, $T_{ARMIN}$, wherein the annular region has a maximum thickness, $T_{ARMAX}$, and wherein a ratio of $T_{ARMIN}/T_{ARMAX}$ is at least 1.1, at least 1.2, at least 1.3, at least 1.4, at least 1.5 at least 1.6, at least 1.7, at least 1.8, at least 1.9, or even at least 2.0.

Item 108. The assembly, method, shipping kit, non-superconducting magnetic impeller, magnetic impeller, or rotatable element according to any one of the preceding items, wherein the impeller bearing further comprises a polymer layer, the polymer layer formed on the outer bearing surface of the impeller bearing.

Item 109. The assembly, method, shipping kit, non-superconducting magnetic impeller, magnetic impeller, or rotatable element according to any one of the preceding items, wherein the polymer layer is polyvinylidene flouride (PVDF).

Item 110. The assembly, method, shipping kit, non-superconducting magnetic impeller, magnetic impeller, or rotatable element according to any one of the preceding items, wherein the polymer layer is polysulfone (PSU).

Item 111. The assembly, method, shipping kit, non-superconducting magnetic impeller, magnetic impeller, or rotatable element according to any one of the preceding items, comprising: an impeller bearing; a rotatable element having a axis of rotation and a magnetic member; and a post extending from the rotatable element along the axis of rotation, the post having a height, $H_C$, wherein the blade is rotationally coupled to the post, wherein the blade has a height, $H_B$, and wherein the blade is adapted to translate along the post.

Item 112. The assembly, method, shipping kit, non-superconducting magnetic impeller, magnetic impeller, or rotatable element according to any one of the preceding items, wherein the blade is adapted to translate parallel to the axis of rotation independent of the magnetic element.

Item 113. The assembly, method, shipping kit, non-superconducting magnetic impeller, magnetic impeller, or rotatable element according to any one of the preceding items, wherein the blade is adapted to generate lift in a fluid.

Item 114. The assembly, method, shipping kit, non-superconducting magnetic impeller, magnetic impeller, or rotatable element according to any one of the preceding items, wherein the blade has a mass, $F_B$, and wherein the blade is adapted to generate a lift, $F_L$, and wherein the blade is adapted to translate away from the rotatable element when the magnitude of $F_L$ is greater than $F_B$.

Item 115. The assembly, method, shipping kit, non-superconducting magnetic impeller, magnetic impeller, or rotatable element according to any one of the preceding items, wherein $F_L$ is oriented substantially parallel with the axis of rotation.

Item 116. The assembly, method, shipping kit, non-superconducting magnetic impeller, magnetic impeller, or rotatable element according to any one of the preceding items, wherein $F_B$ is substantially parallel with the axis of rotation, generally opposing $F_L$.

Item 117. The assembly, method, shipping kit, non-superconducting magnetic impeller, magnetic impeller, or rotatable element according to any one of the preceding items, wherein a ratio of $H_C/H_B$ is at least 1.25, at least, 1.75, at least 2.0, at least 3.0, at least 4.0, at least 5.0, or even at least 10.0.

Item 118. The assembly, method, shipping kit, non-superconducting magnetic impeller, magnetic impeller, or rotatable element according to any one of the preceding items, wherein the blade is adapted to translate a total distance, $H_{LEV}$, as defined by the difference between $H_e$ and $H_B$.

Item 119. The assembly, method, shipping kit, non-superconducting magnetic impeller, magnetic impeller, or rotatable element according to any one of the preceding items, wherein the rotatable element is adapted to translate along the post a distance, $H_{RE}$.

Item 120. The assembly, method, shipping kit, non-superconducting magnetic impeller, magnetic impeller, or rotatable element according to any one of the preceding items, wherein a ratio of $H_B/H_{RE}$ is greater than 1, greater than 1.5, greater than 2.0, greater than 2.5, greater than 3.0, or even greater than 5.0.

Item 121. The assembly, method, shipping kit, non-superconducting magnetic impeller, magnetic impeller, or rotatable element according to any one of the preceding items, wherein a ratio $H_{LEV}/H_{RE}$ is greater than 2.0, greater than 2.5, greater than 3.0, greater than 3.5, or even greater than 4.0.

Item 122. The assembly, method, shipping kit, non-superconducting magnetic impeller, magnetic impeller, or rotatable element according to any one of the preceding items, further comprising a plug adapted to retain the blade on the post.

Item 123. The assembly, method, shipping kit, non-superconducting magnetic impeller, magnetic impeller, or rotatable element according to any one of the preceding items, wherein the plug comprises a substantially hollow axial member and a peripheral flange extending radially from the member.

Item 124. The assembly, method, shipping kit, non-superconducting magnetic impeller, magnetic impeller, or rotatable element according to any one of the preceding items, wherein the plug forms an interference fit with the post.

Item 125. The assembly, method, shipping kit, non-superconducting magnetic impeller, magnetic impeller, or rotatable element according to any one of the preceding items, wherein the plug is removable from the post.

Item 126. The assembly, method, shipping kit, non-superconducting magnetic impeller, magnetic impeller, or rotatable element according to any one of the preceding items, further comprising a retainer having a lip, wherein the lip of the retainer engages a seat of the plug, and wherein the retainer secures the plug to the magnetic impeller.

Item 127. The assembly, method, shipping kit, non-superconducting magnetic impeller, magnetic impeller, or rotatable element according to any one of the preceding items, wherein the retainer engages with an extension of the impeller bearing.

Item 128. The assembly, method, shipping kit, non-superconducting magnetic impeller, magnetic impeller, or rotatable element according to any one of the preceding items, wherein the retainer forms an interference fit with an extension of the impeller bearing.

Item 129. The assembly, method, shipping kit, non-superconducting magnetic impeller, magnetic impeller, or rotatable element according to any one of the preceding items, wherein the plug comprises polyvinylidene fluoride (PVDF).

Item 130. The assembly, method, shipping kit, non-superconducting magnetic impeller, magnetic impeller, or rotatable element according to any one of the preceding items, wherein the plug further comprises a screen.

It Item 131. The assembly, method, shipping kit, non-superconducting magnetic impeller, magnetic impeller, or rotatable element according to any one of the preceding items, wherein the post further comprises a radial protrusion extending parallel with the axis of rotation, wherein the rotatable element further comprises a complementary recess extending parallel with the axis of rotation, and wherein the protrusion and recess slidably engage.

Item 132. The assembly, method, shipping kit, non-superconducting magnetic impeller, magnetic impeller, or rotatable element according to any one of the preceding items, wherein the post further comprises a recess extending parallel with the axis of rotation, wherein the rotatable element further comprises a complementary protrusion extending parallel with the axis of rotation, and wherein the protrusion and recess slidably engage.

Item 133. The assembly, method, shipping kit, non-superconducting magnetic impeller, magnetic impeller, or rotatable element according to any one of the preceding items, wherein the magnetic member is ferromagnetic.

Item 134. The assembly, method, shipping kit, non-superconducting magnetic impeller, magnetic impeller, or rotatable element according to any one of the preceding items, wherein the magnetic element comprises a ferromagnetic material selected from the group consisting of steel, iron, cobalt, nickel, and earth magnets.

Item 135. The assembly, method, shipping kit, non-superconducting magnetic impeller, magnetic impeller, or rotatable element according to any one of the preceding items, wherein the magnetic member is statically affixed to the rotatable element.

Item 136. The assembly, method, shipping kit, non-superconducting magnetic impeller, magnetic impeller, or rotatable element according to any one of the preceding items, wherein the rotatable element has a first and second surface, the second surface proximate the impeller bearing, and wherein the magnetic member is statically affixed within the rotatable element proximate the second surface.

Item 137. The assembly, method, shipping kit, non-superconducting magnetic impeller, magnetic impeller, or rotatable element according to any one of the preceding items, wherein the rotatable element comprises a cavity, and wherein the magnetic member is positioned within the cavity.

Item 138. The assembly, method, shipping kit, non-superconducting magnetic impeller, magnetic impeller, or rotatable element according to any one of the preceding items, wherein the rotatable element further comprises a cap, the cap positioned above the magnetic member, and wherein the cap prevents decoupling of the magnetic member from the rotatable element.

Item 139. The assembly, method, shipping kit, non-superconducting magnetic impeller, magnetic impeller, or rotatable element according to any one of the preceding items, wherein the cap is sealed to the rotatable element to prevent a fluid from contacting the magnetic member.

Item 140. The assembly, method, shipping kit, non-superconducting magnetic impeller, magnetic impeller, or rotatable element according to any one of the preceding items, wherein the cap includes at least one flexible sealing gasket that engages the cap and the rotatable element to form a substantially liquid tight seal.

Item 141. The assembly, method, shipping kit, non-superconducting magnetic impeller, magnetic impeller, or rotatable element according to any one of the preceding items, wherein the cap is hermetically sealed to the rotatable element.

Item 142. The assembly, method, shipping kit, non-superconducting magnetic impeller, magnetic impeller, or rotatable element according to any one of the preceding items, further comprising a spacer, the spacer positioned between the magnetic member and the cap, wherein the spacer prevents relative movement of the magnetic member and cap.

Item 143. The assembly, method, shipping kit, non-superconducting magnetic impeller, magnetic impeller, or rotatable element according to any one of the preceding items, wherein the spacer is integral with the cap.

Item 144. The assembly, method, shipping kit, non-superconducting magnetic impeller, magnetic impeller, or rotatable element according to any one of the preceding items, wherein the blade comprises a central hub having an inner bore defining an inner surface and a plurality of blades extending radially outward therefrom.

Item 145. The assembly, method, shipping kit, non-superconducting magnetic impeller, magnetic impeller, or rotatable element according to any one of the preceding items, wherein the blades are non-rectilinear and comprise an arcuate major surface adapted to generate relative lift in a fluid.

Item 146. The assembly, method, shipping kit, non-superconducting magnetic impeller, magnetic impeller, or rotatable element according to any one of the preceding items, wherein the blades have an angle of attack, $A_A$, as measured by the angle formed between the major surface of the blade and the axis of rotation of the rotatable element, and wherein $A_A$ is at least 20 degrees, at least 30 degrees, at least 40 degrees, at least 50 degrees, at least 60 degrees, at least 70 degrees, at least 80 degrees, or even at least 85 degrees.

Item 147. The assembly, method, shipping kit, non-superconducting magnetic impeller, magnetic impeller, or rotatable element according to any one of the preceding items, wherein $A_A$ is no greater than 85 degrees, no greater than 80 degrees, no greater than 70 degrees, no greater than 60 degrees, no greater than 50 degrees, or even no greater than 40 degrees.

Item 148. The assembly, method, shipping kit, non-superconducting magnetic impeller, magnetic impeller, or rotatable element according to any one of the preceding items, wherein the major surface of the blade includes a leading edge and a trailing edge.

Item 149. The assembly, method, shipping kit, non-superconducting magnetic impeller, magnetic impeller, or rotatable element according to any one of the preceding items, wherein the blades have a camber angle, $A_C$, and wherein $A_C$ is greater than 5 degrees, greater than 10 degrees, greater than 20 degrees, greater than 30 degrees, greater than 40 degrees, greater than 50 degrees, or even greater than 60 degrees.

Item 150. The assembly, method, shipping kit, non-superconducting magnetic impeller, magnetic impeller, or rotatable element according to any one of the preceding items, wherein $A_C$ is less than 100 degrees, less than 90 degrees, less than 80 degrees, less than 70 degrees, less than 60 degrees, less than 50 degrees, less than 40 degrees, or even less than 30 degrees.

Item 151. The assembly, method, shipping kit, non-superconducting magnetic impeller, magnetic impeller, or rotatable element according to any one of the preceding items, wherein the major surface of the blade includes a plurality of vortex generators.

Item 152. The assembly, method, shipping kit, non-superconducting magnetic impeller, magnetic impeller, or rotatable element according to any one of the preceding items, wherein each blade comprises at least two flanges, at least three flanges, or even at least four flanges.

Item 153. The assembly, method, shipping kit, non-superconducting magnetic impeller, magnetic impeller, or rotatable element according to any one of the preceding items, wherein the at least one flange has a non-rectilinear cross section.

Item 154. The assembly, method, shipping kit, non-superconducting magnetic impeller, magnetic impeller, or rotatable element according to any one of the preceding items, wherein the flange comprises a winglet.

Item 155. The assembly, method, shipping kit, non-superconducting magnetic impeller, magnetic impeller, or rotatable element according to any one of the preceding items, wherein the blade comprises a polymer material.

Item 156. The assembly, method, shipping kit, non-superconducting magnetic impeller, magnetic impeller, or rotatable element according to any one of the preceding items, wherein the blade is an injection molded element.

Item 157. The assembly, method, shipping kit, non-superconducting magnetic impeller, magnetic impeller, or rotatable element according to any one of the preceding items, wherein the blade comprises at least two pieces.

Item 158. The assembly, method, shipping kit, non-superconducting magnetic impeller, magnetic impeller, or rotatable element according to any one of the preceding items, wherein the magnetic impeller has a first configuration and a second configuration, and wherein the magnetic impeller is adapted to have a narrower profile in the first configuration than the second configuration.

Item 159. The assembly, method, shipping kit, non-superconducting magnetic impeller, magnetic impeller, or rotatable element according to any one of the preceding items, wherein the second configuration is an operational configuration, and wherein the first configuration is a non-operational configuration.

Item 160. The assembly, method, shipping kit, non-superconducting magnetic impeller, magnetic impeller, or rotatable element according to any one of the preceding items, wherein the magnetic impeller is free-standing.

Item 161. The assembly, method, shipping kit, non-superconducting magnetic impeller, magnetic impeller, or rotatable element according to any one of the preceding items, wherein the magnetic impeller is adapted to mix a fluid retained within a vessel without being physically held to a predetermined location within the vessel.

Item 162. The assembly, method, shipping kit, non-superconducting magnetic impeller, magnetic impeller, or rotatable element according to any one of the preceding items, wherein the magnetic impeller comprises a first blade and a second blade, wherein the first and second blades are adapted to rotate about a common axis, wherein the first blade is disposed above the second blade, and wherein the magnetic impeller is adapted to permit substantial alignment of the first blade and the second blade when in a second configuration.

Item 163. The assembly, method, shipping kit, non-superconducting magnetic impeller, magnetic impeller, or rotatable element according to any one of the preceding items, wherein first blade and second blade are adapted to partially freely rotate relative to each other.

Item 164. The assembly, method, shipping kit, non-superconducting magnetic impeller, magnetic impeller, or rotatable element according to any one of the preceding items, wherein the magnetic impeller comprises a plurality of blades comprising a first blade and a second blade, wherein the first and second blades are adapted to rotate about a common axis, and wherein the first and second blades are positioned in different planes.

Item 165. The assembly, method, shipping kit, non-superconducting magnetic impeller, magnetic impeller, or rotatable element according to any one of the preceding items, wherein the magnetic impeller comprises:

a first blade and a second blade, wherein the first and second blades are adapted to rotate about a common axis, wherein the first blade is disposed above the second blade, and wherein the first blade comprises a first flange, and the second blade comprises a second flange, and wherein when the first blade rotates, the first flange contacts the second flange thereby causing the second blade to rotate in the second configuration.

Item 166. The assembly, method, shipping kit, non-superconducting magnetic impeller, magnetic impeller, or rotatable element according to any one of the preceding items, wherein the assembly further comprises a vessel having at least one opening, and wherein the magnetic impeller is adapted to pass through the opening in an initial configuration.

Item 167. The assembly, method, shipping kit, non-superconducting magnetic impeller, magnetic impeller, or rotatable element according to any one of the preceding items, wherein the assembly further comprises a vessel having at least one flexible side wall.

Item 168. The assembly, method, shipping kit, non-superconducting magnetic impeller, magnetic impeller, or rotatable element according to any one of the preceding items, wherein the assembly further comprises a rigid vessel.

Item 169. The assembly, method, shipping kit, non-superconducting magnetic impeller, magnetic impeller, or rotatable element according to any one of the preceding items, wherein the assembly further comprises a carboy.

Item 170. The assembly, method, shipping kit, non-superconducting magnetic impeller, magnetic impeller, or rotatable element according to any one of the preceding items, wherein the assembly further comprises a vessel having a neck narrower than the body.

Item 171. The assembly, method, shipping kit, non-superconducting magnetic impeller, magnetic impeller, or rotatable element according to any one of the preceding items, wherein the assembly comprises a magnetic element.

Item 172. The assembly, method, shipping kit, non-superconducting magnetic impeller, magnetic impeller, or rotatable element according to any one of the preceding items, wherein the magnetic element is adapted to couple with an external magnetic element.

Item 173. The assembly, method, shipping kit, non-superconducting magnetic impeller, magnetic impeller, or rotatable element according to any one of the preceding items, wherein the assembly is adapted to magnetically couple with an external drive to rotate the magnetic impeller.

Item 174. The assembly, method, shipping kit, non-superconducting magnetic impeller, magnetic impeller, or rotatable element according to any one of the preceding items, wherein the assembly comprises a housing, and wherein a magnetic element is disposed within the housing.

Item 175. The assembly, method, shipping kit, non-superconducting magnetic impeller, magnetic impeller, or rotatable element according to any one of the preceding items, wherein the assembly comprises a housing, a plurality of blades, and at least one of the plurality of blades has a longest dimension that is greater than a longest dimension of the housing.

Item 176. The assembly, method, shipping kit, non-superconducting magnetic impeller, magnetic impeller, or rotatable element according to any one of the preceding items, wherein the assembly comprises a housing, and wherein a magnetic element is sealed within the housing such that fluid to be mixed can not chemically interact with the magnetic element.

Item 177. The assembly of any one of the preceding items, wherein the assembly comprises a housing, wherein a magnetic element is disposed within the housing, and wherein the assembly further comprises at least one cap for sealing the magnetic element within the housing.

Item 178. The assembly, method, shipping kit, non-superconducting magnetic impeller, magnetic impeller, or rotatable element according to any one of the preceding items, wherein the assembly comprises a housing having a length and a width, wherein the length is greater than the width, and wherein at least a portion of the housing has a curvature along the length.

Item 179. The assembly, method, shipping kit, non-superconducting magnetic impeller, magnetic impeller, or rotatable element according to any one of the preceding items, wherein the assembly comprises a housing, and wherein the housing comprises a sealed pocket comprising a gas.

Item 180. The assembly, method, shipping kit, non-superconducting magnetic impeller, magnetic impeller, or rotatable element according to any one of the preceding items, wherein the assembly comprises a housing, and wherein the housing comprises a sealed pocket comprising a compressed gas.

Item 181. The assembly, method, shipping kit, non-superconducting magnetic impeller, magnetic impeller, or rotatable element according to any one of the preceding items, wherein the assembly comprises a housing having a shaft, and wherein the shaft comprises a sealed pocket comprising a compressed gas.

Item 182. The assembly, method, shipping kit, non-superconducting magnetic impeller, magnetic impeller, or rotatable element according to any one of the preceding items, wherein the assembly comprises a sealed pocket of gas at least partially within an axis of rotation of the magnetic impeller.

Item 183. The assembly, method, shipping kit, non-superconducting magnetic impeller, magnetic impeller, or rotatable element according to any one of the preceding items, wherein the assembly comprises a housing, and wherein the housing comprises a supporting member.

Item 184. The assembly, method, shipping kit, non-superconducting magnetic impeller, magnetic impeller, or rotatable element according to any one of the preceding items, wherein the assembly comprises a housing having a shaft, a first blade and a second blade adapted to partially freely rotate about shaft, and a retention member adapted to retain the first and second blades about the shaft, wherein the retention member is rotationally fixed to the housing.

Item 185. The assembly, method, shipping kit, non-superconducting magnetic impeller, magnetic impeller, or rotatable element according to any one of the preceding items, wherein the retention member comprises a third flange such that when the housing and thus the retention member are rotated, the third flange contacts the second flange and thereby rotates the second blade in the second configuration.

Item 186. The assembly, method, shipping kit, non-superconducting magnetic impeller, magnetic impeller, or rotatable element according to any one of the preceding items, wherein the assembly comprises a housing a plurality of blades, and a retention member to retain at least one of the plurality of blades about the shaft, wherein the retention member has a top surface having an arcuate shape.

Item 187. The assembly, method, shipping kit, non-superconducting magnetic impeller, magnetic impeller, or rotatable element according to any one of the preceding items, wherein the assembly or magnetic impeller has a mixing suspension efficiency of at least 70%, at least 75%, at least 80%, at least 85%, at least 90%, at least 95%, at least 97%, or even at least 99% as measured according The Particulate Suspension Test at 75 RPMs.

Item 188. The assembly, method, shipping kit, non-superconducting magnetic impeller, magnetic impeller, or rotatable element according to any one of the preceding items, wherein the assembly or magnetic impeller has a mixing suspension efficiency of at least 70%, at least 75%, at least 80%, at least 85%, at least 90%, at least 95%, at least 97%, or even at least 99% at 100 RPMs as measured according The Mixing Suspension Test at 100 RPMs.

Item 189. The assembly, method, shipping kit, non-superconducting magnetic impeller, magnetic impeller, or rotatable element according to any one of the preceding items, wherein the assembly or magnetic impeller has a mixing suspension efficiency of at least 70%, at least 75%, at least 80%, at least 85%, at least 90%, at least 95%, at least 97%, or even at least 99% at 150 RPMs as measured according The Mixing Suspension Test at 150 RPMs.

Item 190. The assembly, method, shipping kit, non-superconducting magnetic impeller, magnetic impeller, or rotatable element according to any one of the preceding items, wherein the assembly or magnetic impeller has a mixing suspension efficiency of at least 70%, at least 75%, at least 80%, at least 85%, at least 90%, at least 95%, at least 97%, or even at least 99% at 150 RPMs as measured according The Mixing Suspension Test at no greater than 200 RPMs.

Item 191. The assembly, method, shipping kit, non-superconducting magnetic impeller, magnetic impeller, or rotatable element according to any one of the preceding items, wherein the assembly or magnetic impeller comprises a plurality of blades.

Item 192. The assembly, method, shipping kit, non-superconducting magnetic impeller, magnetic impeller, or rotatable element according to any one of the preceding items, wherein the blade(s) has a leading edge and a trailing edge, and wherein the blade(s) has at least one opening adjacent the leading edge, and at least one opening adjacent the trailing edge.

Item 193. The assembly, method, shipping kit, non-superconducting magnetic impeller, magnetic impeller, or rotatable element according to any one of the preceding items, wherein the blade(s) has a leading edge and a trailing edge, and wherein the blade(s) has at least one opening adjacent the leading edge, and at least one opening adjacent the trailing edge, wherein the at least one opening adjacent the leading edge and/or trailing edge has a longest dimension generally extending from a center hub to a tip of the blade.

Item 194. The assembly, method, shipping kit, non-superconducting magnetic impeller, magnetic impeller, or rotatable element according to any one of the preceding items, wherein the at least one opening has a generally rectangular shape.

Item 195. The assembly, method, shipping kit, non-superconducting magnetic impeller, magnetic impeller, or rotatable element according to any one of the preceding items, wherein the at least one opening is generally parallel with a leading edge and/or a trailing edge of the blade(s).

Item 196. The assembly, method, shipping kit, non-superconducting magnetic impeller, magnetic impeller, or rotatable element according to any one of the preceding items, wherein the leading edge of the blade is adapted to extend during mixing.

Item 197. The assembly, method, shipping kit, non-superconducting magnetic impeller, magnetic impeller, or rotatable element according to any one of the preceding items, wherein the trailing edge of the blade is adapted to extend during mixing.

Item 198. The assembly, method, shipping kit, non-superconducting magnetic impeller, magnetic impeller, or rotatable element according to any one of the preceding items, wherein the blade has a camber angle, wherein the blade is adapted to extend during mixing, and wherein after extending, the blade has a greater camber angle than before extending.

Item 199. The assembly, method, shipping kit, non-superconducting magnetic impeller, magnetic impeller, or rotatable element according to any one of the preceding items, wherein the blade has an angle of attack, wherein the blade is adapted to extend during mixing, and wherein after extending, the blade has a greater angle of attack than before extending.

Item 200. The assembly, method, shipping kit, non-superconducting magnetic impeller, magnetic impeller, or rotatable element according to any one of the preceding items, wherein the blade(s) is flexible.

Item 201. The assembly, method, shipping kit, non-superconducting magnetic impeller, magnetic impeller, or rotatable element according to any one of the preceding items, wherein the blade(s) comprises a material having a Young's modulus of no greater than about 5 GPa, such as no greater than about 4 GPa, no greater than about 3 GPa, no greater than about 2 GPa, no greater than about 1 GPa, no greater than about 0.75 GPa, no greater than about 0.5 GPa, no greater than about 0.25 GPa, or even no greater than about 0.1 GPa.

Item 202. The assembly, method, shipping kit, non-superconducting magnetic impeller, magnetic impeller, or rotatable element according to any one of the preceding items, wherein the blade(s) comprises a silicone.

Item 203. The assembly, method, shipping kit, non-superconducting magnetic impeller, magnetic impeller, or rotatable element according to any one of the preceding items, wherein the blade(s) is silicone based.

Item 204. The assembly, method, shipping kit, non-superconducting magnetic impeller, magnetic impeller, or rotatable element according to any one of the preceding items, wherein the blade(s) is adapted to bend to accommodate entry into a vessel.

Item 205. The assembly, method, shipping kit, non-superconducting magnetic impeller, magnetic impeller, or rotatable element according to any one of the preceding items, wherein the blade(s) is adapted to bend during mixing in response to the force of the fluid interacting with the blade(s).

Item 206. The assembly, method, shipping kit, non-superconducting magnetic impeller, magnetic impeller, or rotatable element according to any one of the preceding items, wherein the blade(s) is adapted to bend during mixing in response to the force of the fluid interacting with the blade(s) and wherein the blades are adapted to bend such that a camber angle of the blade increase.

Item 207. The assembly, method, shipping kit, non-superconducting magnetic impeller, magnetic impeller, or rotatable element according to any one of the preceding items, wherein the blade(s) is adapted to bend during mixing in response to the force of the fluid interacting with the blade(s) and wherein the blades are adapted to bend at a speed of at least 50 RPM, at least 60 RPM, at least 70 RPM, at least 75 RPM, at least 80 RPM, at least 85 RPM, at least 90 RPM, at least 95 RPM, at least 100 RPM, at least 110 RPM, at least 120 RPM, at least 130 RPM, at least 140 RPM, at least 150 RPM, at least 160 RPM, at least 170 RPM, at least 180 RPM, at least 190 RPM, or even at least 200 RPM.

Item 208. The assembly, method, shipping kit, non-superconducting magnetic impeller, magnetic impeller, or rotatable element according to any one of the preceding items, wherein the blade(s) has a region between a leading edge and a trailing edge having a smaller thickness (when viewed in the cross-section) than a thickness of the blade in the region of the leading edge and/or trailing edge.

Item 209. The assembly, method, shipping kit, non-superconducting magnetic impeller, magnetic impeller, or rotatable element according to any one of the preceding items, wherein the assembly or magnetic impeller is physically decoupled from a vessel.

Item 210. The assembly, method, shipping kit, non-superconducting magnetic impeller, magnetic impeller, or rotatable element according to any one of the preceding items, wherein the assembly or magnetic impeller is physically coupled to a vessel.

Item 211. The assembly, method, shipping kit, non-superconducting magnetic impeller, magnetic impeller, or rotatable element according to any one of the preceding items, wherein the assembly or magnetic impeller comprises a magnetic element.

Item 212. The assembly, method, shipping kit, non-superconducting magnetic impeller, magnetic impeller, or rotatable element according to any one of the preceding items, wherein the assembly or magnetic impeller comprises a magnetic element, and wherein the assembly or magnetic impeller is adapted to be rotated via a magnetic coupling with a magnetic drive, wherein the magnetic drive is disposed external to a vessel.

Item 213. The assembly, method, shipping kit, non-superconducting magnetic impeller, magnetic impeller, or rotatable element according to any one of the preceding items, wherein the blade(s) is non-rectilinear and comprises an arcuate major surface adapted to generate relative lift in a fluid.

Item 214. The assembly, method, shipping kit, non-superconducting magnetic impeller, magnetic impeller, or rotatable element according to any one of the preceding items, wherein the blades have an angle of attack, $A_A$, as measured by the angle formed between the major surface of the blade and the center axis of rotation of the rotatable element, and wherein $A_A$ is at least 20 degrees, at least 30 degrees, at least 40 degrees, at least 50 degrees, at least 60 degrees, at least 70 degrees, at least 80 degrees, or even at least 85 degrees.

Item 215. The assembly, method, shipping kit, non-superconducting magnetic impeller, magnetic impeller, or rotatable element according to any one of the preceding items, wherein the blades have an angle of attack, $A_A$, as measured by the angle formed between the major surface of the blade and the center axis of rotation of the rotatable element, and wherein $A_A$ is no greater than 85 degrees, no greater than 80 degrees, no greater than 70 degrees, no greater than 60 degrees, no greater than 50 degrees, or even no greater than 40 degrees.

Item 216. The assembly, method, shipping kit, non-superconducting magnetic impeller, magnetic impeller, or rotatable element according to any one of the preceding items, wherein the major surface of the blade includes a leading edge and a trailing edge.

Item 217. The assembly, method, shipping kit, non-superconducting magnetic impeller, magnetic impeller, or rotatable element according to any one of the preceding items, wherein the blades have a camber angle, $A_C$, and wherein $A_C$ is greater than 5 degrees, greater than 10 degrees, greater than 20 degrees, greater than 30 degrees, greater than 40 degrees, greater than 50 degrees, or even greater than 60 degrees.

Item 218. The assembly, method, shipping kit, non-superconducting magnetic impeller, magnetic impeller, or rotatable element according to any one of the preceding items, wherein the blades have a camber angle, $A_C$, wherein $A_C$ is less than 100 degrees, less than 90 degrees, less than 80 degrees, less than 70 degrees, less than 60 degrees, less than 50 degrees, less than 40 degrees, or even less than 30 degrees.

Item 219. The assembly, method, shipping kit, non-superconducting magnetic impeller, magnetic impeller, or rotatable element according to any one of the preceding items, wherein the assembly or magnetic impeller is not attached to a shaft which extends outside of the vessel.

Item 220. The assembly, method, shipping kit, non-superconducting magnetic impeller, magnetic impeller, or rotatable element according to any one of the preceding items, wherein the vessel comprises at least one flexible side wall.

Item 221. The assembly, method, shipping kit, non-superconducting magnetic impeller, magnetic impeller, or rotatable element according to any one of the preceding items, wherein the vessel comprises at least one flexible side wall and at least one wall having a greater rigidity than the at least one flexible side wall.

Item 222. The assembly, method, shipping kit, non-superconducting magnetic impeller, magnetic impeller, or rotatable element according to any one of the preceding items, wherein the vessel comprises a flexible surface and a rigid surface, wherein the rigid surface is adapted to be an engaging surface with the magnetic impeller.

Item 223. The assembly, method, shipping kit, non-superconducting magnetic impeller, magnetic impeller, or rotatable element according to any one of the preceding items, wherein the vessel is at least partly collapsible.

Item 224. The assembly, method, shipping kit, non-superconducting magnetic impeller, magnetic impeller, or rotatable element according to any one of the preceding items, wherein the assembly further includes a mixing dish comprising a floor, and wherein the floor of the mixing dish forms the floor of the vessel.

Item 225. The assembly, method, shipping kit, non-superconducting magnetic impeller, magnetic impeller, or rotatable element according to any one of the preceding items, wherein the cage is directly connected to floor.

Item 226. The assembly, method, shipping kit, non-superconducting magnetic impeller, magnetic impeller, or rotatable element according to any one of the preceding items, wherein the floor comprises a substantially flat surface.

Item 227. The assembly, method, shipping kit, non-superconducting magnetic impeller, magnetic impeller, or rotatable element according to any one of the preceding items, wherein the vessel defines a second cavity, wherein the cage defines a first cavity, wherein the magnetic element is disposed within the first cavity, and wherein the second cavity is in fluid communication with the first cavity.

Item 228. The assembly, method, shipping kit, non-superconducting magnetic impeller, magnetic impeller, or rotatable element according to any one of the preceding items, wherein the magnetic impeller is free standing.

Item 229. The assembly, method, shipping kit, non-superconducting magnetic impeller, magnetic impeller, or rotatable element according to any one of the preceding items, wherein the magnetic impeller is physically decoupled from the vessel.

Item 230. The assembly, method, shipping kit, non-superconducting magnetic impeller, magnetic impeller, or rotatable element according to any one of the preceding items, wherein the magnetic impeller comprises a rotatable element, wherein the magnetic element is disposed within the rotatable element, and wherein the cage bounds the rotatable element.

Item 231. The assembly, method, shipping kit, non-superconducting magnetic impeller, magnetic impeller, or rotatable element according to any one of the preceding items, wherein the rotatable element has a height, wherein the at least one side wall of the cage has a height, and wherein the height of the at least one sidewall of the cage is greater than the height of the rotatable element.

Item 232. The assembly, method, shipping kit, non-superconducting magnetic impeller, magnetic impeller, or rotatable element according to any one of the preceding items, wherein the magnetic impeller comprises a shaft disposed between the magnetic element and the at least one blade, and wherein the shaft is at least partly disposed in both the first cavity and the second cavity.

Item 233. The assembly, method, shipping kit, non-superconducting magnetic impeller, magnetic impeller, or rotatable element according to any one of the preceding items, wherein the cage is detachable from the vessel.

Item 234. The assembly, method, shipping kit, non-superconducting magnetic impeller, magnetic impeller, or rotatable element according to any one of the preceding items, wherein the cage snaps into the vessel.

Item 235. The assembly, method, shipping kit, non-superconducting magnetic impeller, magnetic impeller, or rotatable element according to any one of the preceding items, wherein the cage has a generally dome shape.

Item 236. The assembly, method, shipping kit, non-superconducting magnetic impeller, magnetic impeller, or rotatable element according to any one of the preceding items, wherein the cage is formed from a polymer material.

Item 237. The assembly, method, shipping kit, non-superconducting magnetic impeller, magnetic impeller, or rotatable element according to any one of the preceding items, wherein the cage is formed from a high density poly ethylene (HDPE) polymer.

Item 238. The assembly, method, shipping kit, non-superconducting magnetic impeller, magnetic impeller, or rotatable element according to any one of the preceding items, wherein the cage has a top surface, a bottom surface, and at least one side wall.

Item 239. The assembly, method, shipping kit, non-superconducting magnetic impeller, magnetic impeller, or rotatable element according to any one of the preceding items, wherein the cage comprises at least one side wall, and wherein the cage includes at least one opening disposed on the at least one sidewall such that fluid can flow between the first cavity and the second cavity.

Item 240. The assembly, method, shipping kit, non-superconducting magnetic impeller, magnetic impeller, or rotatable element according to any one of the preceding items, wherein the cage is adapted to provide a maximum translation movement of the magnetic impeller in a direction normal to an axis of rotation.

Item 241. The assembly, method, shipping kit, non-superconducting magnetic impeller, magnetic impeller, or rotatable element according to any one of the preceding items, wherein the cage comprises an aperture about a predetermined ideal axis of rotation of the magnetic impeller.

Item 242. The assembly, method, shipping kit, non-superconducting magnetic impeller, magnetic impeller, or rotatable element according to any one of the preceding items, wherein the aperture has a diameter, and wherein the magnetic impeller has a diameter, and wherein the diameter of the magnetic impeller is greater than the diameter of the aperture.

Item 243. The assembly, method, shipping kit, non-superconducting magnetic impeller, magnetic impeller, or rotatable element according to any one of the preceding items, wherein the cage comprises a fin.

Item 244. The assembly, method, shipping kit, non-superconducting magnetic impeller, magnetic impeller, or rotatable element according to any one of the preceding items, wherein the cage comprises a fin extending from at least one side wall of the cage toward the rotatable element.

Item 245. The assembly, method, shipping kit, non-superconducting magnetic impeller, magnetic impeller, or rotatable element according to any one of the preceding items, wherein a ratio of the diameter of the cage to the diameter of the rotatable element is greater than 1, at least 1.2, at least 1.3, at least 1.4, or even at least 1.5.

Item 246. The assembly, method, shipping kit, non-superconducting magnetic impeller, magnetic impeller, or rotatable element according to any one of the preceding items, wherein a ratio of the diameter of the vessel to the diameter of the cage is greater than 1, at least 1.5, at least 2, at least 3, at least 4, or even at least 5.

Item 247. The assembly, method, shipping kit, non-superconducting magnetic impeller, magnetic impeller, or rotatable element according to any one of the preceding items, wherein a ratio of the diameter of the cage to the diameter of the blade is at least 0.5, at least 0.8, at least 1, at least 1.1, at least 1.2, at least 1.3, at least 1.4, or even at least 1.5.

Item 248. The assembly, method, shipping kit, non-superconducting magnetic impeller, magnetic impeller, or rotatable element according to any one of the preceding items, wherein a ratio of the diameter of the blade to the diameter of the vessel is at least 0.25, at least 0.5, at least 0.6, at least 0.7, at least 0.75, at least 0.8, at least 0.85, at least 0.9, or even at least 0.95.

Item 249. The assembly, method, shipping kit, non-superconducting magnetic impeller, magnetic impeller, or rotatable element according to any one of the preceding items, wherein the assembly further comprises a magnetic drive adapted to rotate the magnetic element and thus the magnetic impeller.

Item 250. The assembly, method, shipping kit, non-superconducting magnetic impeller, magnetic impeller, or rotatable element according to any one of the preceding items, wherein the assembly is adapted to be disposable.

Item 251. The assembly, method, shipping kit, non-superconducting magnetic impeller, magnetic impeller, or rotatable element according to any one of the preceding items, wherein the mixing assembly or magnetic impeller has a mixing suspension efficiency of at least 70%, at least 75%, at least 80%, at least 85%, at least 90%, at least 95%, at least 97%, or even at least 99% as measured according The Particulate Suspension Test at 75 RPMs.

Item 252. The assembly, method, shipping kit, non-superconducting magnetic impeller, magnetic impeller, or rotatable element according to any one of the preceding items, wherein the mixing assembly or magnetic impeller has a mixing suspension efficiency of at least 70%, at least 75%, at least 80%, at least 85%, at least 90%, at least 95%, at least 97%, or even at least 99% at 100 RPMs as measured according The Mixing Suspension Test at 100 RPMs.

Item 253. The assembly, method, shipping kit, non-superconducting magnetic impeller, magnetic impeller, or rotatable element according to any one of the preceding items, wherein the mixing assembly or magnetic impeller has a mixing suspension efficiency of at least 70%, at least 75%, at least 80%, at least 85%, at least 90%, at least 95%, at least 97%, or even at least 99% at 150 RPMs as measured according The Mixing Suspension Test at 150 RPMs.

Item 254. The assembly, method, shipping kit, non-superconducting magnetic impeller, magnetic impeller, or rotatable element according to any one of the preceding items, wherein the mixing assembly or magnetic impeller has a mixing suspension efficiency of at least 70%, at least 75%, at least 80%, at least 85%, at least 90%, at least 95%, at least 97%, or even at least 99% at 150 RPMs as measured according The Mixing Suspension Test at no greater than 200 RPMs.

Item 255. The assembly, method, shipping kit, non-superconducting magnetic impeller, magnetic impeller, or rotatable element according to any one of the preceding items, wherein the mixing assembly or magnetic impeller comprises a plurality of blades.

Item 256. The assembly, method, shipping kit, non-superconducting magnetic impeller, magnetic impeller, or rotatable element according to any one of the preceding items, wherein the blade(s) has a leading edge and a trailing edge, and wherein the blade(s) has at least one opening adjacent the leading edge, and at least one opening adjacent the trailing edge.

Item 257. The assembly, method, shipping kit, non-superconducting magnetic impeller, magnetic impeller, or rotatable element according to any one of the preceding items, wherein the blade(s) has a leading edge and a trailing edge, and wherein the blade(s) has at least one opening adjacent the leading edge, and at least one opening adjacent the trailing edge, wherein the at least one opening adjacent the leading edge and/or trailing edge has a longest dimension generally extending from a center hub to a tip of the blade.

Item 258. The assembly, method, shipping kit, non-superconducting magnetic impeller, magnetic impeller, or rotatable element according to any one of the preceding items, wherein the at least one opening has a generally rectangular shape.

Item 259. The assembly, method, shipping kit, non-superconducting magnetic impeller, magnetic impeller, or rotatable element according to any one of the preceding items, wherein the at least one opening is generally parallel with a leading edge and/or a trailing edge of the blade(s).

Item 260. The assembly, method, shipping kit, non-superconducting magnetic impeller, magnetic impeller, or rotatable element according to any one of the preceding items, wherein the leading edge of the blade is adapted to extend during mixing.

Item 261. The assembly, method, shipping kit, non-superconducting magnetic impeller, magnetic impeller, or rotatable element according to any one of the preceding items, wherein the trailing edge of the blade is adapted to extend during mixing.

Item 262. The assembly, method, shipping kit, non-superconducting magnetic impeller, magnetic impeller, or rotatable element according to any one of the preceding items, wherein the blade has a camber angle, wherein the blade is adapted to extend during mixing, and wherein after extending, the blade has a greater camber angle than before extending.

Item 263. The assembly, method, shipping kit, non-superconducting magnetic impeller, magnetic impeller, or rotatable element according to any one of the preceding items, wherein the blade has an angle of attack, wherein the blade is adapted to extend during mixing, and wherein after extending, the blade has a greater angle of attack than before extending.

Item 264. The assembly, method, shipping kit, non-superconducting magnetic impeller, magnetic impeller, or rotatable element according to any one of the preceding items, wherein the blade(s) is flexible.

Item 265. The assembly, method, shipping kit, non-superconducting magnetic impeller, magnetic impeller, or rotatable element according to any one of the preceding items, wherein the blade(s) comprises a material having a Young's modulus of no greater than about 5 GPa, such as no greater than about 4 GPa, no greater than about 3 GPa, no greater than about 2 GPa, no greater than about 1 GPa, no greater than about 0.75 GPa, no greater than about 0.5 GPa, no greater than about 0.25 GPa, or even no greater than about 0.1 GPa.

Item 266. The assembly, method, shipping kit, non-superconducting magnetic impeller, magnetic impeller, or rotatable element according to any one of the preceding items, wherein the blade(s) comprises a silicone.

Item 267. The assembly, method, shipping kit, non-superconducting magnetic impeller, magnetic impeller, or rotatable element according to any one of the preceding items, wherein the blade(s) is silicone based.

Item 268. The assembly, method, shipping kit, non-superconducting magnetic impeller, magnetic impeller, or rotatable element according to any one of the preceding items, wherein the blade(s) is adapted to bend to accommodate entry into a vessel.

Item 269. The assembly, method, shipping kit, non-superconducting magnetic impeller, magnetic impeller, or rotatable element according to any one of the preceding items, wherein the blade(s) is adapted to bend during mixing in response to the force of the fluid interacting with the blade(s).

Item 270. The assembly, method, shipping kit, non-superconducting magnetic impeller, magnetic impeller, or rotatable element according to any one of the preceding items, wherein the blade(s) is adapted to bend during mixing in response to the force of the fluid interacting with the blade(s) and wherein the blades are adapted to bend such that a camber angle of the blade increase.

Item 271. The assembly, method, shipping kit, non-superconducting magnetic impeller, magnetic impeller, or rotatable element according to any one of the preceding items, wherein the blade(s) is adapted to bend during mixing in response to the force of the fluid interacting with the blade(s) and wherein the blades are adapted to bend at a speed of at least 50 RPM, at least 60 RPM, at least 70 RPM, at least 75 RPM, at least 80 RPM, at least 85 RPM, at least 90 RPM, at least 95 RPM, at least 100 RPM, at least 110 RPM, at least 120 RPM, at least 130 RPM, at least 140 RPM, at least 150 RPM, at least 160 RPM, at least 170 RPM, at least 180 RPM, at least 190 RPM, or even at least 200 RPM.

Item 272. The assembly, method, shipping kit, non-superconducting magnetic impeller, magnetic impeller, or rotatable element according to any one of the preceding items, wherein the blade(s) has a region between a leading edge and a trailing edge having a smaller thickness (when viewed in the cross-section) than a thickness of the blade in the region of the leading edge and/or trailing edge.

Item 273. The assembly, method, shipping kit, non-superconducting magnetic impeller, magnetic impeller, or rotatable element according to any one of the preceding items, wherein the mixing assembly or magnetic impeller is physically decoupled from a vessel.

Item 274. The assembly, method, shipping kit, non-superconducting magnetic impeller, magnetic impeller, or rotatable element according to any one of the preceding items, wherein the mixing assembly or magnetic impeller is physically coupled to a vessel.

Item 275. The assembly, method, shipping kit, non-superconducting magnetic impeller, magnetic impeller, or rotatable element according to any one of the preceding items, wherein the mixing assembly or magnetic impeller comprises a magnetic element.

Item 276. The assembly, method, shipping kit, non-superconducting magnetic impeller, magnetic impeller, or rotatable element according to any one of the preceding items, wherein the mixing assembly or magnetic impeller comprises a magnetic element, and wherein the mixing assembly or magnetic impeller is adapted to be rotated via a magnetic coupling with a magnetic drive, wherein the magnetic drive is disposed external to a vessel.

Item 277. The assembly, method, shipping kit, non-superconducting magnetic impeller, magnetic impeller, or rotatable element according to any one of the preceding items, wherein the blade(s) is non-rectilinear and comprises an arcuate major surface adapted to generate relative lift in a fluid.

Item 278. The assembly, method, shipping kit, non-superconducting magnetic impeller, magnetic impeller, or rotatable element according to any one of the preceding items, wherein the blades have an angle of attack, $A_A$, as measured by the angle formed between the major surface of the blade and the center axis of rotation of the rotatable element, and wherein $A_A$ is at least 20 degrees, at least 30 degrees, at least 40 degrees, at least 50 degrees, at least 60 degrees, at least 70 degrees, at least 80 degrees, or even at least 85 degrees.

Item 279. The assembly, method, shipping kit, non-superconducting magnetic impeller, magnetic impeller, or rotatable element according to any one of the preceding items, wherein the blades have an angle of attack, $A_A$, as measured by the angle formed between the major surface of the blade and the center axis of rotation of the rotatable element, and wherein $A_A$ is no greater than 85 degrees, no greater than 80 degrees, no greater than 70 degrees, no greater than 60 degrees, no greater than 50 degrees, or even no greater than 40 degrees.

Item 280. The assembly, method, shipping kit, non-superconducting magnetic impeller, magnetic impeller, or rotatable element according to any one of the preceding items, wherein the major surface of the blade includes a leading edge and a trailing edge.

Item 281. The assembly, method, shipping kit, non-superconducting magnetic impeller, magnetic impeller, or rotatable element according to any one of the preceding items, wherein the blades have a camber angle, $A_C$, and wherein $A_C$ is greater than 5 degrees, greater than 10 degrees, greater than 20 degrees, greater than 30 degrees, greater than 40 degrees, greater than 50 degrees, or even greater than 60 degrees.

Item 282. The assembly, method, shipping kit, non-superconducting magnetic impeller, magnetic impeller, or rotatable element according to any one of the preceding items, wherein the blades have a camber angle, $A_C$, wherein $A_C$ is less than 100 degrees, less than 90 degrees, less than 80 degrees, less than 70 degrees, less than 60 degrees, less than 50 degrees, less than 40 degrees, or even less than 30 degrees.

Item 283. The assembly, method, shipping kit, non-superconducting magnetic impeller, magnetic impeller, or rotatable element according to any one of the preceding items, wherein the mixing assembly or magnetic impeller is not attached to a shaft which extends outside of the vessel.

Item 284. The assembly, method, shipping kit, non-superconducting magnetic impeller, magnetic impeller, or rotatable element according to any one of the preceding items, wherein the mixing assembly or magnetic impeller is a non-superconducting mixing assembly or magnetic impeller.

Item 285. The assembly, method, shipping kit, non-superconducting magnetic impeller, magnetic impeller, or rotatable element according to any one of the preceding items, wherein a rigid member is attached to the flexible surface.

Item 286. The assembly, method, shipping kit, non-superconducting magnetic impeller, magnetic impeller, or rotatable element according to any one of the preceding items, wherein a rigid member is attached to an exterior surface of the flexible surface of the flexible vessel.

Item 287. The assembly, method, shipping kit, non-superconducting magnetic impeller, magnetic impeller, or rotatable element according to any one of the preceding items, wherein a rigid member is attached to an interior surface of the flexible surface of the flexible vessel.

Item 288. The assembly, method, shipping kit, non-superconducting magnetic impeller, magnetic impeller, or rotatable element according to any one of the preceding items, wherein a rigid material is welded to an interior surface of the flexible surface of the flexible vessel.

Item 289. The assembly, method, shipping kit, non-superconducting magnetic impeller, magnetic impeller, or rotatable element according to any one of the preceding items, wherein the flexible vessel forms an interior cavity, and wherein the interior cavity is sterile.

Item 290. The assembly, method, shipping kit, non-superconducting magnetic impeller, magnetic impeller, or rotatable element according to any one of the preceding items, the mixing assembly or magnetic impeller further comprising a rigid vessel, and wherein the flexible vessel is adapted to be disposed within the rigid vessel.

Item 291. The assembly, method, shipping kit, non-superconducting magnetic impeller, magnetic impeller, or rotatable element according to any one of the preceding items, the mixing assembly or magnetic impeller further comprising a magnetic drive, wherein the magnetic drive is adapted to drive the magnetic element in the magnetic impeller to initiate mixing.

Item 292. The assembly, method, shipping kit, non-superconducting magnetic impeller, magnetic impeller, or rotatable element according to any one of the preceding items, wherein the mixing assembly or magnetic impeller further comprises a stand, and wherein the stand is adapted to hold the rigid vessel upright.

Item 293. The assembly, method, shipping kit, non-superconducting magnetic impeller, magnetic impeller, or rotatable element according to any one of the preceding items, wherein the mixing assembly or magnetic impeller further comprises a stand, and wherein the stand is adapted to hold the rigid vessel upright, and wherein the stand comprises at least one wheel or roller.

Item 294. The assembly, method, shipping kit, non-superconducting magnetic impeller, magnetic impeller, or rotatable element according to any one of the preceding items, wherein the mixing assembly or magnetic impeller further comprises a stand, and wherein the stand is adapted to hold the rigid vessel upright, and wherein the stand is adapted to hold the magnetic drive.

Item 295. The assembly, method, shipping kit, non-superconducting magnetic impeller, magnetic impeller, or rotatable element according to any one of the preceding items, wherein the mixing assembly or magnetic impeller further comprises a stand, and wherein the stand is adapted to hold the rigid vessel upright, and wherein the stand is adapted to releasably hold the magnetic drive.

Item 296. The assembly, method, shipping kit, non-superconducting magnetic impeller, magnetic impeller, or rotatable element according to any one of the preceding items, wherein the flexible vessel is adapted to hold from 5 to 500 liters of fluid, or even from 50 to 300 liters of fluid.

Item 297. The assembly, method, shipping kit, non-superconducting magnetic impeller, magnetic impeller, or rotatable element according to any one of the preceding items, wherein the mixing assembly or magnetic impeller further comprises an inlet port and an outlet port.

Item 298. The assembly, method, shipping kit, non-superconducting magnetic impeller, magnetic impeller, or rotatable element according to any one of the preceding items, wherein the rigid vessel is composed of a polymeric material.

Item 299. The assembly, method, shipping kit, non-superconducting magnetic impeller, magnetic impeller, or rotatable element according to any one of the preceding items, wherein the rigid member is composed of a polymeric material.

Item 300. The assembly, method, shipping kit, non-superconducting magnetic impeller, magnetic impeller, or rotatable element according to any one of the preceding items, wherein the flexible vessel is composed of a polymeric material.

Item 301. The assembly, method, shipping kit, non-superconducting magnetic impeller, magnetic impeller, or rotatable element according to any one of the preceding items, wherein the stand has a greater rigidity than the rigid vessel, and wherein the rigid vessel has a greater rigidity than the flexible vessel.

Item 302. The assembly, method, shipping kit, non-superconducting magnetic impeller, magnetic impeller, or rotatable element according to any one of the preceding items, wherein the mixing assembly or magnetic impeller further comprises a handle coupled to the stand.

Item 303. The assembly, method, shipping kit, non-superconducting magnetic impeller, magnetic impeller, or rotatable element according to any one of the preceding items, wherein the mixing assembly or magnetic impeller further comprises a stand adapted to hold the rigid tank in an upright position, and wherein the stand further comprises a stabilizing structure, and wherein the stabilizing structure is coupled to the rigid vessel nearer the open side of the rigid tank than the bottom wall.

Item 304. The assembly, method, shipping kit, non-superconducting magnetic impeller, magnetic impeller, or rotatable element according to any one of the preceding items, wherein the magnetic impeller support member comprises a magnetic element.

Item 305. The assembly, method, shipping kit, non-superconducting magnetic impeller, magnetic impeller, or rotatable element according to any one of the preceding items, wherein the magnetic impeller support member comprises a ferromagnetic element.

Item 306. The assembly, method, shipping kit, non-superconducting magnetic impeller, magnetic impeller, or rotatable element according to any one of the preceding items, wherein the magnetic impeller support member comprises a magnetic material, and wherein the magnetic material is disposed directly adjacent an exterior surface of the flexible vessel.

Item 307. The assembly, method, shipping kit, non-superconducting magnetic impeller, magnetic impeller, or rotatable element according to any one of the preceding items, wherein the magnetic impeller support member is adapted to hold the magnetic impeller in an upright position.

Item 308. The assembly, method, shipping kit, non-superconducting magnetic impeller, magnetic impeller, or rotatable element according to any one of the preceding items, wherein the magnetic impeller comprises at least one blade, wherein the magnetic impeller support member is adapted to hold the magnetic impeller in an upright position such that the at least one blade does not contact an interior surface of the bottom wall of the vessel.

Item 309. The assembly, method, shipping kit, non-superconducting magnetic impeller, magnetic impeller, or rotatable element according to any one of the preceding items, wherein the mixing assembly or magnetic impeller further comprises a rigid vessel, wherein the flexible vessel is adapted to be disposed within the rigid vessel, and wherein the magnetic impeller support member is adapted to be removed before the flexible vessel is inserted into the rigid vessel.

Item 310. The assembly, method, shipping kit, non-superconducting magnetic impeller, magnetic impeller, or rotatable element according to any one of the preceding items, wherein the stand is adapted to hold the magnetic drive adjacent the bottom wall of the rigid vessel.

Item 311. The assembly, method, shipping kit, non-superconducting magnetic impeller, magnetic impeller, or rotatable element according to any one of the preceding items, wherein the mixing assembly or magnetic impeller further comprises a clamping mechanism adapted hold the magnetic drive directly adjacent to and contacting a surface of the stand and/or a bottom wall of the rigid vessel.

Item 312. The assembly, method, shipping kit, non-superconducting magnetic impeller, magnetic impeller, or rotatable element according to any one of the preceding items, wherein the rigid vessel is generally cylindrical.

Item 313. The assembly, method, shipping kit, non-superconducting magnetic impeller, magnetic impeller, or rotatable element according to any one of the preceding items, wherein the rigid vessel had a substantially planar bottom wall.

Item 314. The assembly, method, shipping kit, non-superconducting magnetic impeller, magnetic impeller, or rotatable element according to any one of the preceding items, wherein the mixing assembly or magnetic impeller further comprises a controller.

Item 315. The assembly, method, shipping kit, non-superconducting magnetic impeller, magnetic impeller, or rotatable element according to any one of the preceding items, wherein the controller is adapted to control fluid flowing into and out of the mixing assembly or magnetic impeller.

Item 316. The assembly, method, shipping kit, non-superconducting magnetic impeller, magnetic impeller, or rotatable element according to any one of the preceding items, wherein the controller is adapted to control the magnetic drive.

Item 317. The assembly, method, shipping kit, non-superconducting magnetic impeller, magnetic impeller, or rotatable element according to any one of the preceding items, wherein the controller is disposed proximate to the handle.

Item 318. A magnetic impeller comprising:

a rotatable element comprising a magnetic element;

an overmolded ring disposed about a perimeter of the rotatable element; and a plurality of blades coupled to the rotatable element, wherein the magnetic impeller is adapted to mix a fluid retained within a vessel without being physically held to a predetermined location within the vessel.

Item 319. The magnetic impeller of item 318, wherein at least one of the plurality of blades has a non-rectilinear cross-sectional profile adapted to generate lift in a fluid.

Item 320. The magnetic impeller of item 318, wherein the magnetic element comprises a neodymium magnet.

Item 321. A mixing assembly comprising:

a vessel; and the magnetic impeller of item 318 disposed within the vessel.

Item 322. A magnetic impeller comprising:

a magnetic element;

a rotatable element enclosing the magnetic element, wherein the rotatable element has a proximal end, an opposite distal end, and a contact flange disposed on a surface of the distal end, the contact flange comprising at least two ribbed portions; and a plurality of blades coupled to the rotatable element, wherein the magnetic impeller is adapted to mix a fluid retained within a vessel without being physically held to a predetermined location within the vessel.

Item 323. The magnetic impeller of item 322, wherein the at least two ribbed portions each lie along generally straight lines.

Item 323. The magnetic impeller of item 323, wherein the contact flange has a maximum thickness at a central portion of the distal end.

Item 324. The magnetic impeller of item 323, wherein a first of the at least two ribbed portions intersects a second of the at least two ribbed portions at a 90° angle.

Item 325. The magnetic impeller of item 322, wherein the contact flange is unitary with the distal end of the rotatable element.

Item 326. The magnetic impeller of item 322, wherein each of the plurality of blades has a non-rectilinear cross-sectional profile adapted to generate lift in a fluid.

Item 327. The magnetic impeller of item 322, wherein the magnetic element comprises a neodymium magnet.

Item 328. A mixing assembly comprising:

a modular cart system comprising a first cart and a second cart, the first cart adapted to receive a vessel and a magnetic impeller disposed within the vessel, and the second cart adapted to receive a magnetic drive selectively adapted to drive the magnetic impeller, wherein the first cart is adapted to couple with the second cart so that the magnetic drive is in a proper location for driving the magnetic impeller.

Item 329. The mixing assembly of item 328, wherein the first cart comprises a first complimentary feature and the second cart comprises a second complimentary feature adapted to align with the first complimentary feature.

Item 330. The mixing assembly of item 328, wherein the first and second carts are adapted to move independent of one another.

Item 331. The mixing assembly of item 329, further comprising a locking mechanism adapted to lock the second cart within the first cart.

Item 332. The mixing assembly of item 328, wherein the magnetic impeller comprises a rotatable element and a plurality of blades coupled to the rotatable element.

Item 333. The mixing assembly of item 332, wherein each of the plurality of blades has a non-rectilinear cross-sectional profile adapted to generate lift in a fluid.

Item 334. The mixing assembly of item 332, wherein the rotatable element comprises a magnetic element, and the magnetic element comprises a neodymium magnet.

Item 335. The mixing assembly of item 328, comprising a plurality of first carts, each adapted to couple with the second cart so that the magnetic drive is in the proper location for driving the magnetic impeller of the first cart coupled to the second cart.

Item 336. The mixing assembly of item 328, wherein the first cart comprises a stand adapted to accommodate a plurality of vessels having different sizes.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the items.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination.

Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A magnetic impeller comprising:

a rotatable element comprising a magnetic element and a post;

an overmolded ring disposed about a perimeter of the rotatable element and sealing two base portions of the rotatable element together while encapsulating the magnetic element within the rotatable element;

a plurality of blades, wherein the plurality of blades comprise first and second blades capable of rotation with the rotatable element to maintain their relative positional relationship, wherein the first blade is disposed above the second blade; and a plug adapted to retain the plurality of blades on the post, wherein the magnetic impeller is adapted to mix a fluid retained within a vessel, wherein the magnetic impeller is decoupled from the vessel.

2. The magnetic impeller of claim 1, wherein at least one of the plurality of blades has a non-rectilinear cross-sectional profile adapted to generate lift in the fluid.

3. The magnetic impeller of claim 1, wherein the magnetic element comprises a neodymium magnet.

4. A mixing assembly comprising:

a vessel; and the magnetic impeller of claim 1 disposed within the vessel.

5. A magnetic impeller comprising:

a magnetic element;

a rotatable element comprising a post and enclosing the magnetic element, wherein the rotatable element has a proximal end, an opposite distal end, and a contact flange disposed on a surface of the distal end, the contact flange comprising at least two ribbed portions an overmolded ring disposed about a perimeter of the rotatable element and sealing two base portions of the rotatable element together while encapsulating the magnetic element within the rotatable element; and a plurality of blades comprising first and second blades capable of rotation with the rotatable element to maintain their relative positional relationship, wherein the first blade is disposed above the second blade, and a plug adapted to retain the plurality of blades on the post, wherein the magnetic impeller is adapted to mix a fluid retained within a vessel.

6. The magnetic impeller of claim 5, wherein the at least two ribbed portions each lie along generally straight lines.

7. The magnetic impeller of claim 6, wherein the contact flange has a maximum thickness at a central portion of the distal end, wherein the contact flange extends along the length of the rotatable element, and wherein the contact flange has an arcuate shape.

8. The magnetic impeller of claim 6, wherein a first of the at least two ribbed portions intersects a second of the at least two ribbed portions at a 90° angle.

9. The magnetic impeller of claim 5, wherein the contact flange is unitary with the distal end of the rotatable element.

10. The magnetic impeller of claim 5, wherein each of the plurality of blades has a non-rectilinear cross-sectional profile adapted to generate lift in the fluid.

11. The magnetic impeller of claim 5, wherein the magnetic element comprises a neodymium magnet.

12. A mixing assembly comprising:

a modular cart system comprising a first cart and a second cart, a magnetic impeller disposed within the vessel, the magnetic impeller comprising:

a rotatable element;

an overmolded ring disposed about a perimeter of the rotatable element and sealing two base portions of the rotatable element together while encapsulating a magnetic element within the rotatable element, wherein the overmolded ring further comprises a post;

a plurality of blades comprising first and second blades capable of rotation with the rotatable element to maintain their relative positional relationship, wherein the first blade is disposed above the second blade; and a plug adapted to retain the plurality of blades on the post, wherein the magnetic impeller is decoupled from the vessel, and the second cart adapted to receive a magnetic drive selectively adapted to drive the magnetic impeller, wherein the first cart is adapted to couple with the second cart so that the magnetic drive is in a proper location for driving the magnetic impeller.

13. The mixing assembly of claim 12, wherein the first cart comprises a first complimentary feature and the second cart comprises a second complimentary feature adapted to align with the first complimentary feature.

14. The mixing assembly of claim 12, wherein the first and second carts are adapted to move independent of one another.

15. The mixing assembly of claim 13, further comprising a locking mechanism adapted to lock the second cart within the first cart.

16. The mixing assembly of claim 12, wherein the magnetic impeller comprises a rotatable element and the plurality of blades are coupled to the rotatable element.

17. The mixing assembly of claim 16, wherein each of the plurality of blades has a non-rectilinear cross-sectional profile adapted to generate lift in a fluid.

18. The mixing assembly of claim 16, wherein the rotatable element comprises a magnetic element, and the magnetic element comprises a neodymium magnet.

19. The mixing assembly of claim 12, comprising a plurality of first carts, each adapted to couple with the second cart so that the magnetic drive is in the proper location for driving the magnetic impeller of the first cart coupled to the second cart.

20. The mixing assembly of claim 12, wherein the first cart comprises a stand adapted to accommodate a plurality of vessels having different sizes.

* * * * *